(12) United States Patent
Boutros et al.

(10) Patent No.: US 12,518,050 B2
(45) Date of Patent: Jan. 6, 2026

(54) COMPLIANCE WITH USE OF PERSONAL DATA

(71) Applicant: TerraTrue Inc., San Francisco, CA (US)

(72) Inventors: Jad S. Boutros, San Francisco, CA (US); Chris Handman, Manhattan Beach, CA (US); Anthony Prestia, Lawndale, CA (US)

(73) Assignee: TERRATRUE INC., San Francisco, CA (US)

( * ) Notice: Subject to any disclaimer, the term of this patent is extended or adjusted under 35 U.S.C. 154(b) by 0 days.

(21) Appl. No.: 17/781,821

(22) PCT Filed: Jul. 29, 2021

(86) PCT No.: PCT/US2021/043709
§ 371 (c)(1),
(2) Date: Jun. 2, 2022

(87) PCT Pub. No.: WO2022/026713
PCT Pub. Date: Feb. 3, 2022

(65) Prior Publication Data
US 2023/0161900 A1    May 25, 2023

Related U.S. Application Data

(60) Provisional application No. 63/059,769, filed on Jul. 31, 2020.

(51) Int. Cl.
*G06F 21/62* (2013.01)
*G06F 3/0482* (2013.01)

(52) U.S. Cl.
CPC ........ *G06F 21/6245* (2013.01); *G06F 3/0482* (2013.01); *G06F 2221/2115* (2013.01)

(58) Field of Classification Search
CPC ............... G06F 21/6245; G06F 3/0482; G06F 2221/2115
See application file for complete search history.

(56) References Cited

U.S. PATENT DOCUMENTS 11,100,445 B2 *   8/2021   Hecht .............. G06Q 10/06316
11,514,187 B1 *  11/2022   DiGregoria ........... H04L 63/102
(Continued)

FOREIGN PATENT DOCUMENTS

| WO | WO-02069630 A2 * | 9/2002 | ......... H04N 21/4312 |
| WO | 2022026713 | 2/2022 | |
| WO | WO-2022026713 A2 | 2/2022 | |

OTHER PUBLICATIONS

"International Application Serial No. PCT US2021 043709, International Preliminary Report on Patentability mailed Feb. 9, 2023", 7 pgs.

(Continued)

Primary Examiner — Kristie D Shingles
(74) Attorney, Agent, or Firm — SCHWEGMAN LUNDBERG & WOESSNER, P.A.

(57) ABSTRACT

Aspects of the present disclosure involve a system comprising a computer-readable storage medium storing a program and method for managing compliance with respect to use of personal data. The program and method provide for receiving structured information relating to personal data intended for use by a product or process; generating, based on the structured information, a set of questions corresponding to privacy compliance of the product or process with respect to the personal data; and providing a user interface for presenting the set of questions to a user, for reviewing the product or process for privacy compliance with respect to the personal data.

20 Claims, 52 Drawing Sheets

(56) References Cited

U.S. PATENT DOCUMENTS

| | | | |
|---|---|---|---|
| 11,960,619 B1* | 4/2024 | Florentino | G06F 21/6245 |
| 2007/0143827 A1 | 6/2007 | Nicodemus et al. | |
| 2013/0340086 A1 | 12/2013 | Blom | |
| 2017/0201545 A1 | 7/2017 | Nicodemus et al. | |
| 2018/0276355 A1* | 9/2018 | Barday | G06F 21/316 |
| 2019/0394148 A1* | 12/2019 | Duan | H04L 51/063 |
| 2020/0202270 A1* | 6/2020 | Brannon | G06Q 10/067 |
| 2020/0210618 A1 | 7/2020 | Barday et al. | |
| 2020/0210916 A1* | 7/2020 | Brannon | G06Q 10/067 |
| 2022/0319219 A1* | 10/2022 | Tsibulevskiy | G06F 18/40 |

OTHER PUBLICATIONS

"International Application Serial No. PCT/US2021/043709, International Search Report mailed Nov. 5, 2021", 2 pgs.
"International Application Serial No. PCT/US2021/043709, Written Opinion mailed Nov. 5, 2021", 5 pgs.

* cited by examiner

Data Spec
All Launches
LAUNCH     ID: 15
Add push notification support for new content and messages PRIVACY WORKFLOW
Data Spec
○ Basics
○ Data Uses
○ Third Parties
○ Consent
○ Questionnaires
○ Review
○ Privacy Worksheet Support
Help Center
Contact Us
Privacy Policy Search...

Data Uses
Now we need some details about the data you're going to use and how you plan to use it.

Provide a service a service requested by the user

What personal data is needed to provide a service requested by the user?
Choose all that apply or write your own.

Suggestions
| Analytics & Usage Data | Off-platform activity | On-platform activity | Video viewing history |

Demographics & Characteristics
Device Information
Health
Identifiers
Location
Payment & Financial Data
Personal & Profile
Personalization
Social
User-Generated Content ● Data Type How long do you need to retain the data and where does it come from?
Select your answer.

| DATA TYPE | RETAIN FOR | THEN | SOURCE |
|---|---|---|---|
| Apply to All | Select... ▼ | Select... ▼ | Select... ▼ |
| Device identifier | Account duration ▼ | Delete ▼ | Provided by individu... ▼ |
| On-platform activity | 7 days ▼ | Aggregate ▼ | Provided by individu... ▼ |

(Back) (Next)

Consent

In some cases, you might want to ask people for their consent to use their data. If you're planning to seek their consent with this feature, we'll need a little more information.

Are you planning to ask people for their consent with this feature?
For example, it's pretty common to ask people for their consent before you collect their precise location or contacts.

Yes | No

Back  Next

---

Data Spec

All Launches
LAUNCH   ID: 15
Add push notification support for new content and messages PRIVACY WORKFLOW
Data Spec  >
- Basics
- Data Uses
- Third Parties
- Consent
- Questionnaires
- Review Privacy Worksheet  >

Support
Help Center
Contact Us
Privacy Policy

Search...

Review
You're done! Review your responses and then click save.

Launch Goal
Gain users

Whose Data will you Use For this feature
Consumers

Data Use and Retention
Provide a service requested by the user

| DATA TYPE | RETAIN FOR | THEN | THIRD PARTIES | SOURCE |
|---|---|---|---|---|
| Device identifier | Account duration | Delete | Urban Airship | Provided by individuals |
| On-platform activity | 7 days | Aggregate | None | Provided by individuals |

(Back) (Next)

---

Data Spec

All Launches

LAUNCH   ID: 15
Add push notification support for new content and messages

PRIVACY WORKFLOW
Data Spec ⌄
 ⊙ Basics
 ⊙ Data Uses
 ⊙ Third Parties
 ⊙ Consent
 ⊙ Questionnaires
 ⊙ Review
Privacy Worksheet ⌄

Support
Help Center
Contact Us
Privacy Policy

FIG. 13

Privacy Worksheet

Search...

Categorize Your Data — 1302

Because you'll be processing data from people in California, you'll need to provide information about the categories of data you collect and the third parties that collect that data.

What kind of data are you collecting?
For each data type, choose a category. Where possible, we've made some guesses.

| DATA TYPE | CATEGORY |
|---|---|
| Device identifier | Identifiers ▼ |
| On-platform activity | Internet or other electron... ▼ |

(Back) (Next)

- All Launches
- LAUNCH   ID: 15
  Add push notification support for new content and messages PRIVACY WORKFLOW
Data Spec ∧

Privacy Worksheet ∨
  ⊙ Intro & Data
  ⊙ Launch Goal Details
  ⊙ Categorizing Data
  ⊙ Basics
  ⊙ Choice
  ⊙ Access & Portability
  ⊙ Deletion & Correction
  ⊙ Special Considerations
  ⊙ Assessments
  ⊙ Third Parties
  ⊙ Recommendations Support
Help Center
Contact Us
Privacy Policy

FIG. 14

Privacy Worksheet

All Launches

LAUNCH  ID: 15
Add push notification support for new content and messages

PRIVACY WORKFLOW
Data Spec

Privacy Worksheet
- Intro & Data
- Launch Goal Details
- Categorizing Data
- Basics
- Choice
- Access & Portability
- Deletion & Correction
- Special Considerations
- Assessments
- Third Parties
- Recommendations Support
Help Center
Contact Us
Privacy Policy Search...

Basis for Processing

Before processing information from individuals in the EU, you must select one of six bases for doing so. Each basis comes with its own implementation and compliance requirements, but you may only select one basis or each data use. Below you will find information to help you select an appropriate basis.

What is your basis for processing to provide a service requested by the user?   Need some help?

| DATA TYPE | CONSENT | CONTRACTUAL NECESSITY | LEGAL OBLIGATION | LEGITIMATE INTEREST | PUBLIC TASK | VITAL INTEREST |
|---|---|---|---|---|---|---|
| Device identifier | ● | ○ | ○ | ○ | ○ | ○ |
| On-platform activity | ● | ○ | ○ | ○ | ○ | ○ |

(Back) (Next)

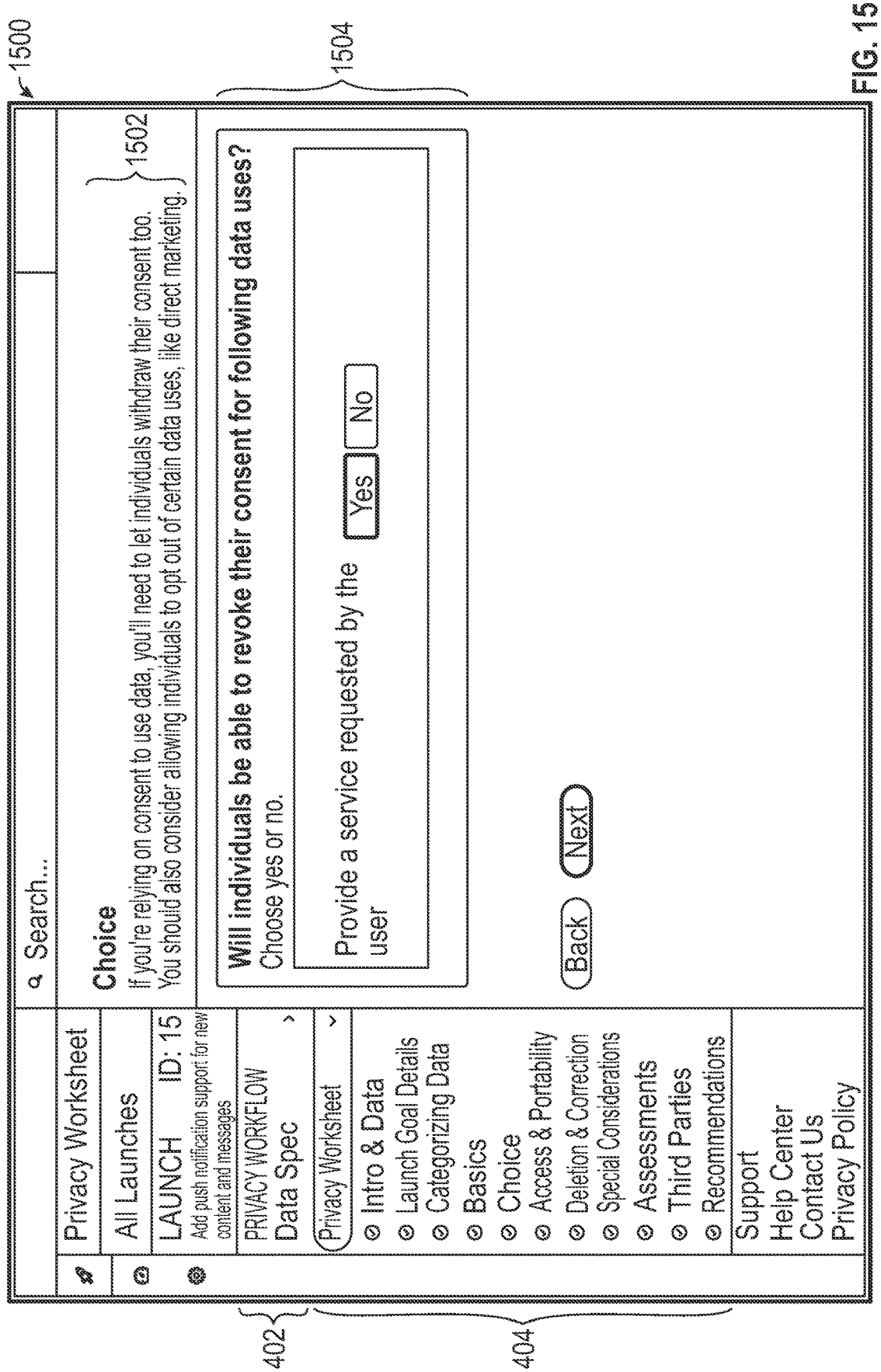

Access & Portability

Individuals may have a right to get a copy of their personal information from you, or request that you provide information in a machine-readable format.

If an individual asks, will you be able to provide them with the following information?
Choose yes or no.

- Device identifier — Yes / No
- On-platform activity — Yes / No

Do individuals give you the following information?
Keep in mind that information you develop based on someone's activity - Like an inferred interest category - doesn't count as data that a user gives you. But data that users automatically provide simply by using your services - Like data that shows up in an activity log - would count as information gives to you.

- Device identifier — Yes / No
- On-platform activity — Yes / No

Back  Next

---

Privacy Worksheet

All Launches

LAUNCH  ID: 15
Add push notification support for new content and messages

PRIVACY WORKFLOW
Data Spec

- Privacy Worksheet
  - Intro & Data
  - Launch Goal Details
  - Categorizing Data
  - Basics
  - Choice
  - Access & Portability
  - Deletion & Correction
  - Special Considerations
  - Assessments
  - Third Parties
  - Recommendations

Privacy Worksheet

All Launches

LAUNCH    ID: 15
Add push notification support for new content and messages

PRIVACY WORKFLOW
Data Spec

Privacy Worksheet
- Intro & Data
- Launch Goal Details
- Categorizing Data
- Basics
- Choice
- Access & Portability
- Deletion & Correction
- Special Considerations
- Assessments
- Third Parties
- Recommendations Support
Help Center
Contact Us
Privacy Policy Search...

Deletion & Correction
In many cases, individuals will have the right to request that you delete or correct their information.

If people ask, will you delete or correct their information?
Select all that apply.

| DATA TYPE | DELETE IT | CORRECT IT | NEITHER |
|---|---|---|---|
| Device identifier | ☑ | ☐ | ☐ |
| On-platform activity | ☑ | ☐ | ☐ |

Back    Next

FIG. 18

Privacy Worksheet

All Launches

LAUNCH    ID: 15
Add push notification support for new content and messages

PRIVACY WORKFLOW
Data Spec
- Privacy Worksheet
  - ⊙ Intro & Data
  - ⊙ Launch Goal Details
  - ⊙ Categorizing Data
  - ⊙ Basis
  - ⊙ Choice
  - ⊙ Access & portability
  - ⊙ Deletion & Correction
  - ⊙ Special Considerations
  - ⊙ Assessments
  - ⊙ Third Parties
  - ⊙ Recommendations Support
Help Center
Contact Us
Privacy Policy 🔍 Search...

Special Considerations

Regulators will sometimes require you to perform a Data Protection Impact Assessment even if you're not using sensitive data. These questions will help us decide if you need to or not.

Will this launch involve making any automated decisions that could significantly affect individuals? ⓘ
Choose yes or no.
[Yes] [No]

Will this launch involve regularly Monitoring individuals? ⓘ
Choose yes or no.
[Yes] [No]

Will this launch involve using data on a large scale? ⓘ
Choose yes or no.
[Yes] [No]

Will this launch involve combining data from different organizations or data that was originally collected for different purposes? ⓘ
Choose yes or no.
[Yes] [No]

Will this launch involve using data about individuals who require special consideration or care? ⓘ
Choose yes or no.
[Yes] [No]

Will this launch involve an innovative new technology or use of data that poses novel risks or will be difficult for individuals to understand? ⓘ
Choose yes or no.
[Yes] [No]

(Back) (Next)

Privacy Worksheet

All Launches

LAUNCH    ID: 15
Add push notification support for new content and messages

PRIVACY WORKFLOW
Data Spec
Privacy Worksheet ⌄
○ Intro & Data
○ Launch Goal Details
○ Categorizing Data
○ Basis
○ Choice
○ Access & portability
○ Deletion & Correction
○ Special Considerations
○ Assessments
○ Third Parties
○ Recommendations Support
Help Center
Contact Us
Privacy Policy 🔍 Search...

Legitimate Interest Assessment
Provide a service requested by the user using:
Device Identifier    On-platform activity When you provide a service requested by the user, who benefits?
Select all that apply.

☑ Your organization    ☑ Consumers    ☐ Business customers    ☐ Your organization's employees ☐ The general public    ☐ Write your own

How important are these benefits to:
Select one for each entity
Your organization
| TRIVIAL | HELPFUL | IMPORTANT | CRITICAL |
Consumers
| TRIVIAL | HELPFUL | IMPORTANT | CRITICAL |

Describe the impact to your organization if you can't provide a service requested by the user.
For example, would your ability to provide services, generate profits, or protect users be limited in any way?
We will have a significant hit to engagement.

Do you have any unresolved ethical or legal concerns with using personal data to provide a service requested by the user?
Choose yes or no

FIG. 20B

Can you achieve the goals for this launch without using device identifier and on-platform activity to provide a service requested by the user?

Yes  No

Choose yes or no

Yes  No

Back  Next

Privacy Worksheet

All Launches

LAUNCH   ID: 15
Add push notification support for new content and messages

PRIVACY WORKFLOW
Data Spec
(Privacy Worksheet)
⊙ Intro & Data
⊙ Launch Goal Details
⊙ Categorizing Data
⊙ Basis
⊙ Choice
⊙ Access & portability
⊙ Deletion & Correction
⊙ Special Considerations
⊙ Assessments
⊙ Third Parties
⊙ Recommendations Support
Help Center
Contact Us
Privacy Policy 🔍 Search...

Third Parties
It looks like you're sharing some data third parties. Let's explore how they'll use it.

Will any of these third parties be able to use the data for their own purposes?
For example, will they be able to use the personal data you share to improve their own services? Select all that apply.

☐ Urban Airship
☑ None

Describe how each third party will use the data you share with them and indicate whether you have a contract clearly outlining their obligations:

Urban Airship   ☑ Contract
[Urban Airship will deliver push notification on our behalf. They many not use personal data for any other purpose.]

Are these third parties processors, controllers, or joint controllers?

DATA TYPE    PROCESSOR    CONTROLLER    JOINT CONTROLLER
Urban Airship    ●    ○    ○

Are you selling any data to third parties?
Select all that apply or choose "None" for each third party.

Urban Airship
☐ Device Identifier
☑ None ( Back ) ( Next )

FIG. 24

Privacy Worksheet

All Launches

LAUNCH    ID: 15
Add push notification support for new content and messages

PRIVACY WORKFLOW
Data Spec  ∧
(Privacy Worksheet  ∨)
⊙ Intro & Data
⊙ Launch Goal Details
⊙ Categorizing Data
⊙ Basis
⊙ Choice
⊙ Access & portability
⊙ Deletion & Correction
⊙ Special Considerations
⊙ Assessments
⊙ Third Parties
⊙ Recommendations Support
Help Center
Contact Us
Privacy Policy Q Search...

Recommendations & Considerations

Based on responses, we've identified some issues you should consider before launch. Feel free to check them off as you complete them.

| PRIORITY | RECOMMENDATION |
|---|---|
| High Medium Other | High-priority items must be resolved before launching this feature. |
| ☐ Confer with your DPO<br>☐ Consult with your DPA | ☐ Confer with your DPO<br>If your company has a Data Protection Officer, you need to confer with them before releasing the feature. You should document any advice you receive right in this launch. |

(Back)  (Save)

FIG. 25

Privacy Worksheet

All Launches
LAUNCH      ID: 15
Add push notification support for new content and messages PRIVACY WORKFLOW
Data Spec ∧
(Privacy Worksheet ∨)
⊙ Intro & Data
⊙ Launch Goal Details
⊙ Categorizing Data
⊙ Basis
⊙ Choice
⊙ Access & portability
⊙ Deletion & Correction
⊙ Special Considerations
⊙ Assessments
⊙ Third Parties
⊙ Recommendations Support
Help Center
Contact Us
Privacy Policy 🔍 Search...

Recommendations & Considerations

Based on your responses, we've identified some issues you should consider before launch. Feel free to check them off as you complete them.

| PRIORITY | RECOMMENDATION |
|---|---|
| High Medium Other | Medium-priority issues should be resolved before launching or as soon as possible after the launch. |
| ☐ Assess risks related to children | ☐ Assess risks related to children<br><br>Many regulators, including those in the United State and Europe, are particularly concerned about the privacy of children and require parental consent for some data uses. You should implement additional safeguards, like data minimization and de-identification, for children. The ICO provides a good guide to help understand children's privacy under the GDPR. |

(Back)  (Save)

FIG. 26

Privacy Worksheet

All Launches

LAUNCH ID: 15
Add push notification support for new content and messages

PRIVACY WORKFLOW
Data Spec ∧

Privacy Worksheet ∨
- Intro & Data
- Launch Goal Details
- Categorizing Data
- Basis
- Choice
- Access & portability
- Deletion & Correction
- Special Considerations
- Assessments Search...

Recommendations & Considerations

Based on responses, we've identified some issues you should consider before launch. Feel Free to check them off as you complete them.

| PRIORITY | RECOMMENDATION |
|---|---|
| High Medium Other | These additional items should be considered before launch. |
| ☐ Automate data correction<br>☐ Train your support team | ☐ Automate data correction<br>You're unable to correct the following information when requested by an individual:<br>   ○ Device identifier<br>   ○ On-platform activity<br><br>Individuals in Europe have a right to request that their data be corrected. If there's a high likelihood that any of this information could be incorrect, you should develop a way to correct or delete it. |

(Back) (Save)

2700

2702
Legitimate Interest Assessment

This Legitimate Interest Assessment was performed by <insert name of person that completed the Privacy Worksheet> on <insert date that the Privacy Worksheet was completed>. It contemplates using the following data to <data use>.

| DATA TYPE | ENTITY |
|---|---|
| Advertising identifier | ● Business Customers |
| Facial Scan | ● Consumers |
| MAC address | ● Consumers |
| IP address | ● Employees |

Purpose & benefits of processing

This processing is designed to build a larger customer base by providing compelling content that will make them return to our product organically.

<Organization name> could not achieve its business goals without this processing activity.

<Organization name> believes the importance of this processing is <insert LIAQ2 answer for your Organization>. If <Organization name> couldn't process data in this way, it would be impacted as follows:

My ability to provide services, generate profits, or protect users would be limited.

This processing activity will also provide:

HELPFUL  benefits to Business Customers
CRITICAL  benefits to The general public Processing Risks
The following data processed and carries an elevated risk:
• Advertising identifier
• Facial scan

2704
Processing Risks Cont.

To address the above risks, <Organization name> has implemented the following safeguards:

• Encryption
• Anonymization
• Logical access controls
• Logging

Individuals will be able to opt out of this processing.

<Organization name> identifies the following unresolved ethical or legal concerns with this processing activity:

There has not been a true solution to avoid these risks yet. Needs revision.

Reasonable expectations
The data being processed is collected as follows:

Facial scan is being used to target advertising audiences
Advertising identifier is being used to target advertising audiences Prior to processing data, <Organization name>'s privacy policy notified individuals of this processing activity

<Organization name> identified the following potential risks related to this data processing:

SEVERE | UNLIKELY

Your employees

They will potentially lose their identities to dangerous sources on the internet.

2702

Determination

<Privacy review> determined that <Organisation name> may rely on legitimate interest for this processing on <date privacy review was completed>

2802 — Data Protection Impact Assessment

This DPIA was performed to evaluate data processing activities that have the potential to result in a high risk to individuals. Specifically, this DPIA considers using the following information to <data use>:

- Advertising identifier
- Facial scan

Additional information about this processing activity can be found at <insert launch URL>

Description of processing
This launch will process data from the following:

 Business customers   Consumers

This processing is designed to build a larger customer base by providing compelling content that will make them return to our product organically Retention
Data is retained as follows:

| RETAIN | THEN |
|---|---|
| 30 days | Deleted |

Target advertising on your own services

| DATA TYPE |
|---|
| Advertising identifier |

Third-Party Access
AdLearn Open Platform will have access to:

2804 — Individual consultation

<Organization name> consults individuals before processing their data as follows:

Donec facilisis tortor id augue Lacinia, at viverra est semper. Sed sapien lectus, scelerisque nec pharetra id, tempor a tortor. Pellentesque non dignissim neque.

Necessity & proportionality of processing
Necessity
<Organization name> could achieve its business goals without this processing activity.
Lawfulness of processing
To <data use>, <Organization name> relies on the following lawful of one data type is associated with the data use (basis) else (base):

| DATA TYPE | BASIS |
|---|---|
| Advertising identifier | Consent |

Individual rights
Transparency
Prior to processing data, <Organization name>'s privacy policy notified individuals that the following information would be used to <data use>:

- Advertising identifier

| DATA TYPE | PURCHASED |
|---|---|
| Advertising identifier | ⌵ |

<Third party> is a <insert answer to TPQ4> and may if TPQ1 {not} use this personal data for its own purposes <third party>'s access to personal data is if TPQ3 {not} subject to a contract.

<Third party> uses this data as follows:

Donec facilisis tortor ut augue Lacina, at viverra est semper. Sed sapien metus, scelerisque nec pharetra id, tempor a tortor. Pellentesque non dignissim neque.

2804
Rectification & erasure
Individuals will be able to:

| DATA TYPE | DELETE | CORRECT |
|---|---|---|
| Advertising identifiers | ⌵ | ⌵ |

Prior consultation

<Organization name> was unable to mitigate all high risks associated with.

ⓘ Unwanted modification of data

<Organization name> did not consult its supervisory authority about these unmitigated risks.

2902
Risk assessment & mitigation
Benefits
This processing is designed to:

This processing is designed to build a larger customer base by providing compelling content that will make them return to our product organically <Organization name> believes the importance of this processing is <insert LIAQ2/DPIAQ2 answer for your Organization>. If <Organization name> couldn't process data in this way, it would be impacted as follows.

Donec facilisis tortor ut augue lacinia, at viverra est semper. Sed sapien metus, scelerisque nec pharetra id, temper a tortor. Pellentesque non dignissim neque.

This processing activity will if "your organization" is selected in LIAQ1/DPIAQ{also} provide:

| HELPFUL | benefits to Business customers |
| CRITICAL | benefits to The general public |

Risks
This processing could result in risks to:

This processing is designed to build a larger customer base by providing compelling content that will make them return to our product organically

| SIGNIFICANT | UNLIKELY |

Your employees
They will potentially lose their identities to dangerous sources on the internet.
The general public
Other companies will be able to recreate their identities and sell products to their virtual selves.

2904
These safeguards will if DPIAQ9 is "No" (not) eliminate all high risks of <risk>.

Individual consultation
<Organization name> consulted individuals before processing their personal information by Donec facilisis tortor ut augue lacinia, at viverra est semper. Sed sapien metus, scelerisque nec pharetra id, temper a tortor. Pellentesque non dignissim neque.

<Organization name> complies with the following industry codes of conduct and standards.

Donec facilisis tortor ut augue lacinia, at viverra est semper. Sed sapien metus, scelerisque nec pharetra id, temper a tortor. Pellentesque non dignissim neque.

SIGNIFICANT | LIKELY
The general public
Other companies will be able to recreate their identities and sell products to their virtual selves.

<Organization name> will attempt to mitigate this risk using the following safeguards:

- Encryption
- Anonymization

2902

Outcome  2904
<Privacy reviewer> approved this processing activity on <date privacy approval was completed>. If the <Order with your DPO recommendation is checked (<Organization name>'s data protection officer was consulted before processing personal information in the manner described in this assessment

3902
- Privacy central
  - Overview
  - Data Types
  - Data Uses
  - Third Parties
  - Bases for Processing
- Query Data Support
Help Center
Contact Us
Privacy Policy

3904
Search...

Query Data
Run a report on your data. Use the Advanced Query toggle to develop finer-grain results.

What would you like in your report?
Select one.

- Data Types
- Data Categories
- Data Sources
- Data Uses
- Third Parties
- Third Party Categories Advanced Query

3906
Refine your Results   All time   Date Range: 07/22/2019 — 07/22/2020

| Refine By | CONDITION | VALUE |
| Category | is | Identifiers ① × |

AND

| Refine By | CONDITION | VALUE |
| Retention period | is greater than | 30 days |

+

Display Results

COMPLIANCE WITH USE OF PERSONAL DATA

This application is a U.S. National Stage Filing under 35 U.S.C. 371 from International Application No. PCT/US2021/043709, filed Jul. 29, 2021 and published in English as WO 2022/026713 on Feb. 3, 2022, which claims the benefit of priority to U.S. Provisional Patent Application Ser. No. 63/059,769, filed Jul. 31, 2020, each of which is incorporated herein by reference in its entirety.

TECHNICAL FIELD

The present disclosure relates generally to usage of personal data, including a system for assisting with complying with standards and regulations with respect to usage of personal data.

BACKGROUND

An organization may implement a product and/or process with features that use personal data. Standards and/or regulations may affect the manner in which the organization chooses to use personal data.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4 illustrates a data specification user interface (UI) with user-selectable elements for specifying basic features of a product/process, in accordance with some example embodiments.

FIG. 5 illustrates a data specification UI with user-selectable elements for specifying additional basic features of a product/process, in accordance with some example embodiments.

FIG. 7 illustrates a data specification UI with user-selectable elements for specifying types of personal data intended for use by a product/process, in accordance with some example embodiments.

FIG. 8 illustrates a data specification UI with user-selectable elements for specifying consent procedures for personal data intended for use by a product/process, in accordance with some example embodiments.

FIG. 9 illustrates a data specification UI with user-selectable elements for identifying third parties that receive personal data intended for use by a product/process, in accordance with some example embodiments.

FIG. 10 illustrates a data specification UI for reviewing responses regarding personal data intended for use by a product/process, in accordance with some example embodiments.

FIG. 13 illustrates a privacy review UI with user-selectable elements for categorizing personal data with respect to compliance, in accordance with some example embodiments.

FIG. 14 illustrates a privacy review UT with user-selectable elements for specifying one or more bases for processing personal data with respect to compliance, in accordance with some example embodiments.

FIG. 15 illustrates a privacy review UI with user-selectable elements for specifying user choice regarding use of personal data with respect to compliance, in accordance with some example embodiments.

FIG. 16 illustrates a privacy review UI with user-selectable elements for specifying access and portability of personal data with respect to compliance, in accordance with some example embodiments.

FIG. 17 illustrates a privacy review UI with user-selectable elements for specifying modification (deletion and correction) of personal data with respect to compliance, in accordance with some example embodiments.

FIG. 18 illustrates a privacy review UI with user-selectable elements for specifying special considerations of personal data with respect to compliance, in accordance with some example embodiments.

FIG. 19 illustrates a privacy review UI for initiating one or more assessments regarding use of personal data with respect to compliance, in accordance with some example embodiments.

FIGS. 20A-20B illustrate a privacy review UI for performing a legitimate interest assessment regarding use of personal data with respect to compliance, in accordance with some example embodiments, FIG. 21 illustrates a privacy review UI for further performing a legitimate interest assessment regarding use of personal data with respect to compliance, in accordance with some example embodiments.

FIGS. 22A-22B illustrate a privacy review UT for performing a data protection impact assessment regarding use of personal data with respect to compliance, in accordance with some example embodiments.

FIG. 23 illustrates a privacy review UI with user-selectable elements for specifying third party interactions regarding personal data with respect to compliance, in accordance with some example embodiments.

FIG. 24 illustrates a privacy review UI for providing recommendations and/or considerations regarding use of personal data with respect to compliance, in accordance with some example embodiments.

FIG. 25 illustrates another privacy review UI for providing recommendations and/or considerations regarding use of personal data with respect to compliance, in accordance with some example embodiments.

FIG. 26 illustrates another privacy review UI for providing recommendations and/or considerations regarding use of personal data with respect to compliance, in accordance with some example embodiments.

FIGS. 27A-27B illustrate a report of a legitimate interest assessment for a product/process, in accordance with some example embodiments.

FIGS. 28A-28B illustrate part of a report on a data protection impact assessment for a product/process, in accordance with some example embodiments.

FIGS. 29A-29B illustrate an additional part of a report on a data protection impact assessment for a product/process, in accordance with some example embodiments.

FIG. 30 illustrates a dashboard UI for providing an overview of personal data usage and/or compliance, in accordance with some example embodiments.

FIG. 39 illustrates a dashboard UI for performing a query with respect to personal data, in accordance with some example embodiments.

DETAILED DESCRIPTION

Figure 1:
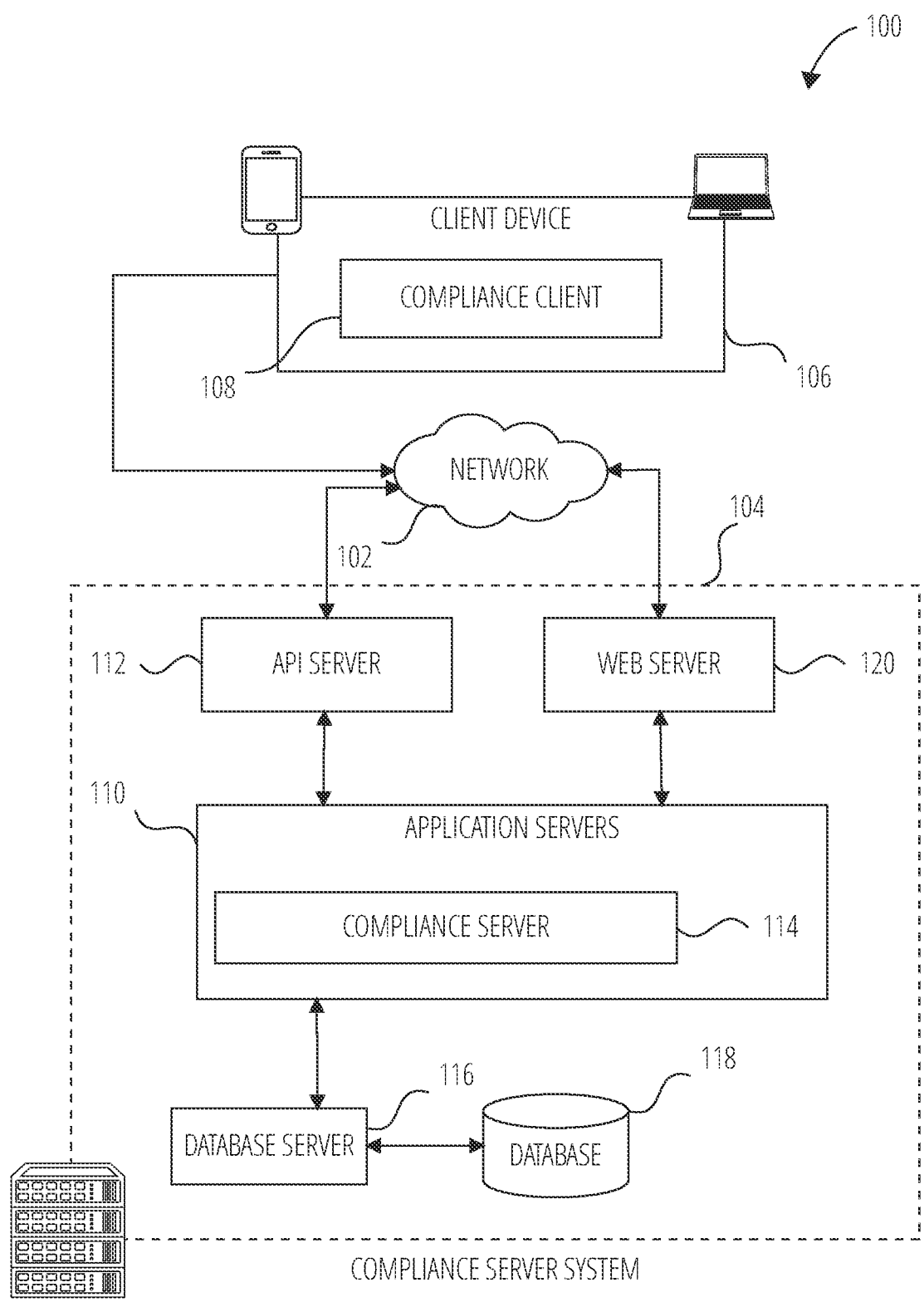
FIG. 1 is a diagrammatic representation of a networked environment in which the present disclosure may be deployed, in accordance with some example embodiments.

An organization may implement a product and/or process with features that use personal data. Regulations and/or company policies may affect the manner in which the organization uses personal data with respect to the product/process.

The disclosed embodiments relate to a system to assist in compliance with standards and/or regulations for using personal data with respect to a product/process (e.g., or feature(s) thereof). The system is configured to save and maintain structured information based on user input provided by different types of end users.

For example, a first type of end user may be a project manager, engineer and/or any other employee or contractor responsible for or otherwise having knowledge of the personal data used by the product/process, or particular feature(s) thereof. The system generates a questionnaire for the first type of end user, based on predefined taxonomies relating to personal data types, uses and/or third parties. The questionnaire includes multiple questions prompting the end user for the intended uses of personal data, the intended types of personal data to be used, retention procedures, consent procedures and/or indications of third party interactions. The system captures and stores the responses. The responses may correspond to user-submitted responses and/or responses based on data accessed from a data store (e.g., by scanning a customer system database). The responses are stored as structured information within one or more data structures.

A second type of end user may be someone having responsibility for compliance (e.g., a lawyer, compliance officer and/or other employee) with respect to personal data for a product/process, or particular feature(s) thereof. The system generates a second questionnaire for the second type of end user, with preset questions that are based at least in part on the responses (e.g., structured information), for example, as submitted by the first type of user and/or accessed from a data store. Latter parts of the second questionnaire may be based on responses (e.g., user-submitted or accessed from a data store) to earlier parts of the second questionnaire. The second questionnaire includes multiple compliance-based questions with respect to the personal data usage. For example, compliance-based questions prompt the send type of user for data categories, user modification procedures, one or more bases for processing, third party interactions considerations, user choice, and/or user access. The system captures and stores the responses (e.g., user-submitted and/or accessed from a data store) within one or more data structures.

While the embodiments described herein refer to first and second types of users, the subject system is not limited to two users. For example, the first and second types of users may correspond to a single person (e.g., where the single person assumes the role(s) of the first and second types of users), or may correspond to two or more persons (e.g., where the two or more person(s) assume/share the role(s) of the first and second types of users).

The system is configured to maintain a data mapping structure which cross-references the multiple responses from the first type of user with those from the second type of user. For example, the data mapping structure is usable to provide recommendations and/or considerations, generate assessment reports (e.g., for documenting compliance), and/ or identify potential risks while providing risk-utility indicators for such risks. In one or more embodiments, the data mapping structure is configured to cross-reference the multiple answers (e.g., from the first and second types of users and/or data stores) over multiple periods of time, so as to create user interfaces (e.g., dashboard interfaces) for tracking compliance issues over time. By virtue of the system as described herein, it is possible to facilitate compliance with respect to the personal data usage by the product/process or particular feature(s) thereof.

FIG. 1 is a block diagram showing an example compliance system 100 for facilitating compliance of a product/process with respect to personal data. The compliance system 100 includes one or more instances of a client device 106 each of which hosts a number of applications including a compliance client 108.

The compliance client 108 is communicatively coupled to a compliance server system 104 via a network 102 (e.g., the Internet). The data exchanged between the compliance client 108 and the compliance server system 104 includes functions (e.g., commands to invoke functions) as well as payload data (e.g., responses in the form of text, identifiers, and the like).

The compliance server system 104 provides server-side functionality via the network 102 to the compliance client 108. While certain functions of the compliance system 100 are described herein as being performed by either the compliance client 108 or by the compliance server system 104, the location of certain functionality either within the compliance client 108 or the compliance server system 104 is a design choice. For example, it may be technically preferable to initially deploy certain technology and functionality within the compliance server system 104, but to later migrate this technology and functionality to the compliance client 108 where a client device 106 has a sufficient processing capacity.

The compliance server system 104 supports various services and operations that are provided to the compliance client 108. Such operations include transmitting data to, receiving data from, and processing data generated by the compliance client 108. This data may include, indications of responses such as user selections (e.g., of a selected element within a user interface), data accessed from a data store (e.g., by scanning a customer system database), text input by a user and/or selected links/attachments, as examples. Data exchanges within the compliance system 100 are invoked and controlled through functions available via user interfaces (IIs) of the compliance client 108.

In addition, an Application Program Interface (API) server 112 is coupled to, and provides a programmatic interface to, application servers 110. The application servers 110 are communicatively coupled to a database server 116, which facilitates access to a database 118 that stores data processed by the application servers 110. Similarly, a web server 120 is coupled to the application servers 110, and provides web-based interfaces to the application servers 110. To this end, the web server 120 processes incoming network requests over the Hypertext Transfer Protocol (HTTP) and several other related protocols.

The Application Program Interface (API) server 112 receives and transmits message data (e.g., commands and message payloads) between the client device 106 and the application servers 110. Specifically, the Application Program Interface (API) server 112 provides a set of interfaces (e.g., routines and protocols) that can be called or queried by the compliance client 108 in order to invoke functionality of the application servers 110. The Application Program Interface (API) server 112 exposes various functions supported by the application servers 110, including account registration, login functionality, user submission of information relating to personal data intended for use by a product/process, user submission of information relating to compliance of the product/process with respect to the personal data, and/or the generation and retrieval of compliance recommendations and/or considerations, risks and compliance reports.

The application servers 110 hosts a one or more applications and subsystems, including a compliance server 114. The compliance server 114 implements a number of compliance processing technologies and functions, particularly related to the aggregation and other processing of content (e.g., structured information of personal data types/uses, compliance information) received from the compliance client 108. As will be described in further detail, the content from the compliance client 108 may be aggregated and cross-referenced to generate data mappings related to compliance of a product/process with respect to personal data usage. These data mappings are then made available, by the compliance server 114, to the compliance client 108. Other processor and memory intensive processing of data may also be performed server-side by the compliance server 114, in view of the hardware requirements for such processing.

Figure 2:
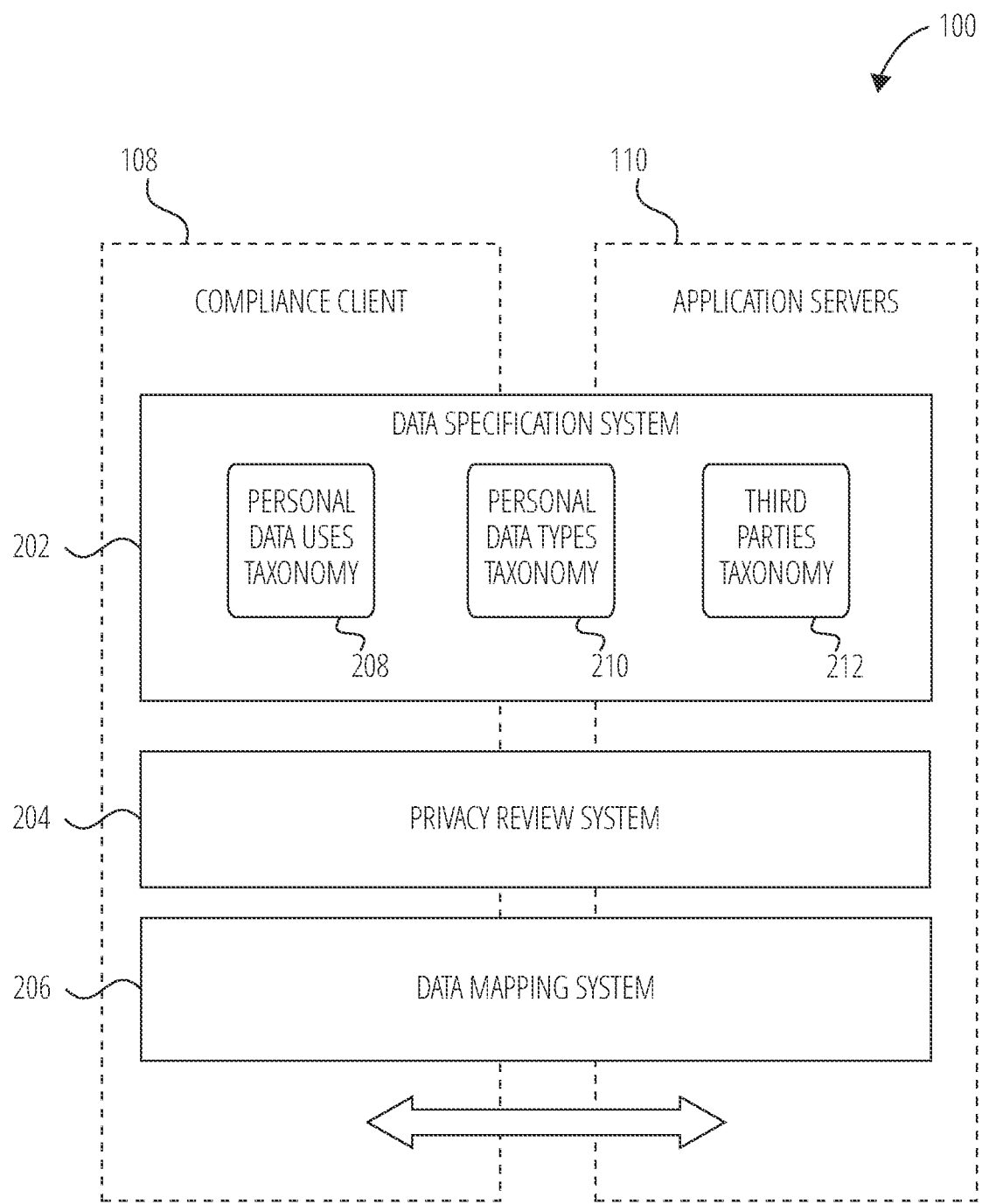
FIG. 2 illustrates a compliance system in accordance with some example embodiments.

FIG. 2 is block diagram illustrating further details regarding the compliance system 100, according to example embodiments. The compliance system 100 embodies a number of subsystems, which are supported on the client-side by the compliance client 108 and on the server-side by the application servers 110. These subsystems include, for example, a data specification system 202, a privacy review system 204 and a data mapping system 206.

The data specification system 202 is responsible for collecting, storing and maintaining information related to personal data intended for use by a product/process (e.g., or feature(s) thereof). As described herein, the information collected and maintained by the data specification system 202 includes one or more of general/basic features of the product/process, intended uses of the personal data, types of personal data, third party interactions regarding the personal data, retention procedures for the personal data, and/or consent procedures for the personal data.

For example, the information may be based on responses (e.g., user-submitted and/or accessed from a data store) to predefined questions provided by the data specification system 202 to the user. The predefined questions may be provided to the user based at least in part on one or more taxonomies 208-212 implemented by the data specification system 202. Each of the taxonomies 208-212 may correspond to a respective aspect of personal data usage by the product/process (or feature thereof). As shown in the example of FIG. 2, the taxonomies include a personal data uses taxonomy 208, a personal data types taxonomy 210 and a third parties taxonomy 212.

The personal data uses taxonomy 208 is configured to define categories (e.g., and subcategories) relating to intended uses of personal data. As discussed further below with respect to FIG. 6, for each category, the personal data uses taxonomy 208 may include an identifier (e.g., to identify the specific data use), a description of the use, common data associated with the use, and/or risk data (e.g., one or more risk scores and/or one or more risk flags related to opt-outs, disclosures, heightened review requirements, and the like) associated with the use. The personal data uses taxonomy 208 is usable by the data specification system 202 to generate user interfaces (e.g., including categories, questions, candidate responses and/or other information) prompting a user for input regarding the intended uses of personal data.

The personal data types taxonomy 210 is configured to define categories (e.g., and subcategories) relating to types of personal data intended for use. As discussed further below with respect to FIG. 7, for each category, the privacy review UI 1900 may include an identifier (e.g., to identify the specific data type), a description of the data type, a suggested retention (e.g., time period and/or action to perform after the time period), and/or a risk data associated with the data type. The personal data types taxonomy 210 is usable by the data specification system 202 to generate user interfaces (e.g., including categories, questions, candidate responses and/or other information) prompting a user for input regarding the intended data types.

The third parties taxonomy 212 is configured to define categories (e.g., and subcategories) relating to third party interactions. As discussed further below with respect to FIG. 9 and FIG. 23, for each category, the personal data uses taxonomy 208 may include a category name (e.g., for categorizing the third party), and/or a third party name (e.g., for identifying the specific third party service/company). The third parties taxonomy 212 is usable by the data specification system 202 to generate user interfaces (e.g., including categories, questions, candidate responses and/or other information) prompting a user for input regarding third party interactions (e.g., third party sharing, sales, licensing, and the like).

The privacy review system 204 is responsible for collecting, storing and maintaining information related to compliance of the product/process (e.g., or feature(s) thereof) with respect to the personal data. For example, the information may be based on responses (e.g., user-submitted and/or accessed from a data store) to predefined questions provided by the privacy review system 204 to the user. In one or more embodiments, the information collected and maintained by the privacy review system 204 includes one or more of categorizations of personal data with respect to compliance, at least one basis for processing personal data, user choice regarding use of personal data, access and portability of personal data, user modifications with respect to personal data, assessments (e.g., reports) regarding use of personal data, third party interactions regarding personal data, recommendations and/or considerations regarding use of personal data.

The data mapping system 206 is responsible for cross-referencing the information collected, stored and maintained by the data specification system 202 and/or by the privacy review system 204. For example, the data mapping system 206 is configured to provide mappings between the information related to personal data intended for use by a product/process (e.g., as defined by the data specification system 202) and the information related to privacy compliance of the product/or process (e.g., as defined by the privacy review system 204). For example, this information is accessible via various tables stored in the database 118, as discussed below with respect to FIG. 3.

Figure 3:
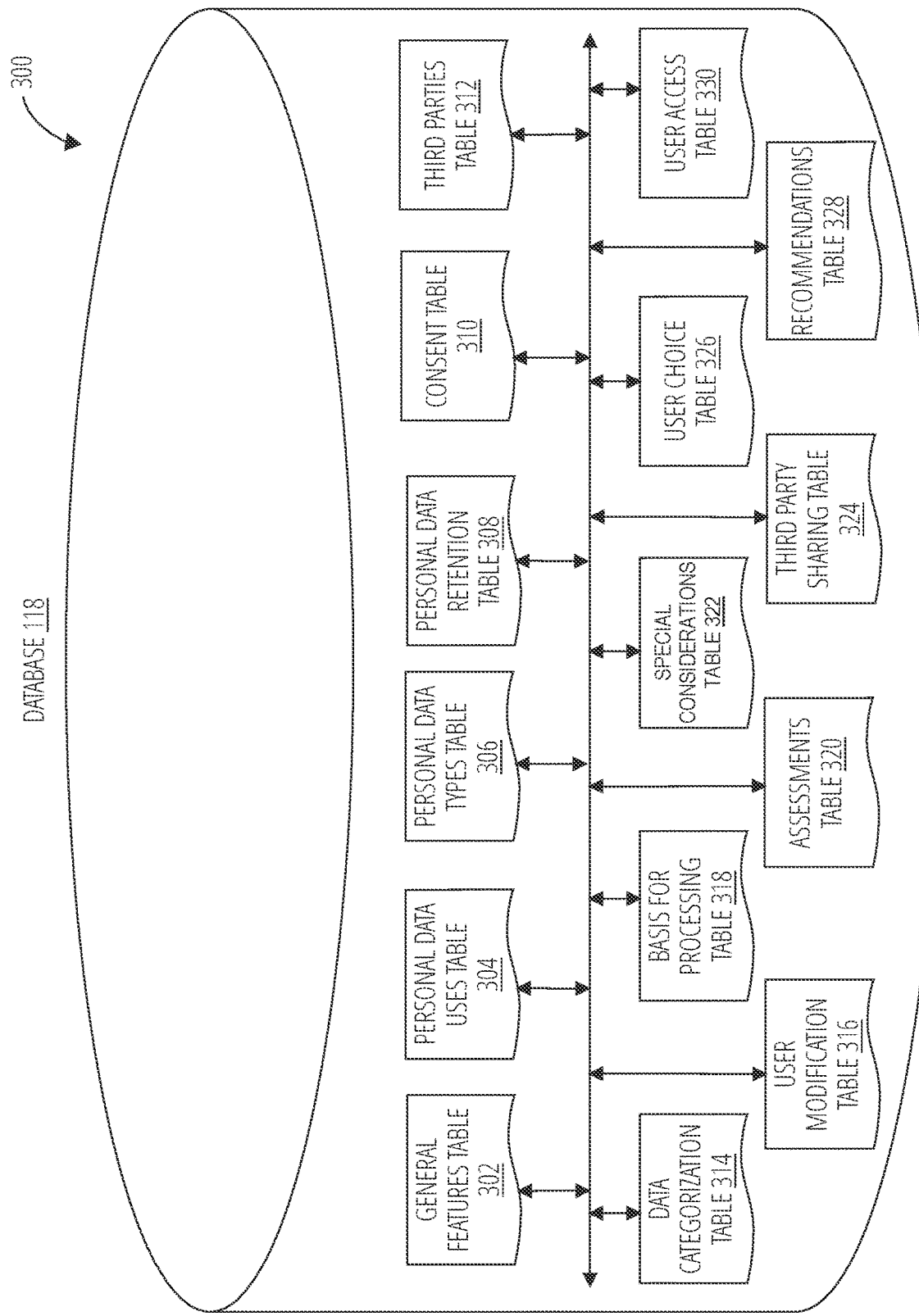
FIG. 3 is a diagrammatic representation of data structures as maintained in a database, in accordance with some example embodiments.

FIG. 3 is a schematic diagram illustrating data structures 300 which may be stored in the database 118 of the compliance server system 104, according to certain example embodiments. While the content of the database 118 is shown to comprise a number of tables, it will be appreciated that the data could be stored in other types of data structures (e.g. as an object-oriented database). The data may be stored in a structured format (e.g., as structured information). The database 118 includes a set of first set of tables 302-312 corresponding to the data specification system 202, and a second set of tables 314-330 corresponding to the privacy review system 204.

With respect to the data specification system 202, the tables 302-312 are configured to store values (e.g., user-submitted and/or accessed from a data store) corresponding to personal data intended for use by the product/process. As shown in the example of FIG. 3, these tables include: a general features table 302 storing values relating to basic and/or general features of a product/process; a personal data uses table 304 storing values relating to uses of personal data by the product/process; a personal data types table 306 storing values relating to types of personal data used by the product/process; a personal data retention table 308 storing values related to retention procedure(s) for personal data; a consent table 310 storing values related to consent procedure(s) for personal data; and a third parties table 312 storing values related to third parties with access to the personal data.

Regarding the privacy review system 204, the tables 314-330 are configured to store values (e.g., user-submitted and/or accessed from a data store) corresponding to privacy compliance of the product or process with respect to the personal data. As shown in the example of FIG. 3, these tables include: a data categorization table 314 storing values related to categorizing personal data with respect to compliance; a user modification table 316 storing values related to modifying (e.g., deleting and/or correcting) personal data with respect to compliance; a basis for processing table 318 storing values related to at least one basis for processing personal data with respect to compliance; an assessments table 320 storing values related to one or more assessments regarding use of personal data with respect to compliance; a special considerations table 322 storing values related to special considerations with respect to compliance; a third party sharing table 324 storing values related to third party interactions regarding personal data with respect to compliance; a user choice table 326 storing values related to user choice/consent regarding use of personal data with respect to compliance; a recommendations table 328 storing values related to recommendations and/or considerations regarding use of personal data with respect to compliance; and a user access table 330 storing values related to access and portability of personal data with respect to compliance.

Figure 4:
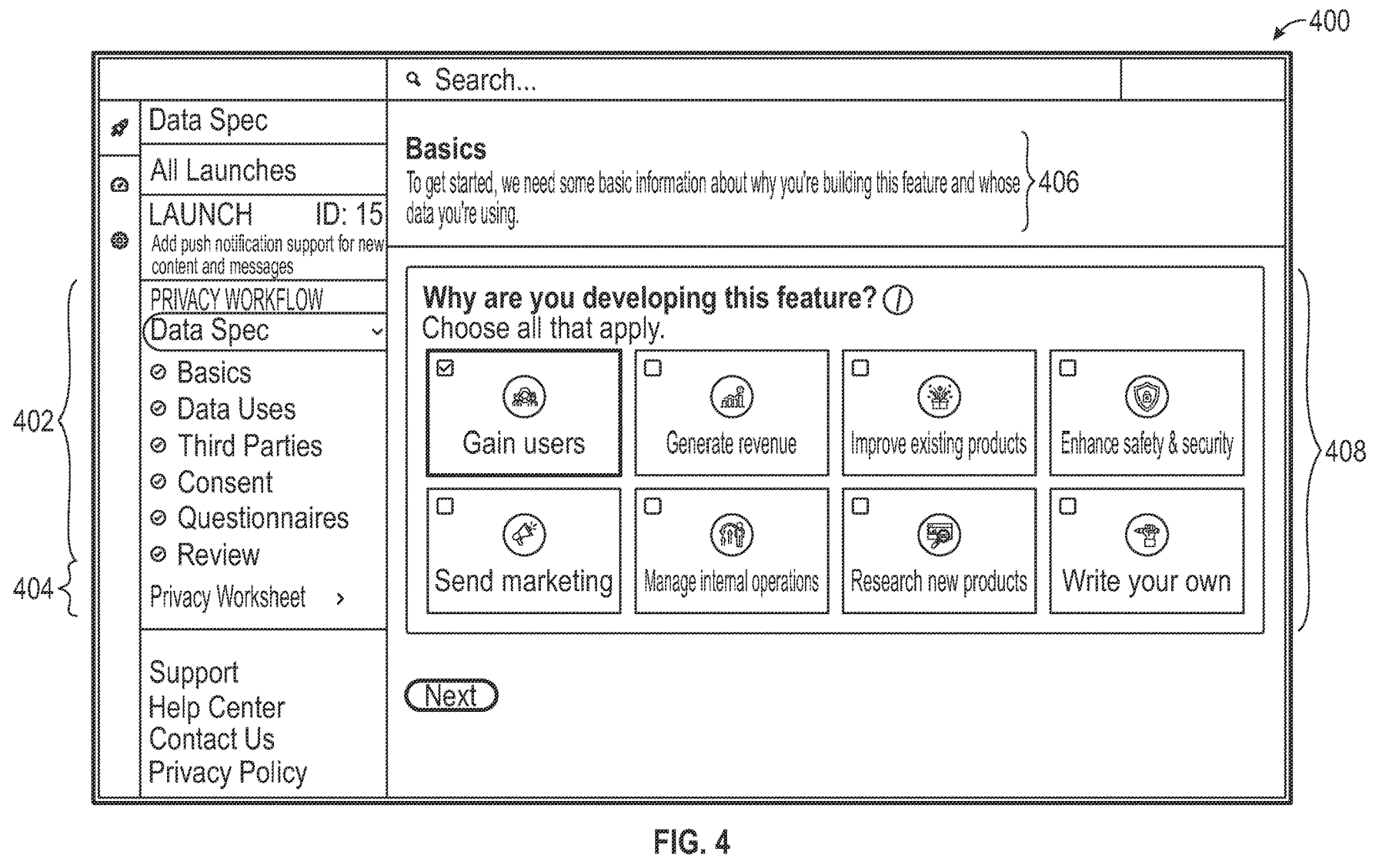

FIG. 4 illustrates a data specification (user interface) UI 400 with user-selectable elements for specifying basic feature(s) of a product/process, in accordance with some example embodiments. In one or more embodiments, the data specification UI 400 includes user-selectable data specification categories 402, as well as user-selectable privacy review categories 404.

As shown in the example of FIG. 4, and subsequently in FIGS. 5-40, the example feature of the product/process relates to adding push notification support for new content and messages. However, the compliance system 100 is not limited to this example feature. It should be noted that the compliance system 100c can be used with respect to another individual feature provided by a product/process, and/or a collection of features provided by the product/process.

In one or more embodiments, each of the data specification categories 402 and the privacy review categories 404 may include multiple categories, each of which is user selectable to provide a respective questionnaire and/or interface requesting input from a user. The data specification categories 402 may include questions for presenting to a first type of user, and the privacy review categories 404 may include different questions for presenting to a second type of user. The first type of user may be a project manager, engineer and/or other employee or contractor responsible or otherwise having knowledge of the personal data intended for use with respect to a feature (e.g., of a product/process). On the other hand, the second type of user may be someone having responsibility for compliance (e.g., a lawyer, compliance officer and/or other employee) with respect to personal data.

As shown in the example of FIG. 4, the data specification categories 402 include the following categories, each of which is user-selectable to provide a corresponding user interface for user input of values (e.g., responses to questions) to store with respect to the tables 302-312 of FIG. 3: basics (e.g., for storing values with respect to the general features table 302); data uses (e.g., for storing values with respect to the personal data uses table 304, the personal data types table 306 and/or the personal data retention table 308); third parties (e.g., for storing values with respect to the third parties table 312); consent (e.g., for storing values with respect to the consent table 310); questionnaires and review (e.g., where custom, user-generated questions can be integrated into the workflow). It is noted that FIG. 4 illustrates an example embodiment of categories included in the data specification categories 402, and that additional, fewer and/or different categories may be used in alternate embodiments.

As depicted and discussed below with respect to FIG. 11, the privacy review categories 404 may also include several categories, each of which is user-selectable to provide a corresponding user interface for user selection of values to store with respect to the tables 314-330. In the example of FIG. 4, the categories are displayed in a collapsed state. This collapsed state may be expanded in response to user selection of an interface element (e.g., the chevron interface element ">") depicted alongside the privacy review categories 404.

The data specification UI 400 corresponds to when a user has selected the "basics" category within the data specification categories 402. In response to such selection, the compliance client 108 (e.g., in conjunction with the compliance server system 104) provides for display of a general features header 406 and general features question(s) 408. In one or more embodiments, the general features header 406 provides a brief description regarding basic information for product/process feature(s).

With respect to the general features question(s) 408, the compliance client 108 may display a questionnaire (or other type of interface) prompting the user for input regarding a purpose/reason for developing the feature(s) of the product/process. The compliance client 108 may receive user input, and save corresponding values (e.g., in the form of structured information) within the general features table 302. In the example of FIG. 4, the user can select one of more of the following options as the purpose/reason for developing the feature(s): gaining users, generating revenue, improving existing products, enhancing safety and security, sending marketing information, managing internal operations, researching new products, or a customized reason/purpose (e.g., "write your own").

User selection of a particular option may cause the compliance client 108 to prompt the user with additional questions/interfaces for additional information regarding the selected option. For example, user selection of the option "gain users" may cause the compliance client 108 to prompt the user (e.g., via question and/or text input box) for additional comments and/or user-provided links regarding the reason for the feature. Moreover, this additional question, or a variant thereof, may be presented in response to any other selected options(s) (e.g., instead of or in addition to the "gain users" option).

It is noted that the categories, questions, candidate responses, options and/or other interface elements discussed above with respect to FIG. 4 correspond to an example embodiment. A different arrangement of categories, questions, candidate responses, options and/or other interface elements (e.g., including real-time, inline help and recommendations) may be used in alternate embodiments.

Moreover, while the above-described elements are described as being user-selected, user-selectable or user-specified, the compliance system 100 is not limited to such types of responses. As an alternative or supplement to user-submitted responses, the responses as described herein may be based on values accessed from a data store (e.g., by scanning a customer system database).

Figure 5:
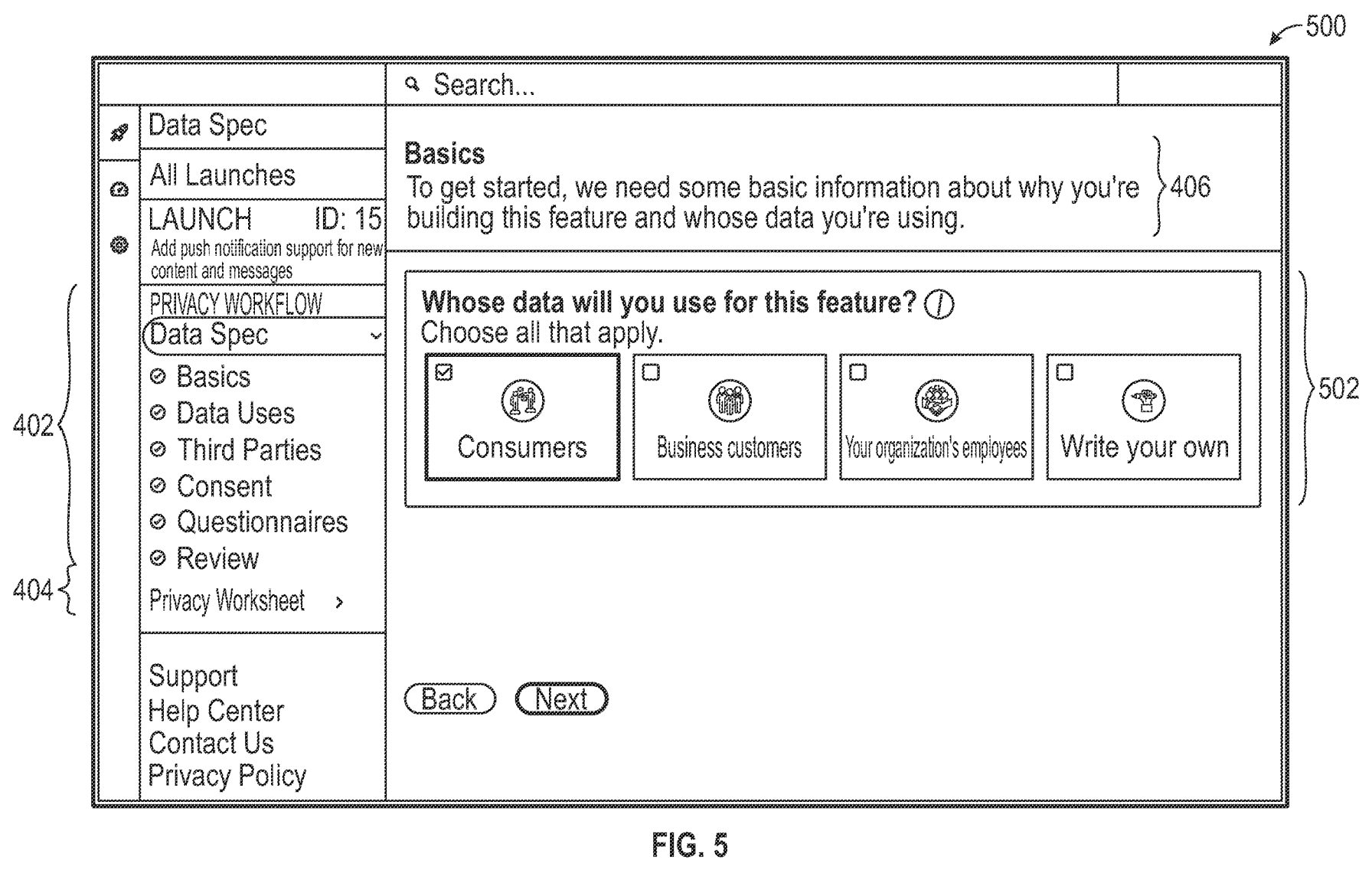

FIG. 5 illustrates a data specification UI 500 with user-selectable elements for specifying additional basic features of a product/process, in accordance with some example embodiments. In addition to the questions related to the reason(s)/purpose(s) for developing the feature per FIG. 4, the data specification UI 500 of FIG. 5 includes additional general features question(s) 502. For example, the additional general features question(s) 502 may be presented, together with the general features header 406, following user completion of the questions presented in FIG. 4.

As shown in FIG. 5, the additional general features question(s) 502 prompt the end user to select one or more types of individuals, from a set of candidate types of individuals, whose data will be used for a particular feature (e.g., adding push notification support for new content and messages). The compliance client 108 may receive user input, and save corresponding values (e.g., in the form of structured information) within the general features table 302. In this example, the set of candidate types of individuals include consumers (e.g., with respect to the feature), business customers, employees, and/or another type of individual that can be specified by the end user (e.g., "write your own").

While not shown in FIG. 5, user selection of a particular option may cause the compliance client 108 to display additional interface element(s) corresponding to additional question(s). It is noted that the categories, questions, candidate responses, options and/or other interface elements discussed above with respect to FIG. 5 correspond to an example embodiment. A different arrangement of categories, questions, candidate responses, options and/or other interface elements (e.g., including real-time, inline help and recommendations) may be used in alternate embodiments.

Moreover, while the above-described elements are described as being user-selected, user-selectable or user-specified, the compliance system 100 is not limited to such types of responses. As an alternative or supplement to user-submitted responses, the responses as described herein may be based on values accessed from a data store (e.g., by scanning a customer system database).

Figure 6:
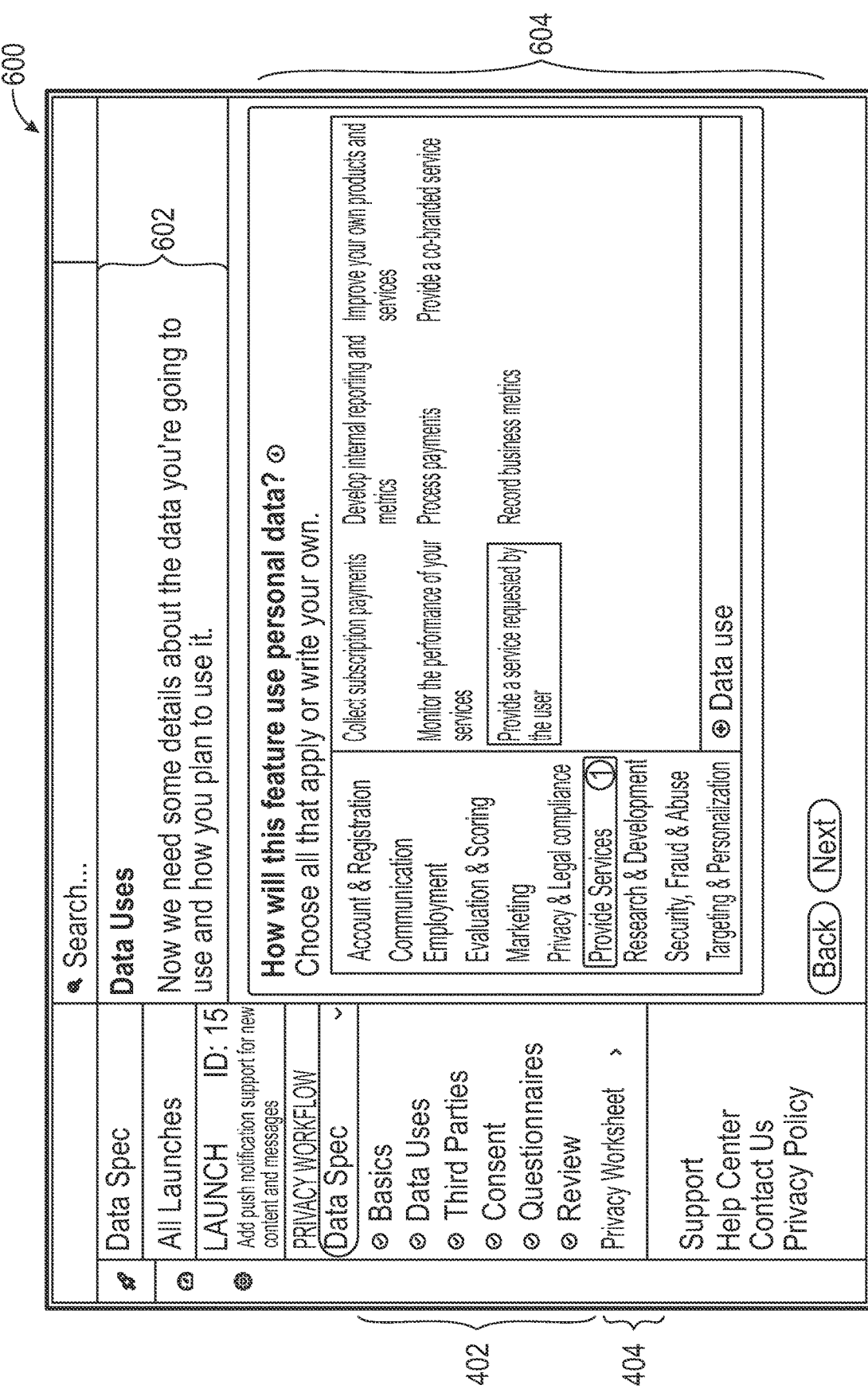
FIG. 6 illustrates a data specification UI with user-selectable elements for specifying intended uses of personal data by a product/process, in accordance with some example embodiments.

FIG. 6 illustrates a data specification UI 600 with user-selectable elements for specifying intended uses of personal data by a product/process (e.g., or feature(s) thereof), in accordance with some example embodiments. In one or more embodiments, the data specification UI 600 corresponds to when a user selects the "data uses" category within the data specification categories 402. In response to such selection, the compliance client 108 (e.g., in conjunction with the compliance server system 104) provides for display of a personal data uses header 602 and personal data uses question(s) 604. The personal data uses header 602 provides a brief description regarding the intended uses of personal data by the product/process.

With respect to the personal data uses question(s) 604, the compliance client 108 may display a questionnaire (or other type of interface) prompting the user for input regarding how the feature (e.g., adding push notification support for new content and messages) intends to use personal data. The compliance client 108 may receive user input, and save corresponding values (e.g., in the form of structured information) within the personal data uses table 304. The user can navigate between one or more categories, with each category including user-selectable options.

In one or more embodiments, the personal data uses question(s) 604 are based at least in part on the personal data uses taxonomy 208. As described above with respect to FIG. 2, the personal data uses taxonomy 208: defines categories (e.g., and subcategories) relating to intended uses of personal data; includes an identifier (e.g., to identify the specific data use), a description, common data, and/or a risk data associated with each use; and is usable by the data specification system 202 to generate user interfaces (e.g., including categories, questions, candidate responses and/or other information) prompting a user for input regarding the intended uses.

In one or more embodiments, the personal data uses question(s) 604 are based in part on template question language which includes placeholders for the above taxonomy information. Thus, the personal data uses question(s) 604 may correspond to a workflow that is automatically derived from the personal data uses taxonomy 208. Moreover, questions (e.g., branching questions) and/or other interface elements may be dynamically presented based on real-time input provided by the user.

In the example of FIG. 6, the personal data uses question(s) 604 include an "account and registration" category, which if selected by the user, presents corresponding options (not shown) for user selection. For example, the user may select one or more corresponding options including: register or maintain an account, create or maintain a public profile, record acceptance of the terms of service (TOS) or other agreements, and/or record user preferences.

The personal data uses question(s) 604 further include a "communication" category, which if selected by the user, presents corresponding options (not shown) for user selection. For example, the user may select one or more corresponding options including: respond to customer service inquiries, send transactional email or make transactional calls, provide customer support, and/or solicit customer feedback.

The personal data uses question(s) 604 further include an "employment" category, which if selected by the user, presents corresponding options (not shown) for user selection. For example, the user may select one or more corresponding options including: determine employment eligibility, enforce network security policies, manage employee devices, and provide security credentials.

The personal data uses question(s) 604 further include an "evaluation and scoring" category, which if selected by the user, presents corresponding options (not shown) for user selection. For example, the user may select one or more corresponding options including: determine creditworthiness and evaluate trustworthiness.

The personal data uses question(s) 604 further include a "marketing" category, which if selected by the user, presents corresponding options (not shown) for user selection. For example, the user may select one or more corresponding options including: send email newsletters and promotional materials, offer sweepstakes or contests, make marketing phone calls or send marketing texts, and/or mail newsletters and promotional materials.

The personal data uses question(s) 604 further include a "privacy and legal compliance" category, which if selected by the user, presents corresponding options (not shown) for user selection. For example, the user may select one or more corresponding options including: respond to legal process, and/or protect your company, other users, or the general public.

The personal data uses question(s) 604 further include a "provide services" category, which if selected by the user, presents corresponding options for user selection. As shown in the example of FIG. 6, the user may select one or more corresponding options including: collect subscription payments, process payments, provide a service requested by the user, provide a co-branded service, develop internal reporting and metrics, improve your own products and services, record business metrics, and/or monitor the performance of your services.

The personal data uses question(s) 604 further include a "research and development" category, which if selected by the user, presents corresponding options (not shown) for user selection. For example, the user may select one or more corresponding options including: develop new products and services, develop machine learning models, and/or create public data sets.

The personal data uses question(s) 604 further include a "security, fraud and abuse" category, which if selected by the user, presents corresponding options (not shown) for user selection. For example, the user may select one or more corresponding options including: authenticate users, and/or detect or prevent fraud and abuse.

The personal data uses question(s) 604 further include a "targeting and personalization" category, which if selected by the user, presents corresponding options (not shown) for user selection. For example, the user may select one or more corresponding options including: target advertising on your own services, target advertising on third-party services, recommend content on your own services, recommend content on third-party services, build interest profiles, and/or build look-a-like profiles.

In one or more implementations, the compliance system 100 may provide for users to define their own categories (e.g., custom categories). In addition, the user may add custom data types and data uses to any category.

As noted above, the personal data uses taxonomy 208 of the data specification system 202 may assign a risk score (e.g., level) for one or more of the intended uses selected by the end user. As discussed below, it is possible for the compliance client 108 (in conjunction with the compliance server system 104) to flag and/or otherwise indicate potential risks with respect to intended uses of the personal data by the product/process (e.g., or feature(s) thereof).

It is noted that the categories, questions, candidate responses, options and/or other interface elements discussed above with respect to FIG. 6 correspond to an example embodiment. A different arrangement of categories, questions, candidate responses, options and/or other interface elements (e.g., including real-time, inline help and recommendations) may be used in alternate embodiments.

Moreover, while the above-described elements are described as being user-selected, user-selectable or user-specified, the compliance system 100 is not limited to such types of responses. As an alternative or supplement to user-submitted responses, the responses as described herein may be based on values accessed from a data store (e.g., by scanning a customer system database).

FIG. 7 illustrates a data specification UI 700 with user-selectable elements for specifying types of personal data intended for use by a product/process, in accordance with some example embodiments. In addition to the intended uses of personal data per FIG. 6, the data specification UI 700 of FIG. 7 includes a personal data types header 702, personal data types question(s) 704 and personal data retention question(s) 706. For example, the personal data types header 702 may be presented, together with the personal data types question(s) 704 and personal data retention question(s) 706, following user completion of the questions presented in FIG. 6. The personal data types header 702 provides a brief description regarding the types of personal data intended for use by the product/process.

With respect to the personal data types question(s) 704, the compliance client 108 may display a questionnaire (or other type of interface) prompting the user for input on the types of personal data intended for use with respect to the feature (e.g., adding push notification support for new content and messages). The compliance client 108 may receive user input, and save corresponding values (e.g., in the form of structured information) within the personal data types table 306. The user can navigate between one or more categories, with each category including user-selectable options.

In one or more embodiments, the personal data types question(s) 704 are based at least in part on the personal data types taxonomy 210. As described above with respect to FIG. 2, the personal data types taxonomy 210: defines categories (e.g., and subcategories) relating to types of personal data intended for use; includes an identifier (e.g., to identify the specific data type), a description, a suggested retention (e.g., time period and/or action to perform after the time period), and/or a risk data for each data type; and is usable by the data specification system 202 to generate user interfaces (e.g., including categories, questions, candidate responses and/or other information) prompting a user for input regarding the intended data types.

In one or more embodiments, the personal data types question(s) 704 are based in part on template question language which includes placeholders for the above taxonomy information. Thus, the personal data types question(s) 704 may correspond to a workflow that is automatically derived from the personal data types taxonomy 210. Moreover, questions (e.g., branching questions) and/or other interface elements may be dynamically presented based on real-time input provided by the user.

In the example of FIG. 7, a first category for the personal data types question(s) 704 is depicted as "analytics and usage data," from which the user may select one or more options. For example, the options include: on-platform activity, off-platform activity, and/or video viewing history.

The personal data types question(s) 704 further includes a "demographics and characteristics" category, which if selected by the user, presents corresponding options (not shown) for user selection. For example, the user may select one or more corresponding options (e.g., personal data types) including: age, date of birth, gender identity, height, weight, hair color, eye color, skin tone, tattoos and piercings, marital status, nationality, race or ethnic origin, geographic residency, languages spoken, dialects and accents, religion, education, biometric data, employment status, occupation, income, sexual preferences or proclivities, political affiliation, philosophical beliefs, trade union membership, and/or political opinions or beliefs.

The personal data types question(s) 704 further includes a "device information" category, which if selected by the user, presents corresponding options (not shown) for user selection. For example, the user may select one or more corresponding options (e.g., personal data types) including: IP address, cookie ID, device identifiers, and/or MAC address.

The personal data types question(s) 704 further includes a "health" category, which if selected by the user, presents corresponding options (not shown) for user selection. For example, the user may select one or more corresponding options including: diagnosis, prescription, health insurance id, insurance claim history, genetic information, physical or mental health history, family health history, past or current treatments, and/or sexual history.

The personal data types question(s) 704 further includes an "identifiers" category, which if selected by the user, presents corresponding options (not shown) for user selection. For example, the user may select one or more corresponding options (e.g., personal data types) including: real name, initials, username, advertising identifier, email address, address, government-issued ID, and/or phone number.

The personal data types question(s) 704 further includes a "location" category, which if selected by the user, presents corresponding options (not shown) for user selection. For example, the user may select one or more corresponding options (e.g., personal data types) including: precise location, coarse location, zip, designated market area (DMA), city, state, and/or country.

The personal data types question(s) 704 further includes a "payment and financial data" category, which if selected by the user, presents corresponding options (not shown) for user selection. For example, the user may select one or more corresponding options (e.g., personal data types) including: payment card information, pin, card verification value (CVV), financial account number, transaction data, credit history, purchase history, spending habits, car ownership, and/or home ownership.

The personal data types question(s) 704 further includes a "personal and profile" category, which if selected by the user, presents corresponding options (not shown) for user selection. For example, the user may select one or more corresponding options including: job title, work history, schools attended, employment records, family, relationship status or history, friends, mother's maiden name, password, and/or profile picture.

The personal data types question(s) 704 further includes a "personalization" category, which if selected by the user, presents corresponding options (not shown) for user selection. For example, the user may select one or more corresponding options (e.g., personal data types) including: inferred interests, and/or declared interests.

The personal data types question(s) 704 further includes a "social" category, which if selected by the user, presents corresponding options (not shown) for user selection. For example, the user may select one or more corresponding options including: address book and/or social relationships.

The personal data types question(s) 704 further includes a "user-generated content" category, which if selected by the user, presents corresponding options (not shown) for user selection. For example, the user may select one or more corresponding options (e.g., personal data types) including: photos, videos, and/or text.

In one or more implementations, the compliance system 100 may provide for users to define their own categories (e.g., custom categories). In addition, the user may add custom data types and data uses to any category.

As noted above, the data specification UI 700 of FIG. 7 further includes personal data retention question(s) 706 prompting the user to specify retention procedures relating to the types of personal data. The compliance client 108 may receive user input, and save corresponding values (e.g., in the form of structured information) within the personal data retention table 308. In one or more embodiments, suggested responses to one or more of the personal data retention question(s) 706 may be prepopulated (e.g., based on the suggested retention values in the personal data uses taxonomy 208 and/or personal data types taxonomy 210) while still being editable by the end user.

In the example of FIG. 7, the user has selected the "analytics and usage data" category within the personal data types question(s) 704, and has further selected the corresponding "on-platform activity" option. In response to such selection, the compliance client 108 is configured to display the personal data retention question(s) 706.

The personal data retention question(s) 706 include user-selectable interface elements for the user to specify, for each of the selected personal data types, a retention time period, an action to perform after expiration of the retention time period, and a source (e.g., the data source from which the personal data is provided). The example of FIG. 7 illustrates the personal data retention question(s) 706 with respect to the personal data types of "device identifier" and "physical on-platform activity." However, the compliance client 108 may present the personal data retention question(s) 706 with respect to any/all of the personal data types selected by the user.

In one or more embodiments, the retention time period may be set via user-selectable interface elements for setting time periods (e.g., where the user selects a number of hour(s), week(s), month(s), and/or year(s)). Alternatively or in addition, the retention time period may be set to expire via user selectable interface elements for setting one or more of: a specific day/time to expire, an option to expire when the user account expires, an option to retain the data for an indefinite amount of time, and/or other suitable options. In addition, the action to perform after expiration of the time period may have predefined options to select from. For example, the user may select to delete, de-identify, or aggregate the particular type of personal data upon expiration of the specified retention time period.

Moreover, the source may include the following options: provided by individuals, inferred or created by my organization, provided by a third party, and/or purchased from a third party.

As noted above, the personal data types taxonomy 210 of the data specification system 202 may assign a risk score (e.g., level) for one or more of the intended data types selected by the end user. As discussed below, it is possible for the compliance client 108 (in conjunction with the compliance server system 104) to flag and/or otherwise indicate potential risks with respect to the intended data types used by the product/process (e.g., or feature(s) thereof).

It is noted that the categories, questions, candidate responses, options and/or other interface elements discussed above with respect to FIG. 7 correspond to an example embodiment. A different arrangement of categories, questions, candidate responses, options and/or other interface elements (e.g., including real-time, inline help and recommendations) may be used in alternate embodiments.

Moreover, while the above-described elements are described as being user-selected, user-selectable or user-specified, the compliance system 100 is not limited to such types of responses. As an alternative or supplement to user-submitted responses, the responses as described herein may be based on values accessed from a data store (e.g., by scanning a customer system database).

FIG. 8 illustrates a data specification UI 800 with user-selectable elements for specifying consent procedures for personal data intended for use by a product/process (e.g., or feature(s) thereof), in accordance with some example embodiments. In one or more embodiments, the data specification UI 800 corresponds to when a user selects the "consent" category within the data specification categories 402. In response to such selection, the compliance client 108 (e.g., in conjunction with the compliance server system 104) provides for display of a consent header 802 and consent question(s) 804. The consent header 802 provides a brief description regarding user consent procedures.

Regarding the consent question(s) 804, the compliance client 108 may display a questionnaire (or other type of interface) prompting the user for input on the consent procedures for personal data with respect to the feature (e.g., adding push notification support for new content and messages). The compliance client 108 may receive user input, and save corresponding values (e.g., in the form of structured information) within the consent table 310.

As shown in the example of FIG. 8, the consent question(s) 804 may relate to whether the end user will be asked to consent for each data type (e.g., asking a user for their consent before collecting precise location, contacts, etc.). Additional questions (not shown) may relate to what information does the consent mechanism provide to the user (e.g., and prompting the user for screenshots, if any), how the consent mechanism works, and/or how a user may withdraw consent.

It is noted that the categories, questions, candidate responses, options and/or other interface elements discussed above with respect to FIG. 8 correspond to an example embodiment. A different arrangement of categories, questions, candidate responses, options and/or other interface elements (e.g., including real-time, inline help and recommendations) may be used in alternate embodiments.

Moreover, while the above-described elements are described as being user-selected, user-selectable or user-specified, the compliance system 100 is not limited to such types of responses. As an alternative or supplement to user-submitted responses, the responses as described herein may be based on values accessed from a data store (e.g., by scanning a customer system database).

Figure 9:
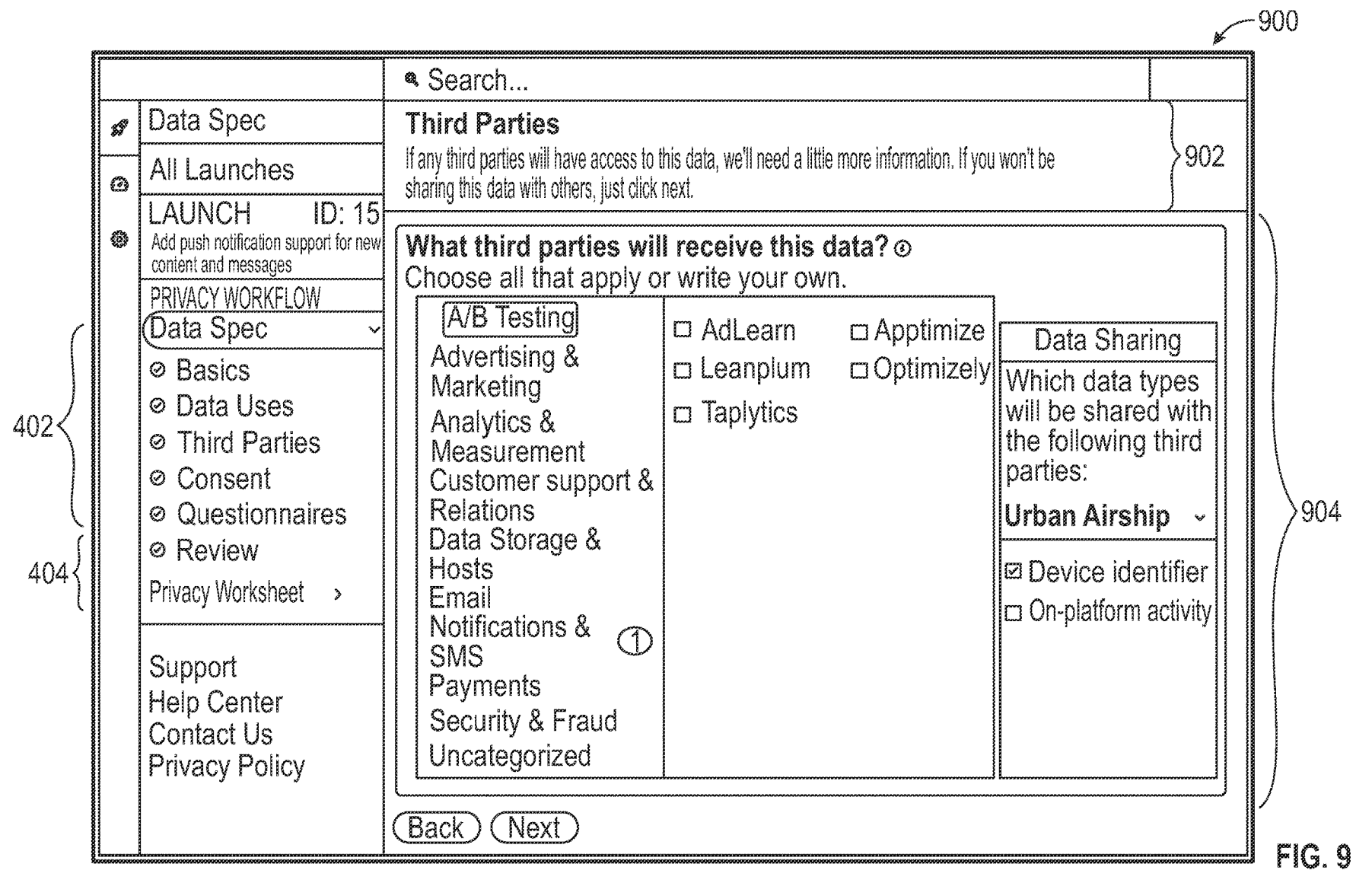

FIG. 9 illustrates a data specification UI 900 with user-selectable elements for identifying third parties that receive personal data intended for use by a product/process (e.g., or feature(s) thereof), in accordance with some example embodiments. In one or more embodiments, the data specification UI 900 corresponds to when a user selects the "third parties" category within the data specification categories 402. In response to such selection, the compliance client 108 (e.g., in conjunction with the compliance server system 104) provides for display of a third parties header 902 and third parties question(s) 904. The third parties header 902 provides a brief description regarding third party interactions regarding personal data.

With respect to the third parties question(s) 904, the compliance client 108 may display a questionnaire (or other type of interface) prompting the user for input on third party interactions regarding personal data with respect to the feature (e.g., adding push notification support for new content and messages). The compliance client 108 may receive user input, and save corresponding values (e.g., in the form of structured information) within the third parties table 312. The user can navigate between one or more categories, with each category including user-selectable options.

In one or more embodiments, the third parties question(s) 904 are based at least in part on the third parties taxonomy 212. As described above with respect to FIG. 2, the third parties taxonomy 212: defines categories (e.g., and subcategories) for grouping third parties; includes a category name, and/or a third party name (e.g., for identifying the third party company/service) for each third party; and is usable by the data specification system 202 to generate user interfaces (e.g., including categories, questions, candidate responses and/or other information) prompting a user for input regarding third party interactions.

In one or more embodiments, the third parties question(s) 904 are based in part on template question language which includes placeholders for the above taxonomy information. Thus, the third parties question(s) 904 may correspond to a workflow that is automatically derived from the third parties taxonomy 212. Moreover, questions (e.g., branching questions) and/or other interface elements may be dynamically presented based on real-time input provided by the user.

In the example of FIG. 9, a first category is depicted as "A/B testing," from which the user may select one or more options corresponding to names of third party companies intended to receive the personal data. The user may further select what data types are shared with the selected third parties.

In addition, the third parties question(s) 904 include the categories of advertising and marketing, analytics and measurement, customer support and relations, data storage and hosts, email, notifications and SMS, payments, and security and fraud. Each of these categories may be user selectable to present corresponding options (not shown) corresponding to names of third party companies intended to receive the personal data.

It is noted that the categories, questions, candidate responses, options and/or other interface elements discussed above with respect to FIG. 9 correspond to an example embodiment. A different arrangement of categories, questions, candidate responses, options and/or other interface elements (e.g., including real-time, inline help and recommendations) may be used in alternate embodiments.

Moreover, while the above-described elements are described as being user-selected, user-selectable or user-specified, the compliance system 100 is not limited to such types of responses. As an alternative or supplement to user-submitted responses, the responses as described herein may be based on values accessed from a data store (e.g., by scanning a customer system database).

FIG. 10 illustrates a data specification UI 1000 for reviewing responses regarding personal data intended for use by a product/process, in accordance with some example embodiments. In one or more embodiments, the data specification UI 1000 corresponds to when a user selects the "review" category within the data specification categories 402. In response to such selection, the compliance client 108 (e.g., in conjunction with the compliance server system 104) provides for display of a data spec review header 1002 and data spec review response(s) 1004. The data spec review header 1002 provides a brief description regarding review of responses (e.g., user-submitted and/or access from a data store) to questions presented with respect to the data specification categories 402.

The example data spec review response(s) 1004 in FIG. 10 indicate the responses, per FIGS. 4-9, for the launch goal (e.g., "gain users"), whose data will be used for the feature (e.g., "consumers") and data use and retention (e.g., where the "data use and retention" section may also show data types, third party interaction and data sources). It is noted that the interface elements discussed above with respect to FIG. 10 correspond to an example embodiment. A different arrangement of interface elements may be used in alternate embodiments.

Moreover, while the above-described elements are described as being user-selected, user-selectable or user-specified, the compliance system 100 is not limited to such types of responses. As an alternative or supplement to user-submitted responses, the responses as described herein may be based on values accessed from a data store (e.g., by scanning a customer system database).

Figure 11:
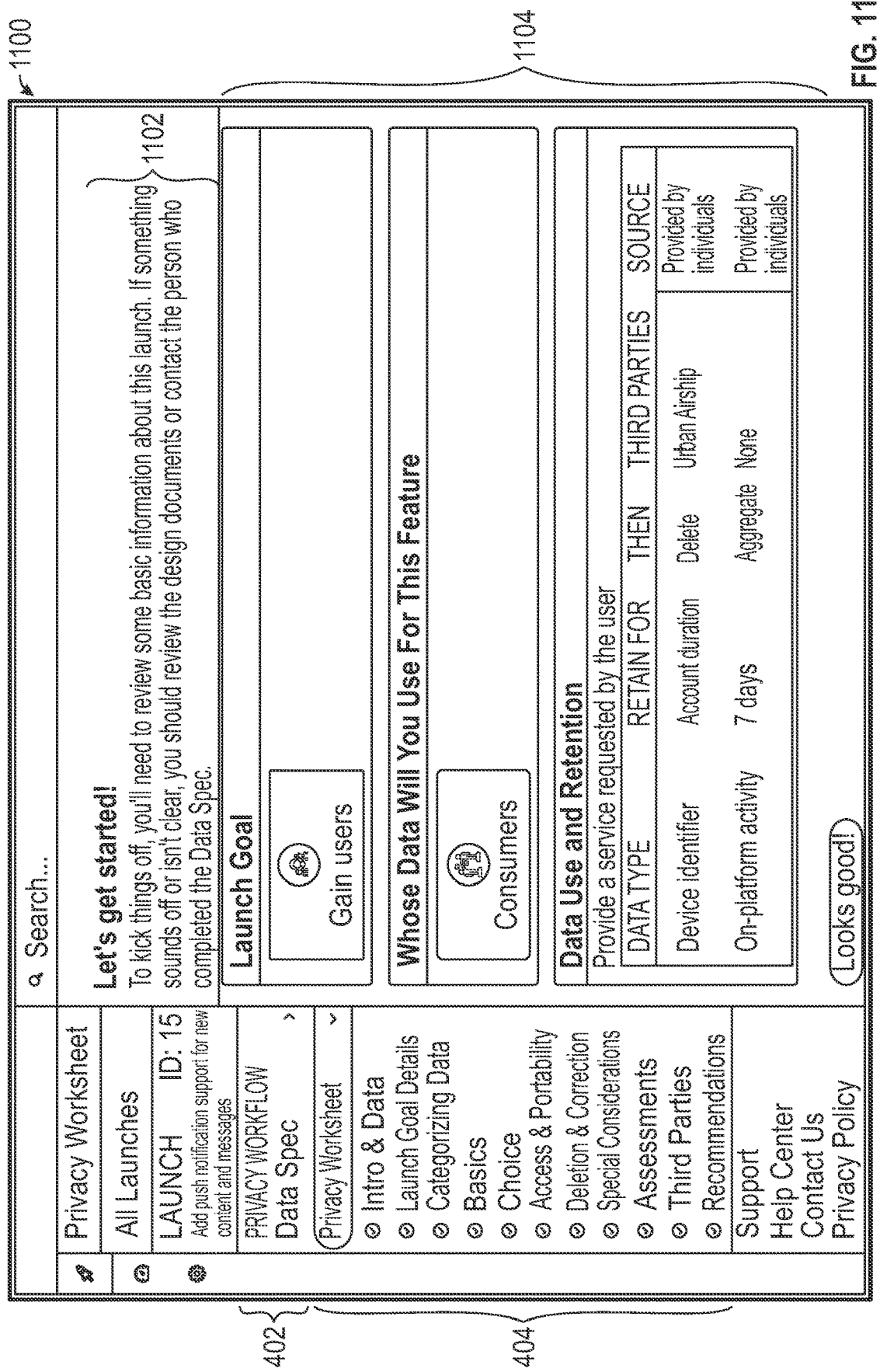
FIG. 11 illustrates a privacy review UI for providing an overview of how a product/process collects, uses, shares and/or retains data, in accordance with some example embodiments.

FIG. 11 illustrates a privacy review UI 1100 for providing an overview of how a product/process (e.g., or feature(s) thereof) collects, uses, shared and/or retains data, in accordance with some example embodiments. In one or more embodiments, the privacy review UT 1100 includes the user-selectable data specification categories 402 and the privacy review categories 404.

In the example of FIG. 11, the feature of the product/process relates to adding push notification support for new content and messages. However, the compliance system 100 is not limited to such a feature, and can be used with respect to another individual feature provided by a product/process and/or a collection of features provided by a product/process.

In the example of FIG. 11, the data specification categories 402 may be displayed in a collapsed state (e.g., which is expandable via user selection of the corresponding chevron element ">"). In addition, the privacy review categories 404 are displayed in an expanded state.

As noted above, the data specification categories 402 may include questions for presenting to a first type of user (e.g., project manager, engineer and/or other employee or contractor having knowledge of the personal data intended for use with respect to a feature), and the privacy review categories 404 may include different questions for presenting to a second type of user (e.g., someone having responsibility for compliance with respect to personal data). Thus, questions presented in association with the privacy review categories 404 may prompt the user (e.g., the second type of user) for input regarding various compliance requirements and/or considerations.

In one or more embodiments, the privacy review categories 404 include the following categories, each of which is user-selectable to provide a corresponding user interface for user selection of values to store with respect to the tables 314-330 of FIG. 3: introduction and data (e.g., providing an overview of responses to the questions presented with respect to the data specification categories 402); launch goal details; categorizing data (e.g., for storing values with respect to the data categorization table 314); basis (e.g., for storing values with respect to the basis for processing table 318); choice (e.g., for storing values with respect to the user choice table 326); access and portability (e.g., for storing values with respect to the user access table 330); deletion and correction (e.g., for storing values with respect to the user modification table 316); special considerations (e.g., for storing values with respect to the special considerations table 322); privacy impact assessments (e.g., for storing values with respect to the assessments table 320 such as LIA, DPIA or other assessments that may not correspond to any particular law); third parties (e.g., for storing values with respect to the third party sharing table 324); and/or recommendations/considerations (e.g., for storing values with respect to the recommendations table 328). It is noted that FIG. 11 illustrates an example embodiment of categories included in the privacy review categories 404, and that additional, fewer and/or different categories may be used in alternate embodiments.

The privacy review UI 1100 corresponds to when a user has selected the "introduction and data" category within the privacy review categories 404. In response to such selection, the compliance client 108 (e.g., in conjunction with the compliance server system 104) provides for display of a data spec summary header 1102 and data spec summary response(s) 1104. In one or more embodiments, the data spec summary header 1102 provides a brief description corresponding to an overview of responses to the questions presented with respect to the data specification categories 402.

As shown in the example of FIG. 11, the data spec summary response(s) 1104 indicates the responses (e.g., per FIGS. 4-10) for the following: launch goal (e.g., "gain users"), whose data will be used for the feature (e.g., "consumers") and data use and retention.

It is noted that the interface elements discussed above with respect to FIG. 11 correspond to an example embodiment. A different arrangement of interface elements may be used in alternate embodiments.

Moreover, while the above-described elements are described as being user-selected, user-selectable or user-specified, the compliance system 100 is not limited to such types of responses. As an alternative or supplement to user-submitted responses, the responses as described herein may be based on values accessed from a data store (e.g., by scanning a customer system database).

Figure 12:
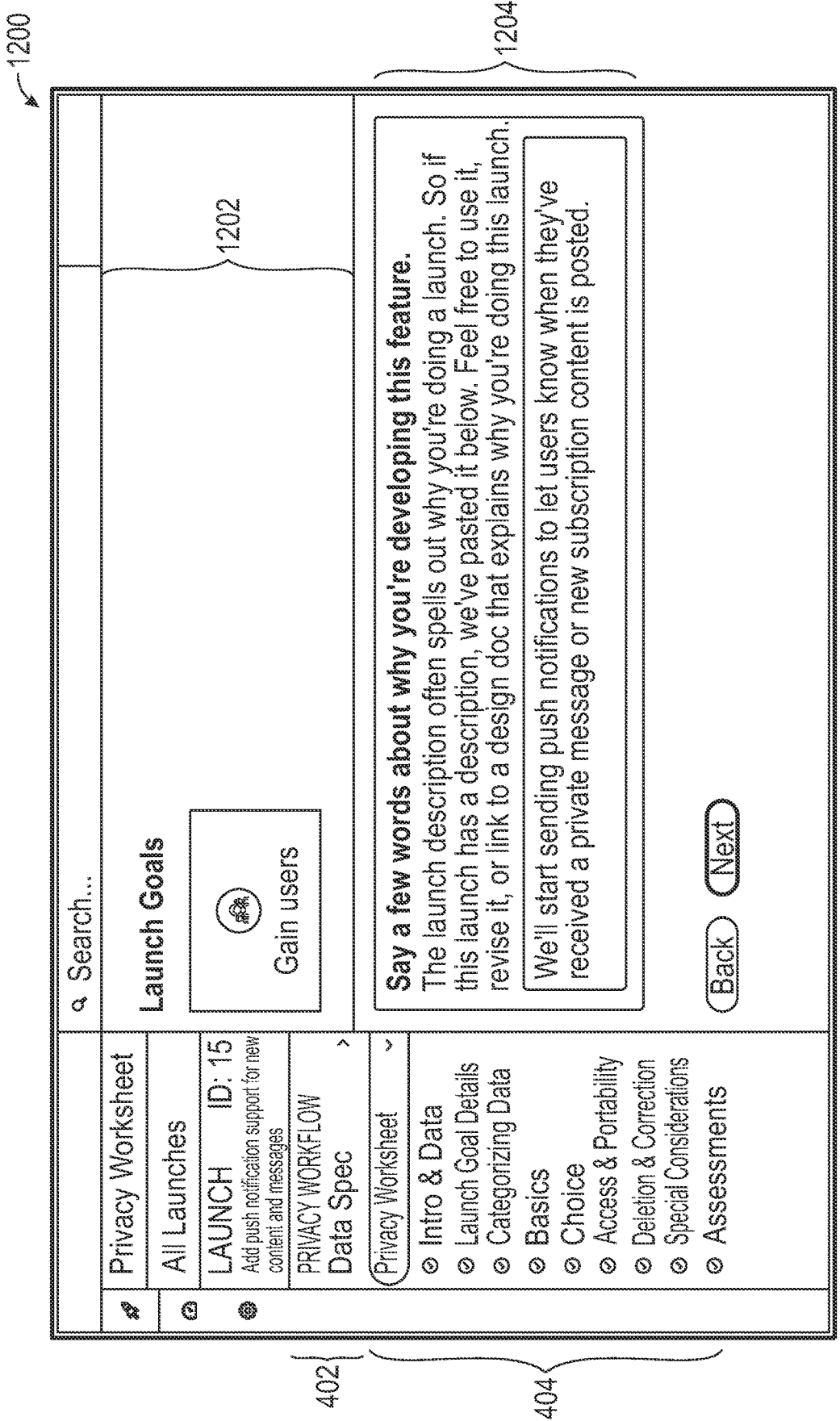
FIG. 12 illustrates a privacy review UI with user-selectable elements for specifying launch goals with respect to compliance, in accordance with some example embodiments.

FIG. 12 illustrates a privacy review UI 1200 with user-selectable elements for specifying launch goals with respect to compliance, in accordance with some example embodiments. In one or more embodiments, the privacy review UI 1200 corresponds to when a user selects the "launch goal details" category within the privacy review categories 404. In response to such selection, the compliance client 108 (e.g., in conjunction with the compliance server system 104) provides for display of a launch goals header 1202 and launch goals question(s) 1204. The launch goals header 1202 provides a brief description regarding launch goals.

With respect to the launch goals question(s) 1204, the compliance client 108 may display a questionnaire (or other type of interface) prompting the user for input regarding launch goals with respect to the feature (e.g., adding push notification support for new content and messages). The compliance client 108 may receive user input, and save corresponding values (e.g., in the form of structured information) within the general features table 302.

In the example of FIG. 12, the launch goal question(s) 1204 prompt the user regarding why the feature is being developed. For example, the user may be provided with an input box for the user to input text descri bing the launch goal.

It is noted that the categories, questions, candidate responses, options and/or other interface elements discussed above with respect to FIG. 12 correspond to an example embodiment. A different arrangement of categories, questions, candidate responses, options and/or other interface elements (e.g., including real-time, inline help and recommendations) may be used in alternate embodiments.

Moreover, while the above-described elements are described as being user-selected, user-selectable or user-specified, the compliance system 100 is not limited to such types of responses. As an alternative or supplement to user-submitted responses, the responses as described herein may be based on values accessed from a data store (e.g., by scanning a customer system database).

FIG. 13 illustrates a privacy review UI 1300 with user-selectable elements for categorizing personal data with respect to compliance, in accordance with some example embodiments. In one or more embodiments, the privacy review UI 1300 corresponds to when a user selects the "categorizing data" category within the privacy review categories 404. In response to such selection, the compliance client 108 (e.g., in conjunction with the compliance server system 104) provides for display of a data categorization header 1302 and data categorization question(s) 1304. The data categorization header 1302 provides a brief description regarding categorizing personal data.

With respect to the data categorization question(s) 1304, the compliance client 108 may display a questionnaire (or other type of interface) prompting the user for input to categorize the personal data with respect to compliance. The data categorization question(s) 1304 may be prepopulated and editable by the end user. The compliance client 108 may receive user input, and save corresponding values (e.g., in the form of structured information) within the data categorization table 314.

In one or more embodiments, it is possible for the data categorization question(s) 1304 are based at least in part on the personal data types taxonomy 210. As described above with respect to FIG. 2, the personal data types taxonomy 210 may define one or more categories for the types of personal data. Alternatively or in addition, the data categorization question(s) 1304 are based at least in part on user selection from a set of enumerated data categories (e.g., enumerated in the CCPA).

As noted above with respect to FIG. 7, the personal data types taxonomy 210 may define a first set of categories for sorting the different types of personal data. The first set of categories may include the following: analytics and usage data, demographics and characteristics, device information, health, identifiers, payment and financial data, personalization, social and/or user-generated content.

In one or more embodiments, the personal data types taxonomy 210 may further define a second set of categories with respect to compliance (e.g., categories corresponding to known compliance requirements). For example, the second set of categories may relate to compliance requirements associated with the California Consumer Privacy Act (CCPA). The second set of categories may include the following: biometric information, commercial information, education information, geolocation data, identifiers, inferred profile information, internet or other electronic network activity, physical characteristics or description, and/or professional or employment-related information.

Thus, while not comprehensively depicted in the figures, the categories, questions, candidate responses, options and/or other interface elements with respect to privacy review UI 1300 may be derived so as to match or otherwise correspond with the first set of categories and/or the second set of categories.

In one or more embodiments, the data categorization question(s) 1304 prompt the user for a respective category associated with one or more of the personal data types intended for use with respect to the feature (e.g., adding push notification support for new content and messages). In the example of FIG. 13, the user is prompted for a category with respect to the "device identifier" and "on-platform activity" data type. In one or more embodiments, the compliance client 108 is configured to suggest or prepopulate a category (e.g., "identifiers") based on the personal data types taxonomy 210 and/or the responses to questions from the data specification categories 402.

While not shown in the example of FIG. 13, the data categorization question(s) 1304 may further prompt the user for a respective category associated with one or more of the third parties that process personal data with respect to the feature. The compliance client 108 is configured to suggest a category based on personal data types taxonomy 210 and/or the responses to questions from the data specification categories 402.

It is noted that the categories, questions, candidate responses, options and/or other interface elements discussed above with respect to FIG. 13 correspond to an example embodiment. A different arrangement of categories, questions, candidate responses, options and/or other interface elements (e.g., including real-time, inline help and recommendations) may be used in alternate embodiments.

Moreover, while the above-described elements are described as being user-selected, user-selectable or user-specified, the compliance system 100 is not limited to such types of responses. As an alternative or supplement to user-submitted responses, the responses as described herein may be based on values accessed from a data store (e.g., by scanning a customer system database).

FIG. 14 illustrates a privacy review UI 1400 with user-selectable elements for specifying at least one basis for processing personal data with respect to compliance, in accordance with some example embodiments. In one or more embodiments, the privacy review UI 1400 corresponds to when a user selects the "basis" category within the privacy review categories 404. In response to such selection, the compliance client 108 (e.g., in conjunction with the compliance server system 104) provides for display of a basis for processing header 1402 and basis for processing question(s) 1404. The basis for processing header 1402 provides a brief description regarding the basis for processing personal data.

With respect to the basis for processing question(s) 1404, the compliance client 108 may display a questionnaire (or other type of interface) prompting the user for input regarding the basis for processing personal data with respect to the feature (e.g., adding push notification support for new content and messages). The compliance client 108 may receive user input, and save corresponding values (e.g., in the form of structured information) within the basis for processing table 318.

The basis for processing question(s) 1404 prompt the user for a respective basis for processing associated with one or more of the intended uses of personal data (e.g., depicted as "provide a service requested by the user" in FIG. 14). For example, the different options for the basis of processing may relate to compliance requirements associated with the General Data Protection Regulation (GDPR).

As shown in the example of FIG. 14, the different options for the basis for processing may include the following: consent; contractual necessity; legal obligation; legitimate interest; public task; and/or vital interest. FIG. 14 further depicts user input boxes for submitting comments and/or links related to one or more of the selected bases of processing.

For example, user input boxes and/or other interface elements for the "legitimate interest" basis may indicate one or more of the following: take responsibility for justifying the processing; identify the purpose/legal business interest for processing; no reasonable way to achieve interest without processing.

In another example, user input boxes and/or other interface elements for the "consent" basis may indicate one or more of the following: ongoing ability to provide/revoke consent; avoid a position of power where the individual has no choice (e.g., as an employer, goes to whether consent is freely given); avoid a precondition to service (freely given); affirmative act; clear and prominent; name controller, purpose for processing, and types of processing activity; withdraw consent at any time and provide notice (e.g., may not be a precondition of service); must be an affirmative act; must be clear, prominent, and separate from the TOS; include the name of the data controller(s) and the processing purposes and activities: be easily withdrawn at any time.

In another example, user input boxes and/or other interface elements for the "contractual necessity" basis may indicate one or more of the following: check if a contract is in place; processing data to carry out the contract or pre-contract request: processing is reasonably necessary to perform.

In another example, user input boxes and/or other interface elements for the "legal obligation" basis may indicate one or more of the following: comply with the law; point to legal obligation; no discretion; processing is reasonably necessary to comply.

In another example, user input boxes and/or other interface elements for the "vital interest" basis may indicate one or more of the following: to protect life; processing is reasonably necessary; other basis is not obviously available (e.g., consent).

It is noted that the categories, questions, candidate responses, options and/or other interface elements discussed above with respect to FIG. 14 correspond to an example embodiment. A different arrangement of categories, questions, candidate responses, options and/or other interface elements (e.g., including real-time, inline help and recommendations) may be used in alternate embodiments.

Moreover, while the above-described elements are described as being user-selected, user-selectable or user-specified, the compliance system 100 is not limited to such types of responses. As an alternative or supplement to user-submitted responses, the responses as described herein may be based on values accessed from a data store (e.g., by scanning a customer system database).

FIG. 15 illustrates a privacy review UI 1500 with user-selectable elements for specifying user choice regarding use of personal data with respect to compliance, in accordance with some example embodiments. In one or more embodiments, the privacy review UI 1500 corresponds to when a user selects the "choice" category within the privacy review categories 404. In response to such selection, the compliance client 108 (e.g., in conjunction with the compliance server system 104) provides for display of a user choice header 1502 and user choice question(s) 1504. The user choice header 1502 provides a brief description regarding user choice.

With respect to the user choice question(s) 1504, the compliance client 108 may display a questionnaire (or other type of interface) prompting the user for input regarding user choice for personal data with respect to the feature (e.g., adding push notification support for new content and messages). The compliance client 108 may receive user input, and save corresponding values (e.g., in the form of structured information) within the user choice table 326.

In the example of FIG. 15, the user choice question(s) 1504 prompt the user regarding revoking consent (e.g., listing out the different uses with yes/no options). Other questions (not shown) may relate to: whether individuals may opt out of this data collection or use (e.g., listing out the different types of data and processing activities with yes/no options); whether user consent is required for collecting or using the personal data (e.g., with an option allowing the user to upload a screenshot of the consent mechanism); how each third party will use personal data; and/or whether individuals can opt out of having their information processed by a third party (e.g., listing out each third party and the data they are processing with yes/no options for opt out and an input box to describe the relationship).

It is noted that the categories, questions, candidate responses, options and/or other interface elements discussed above with respect to FIG. 15 correspond to an example embodiment. A different arrangement of categories, questions, candidate responses, options and/or other interface elements (e.g., including real-time, inline help and recommendations) may be used in alternate embodiments.

Moreover, while the above-described elements are described as being user-selected, user-selectable or user-specified, the compliance system 100 is not limited to such types of responses. As an alternative or supplement to user-submitted responses, the responses as described herein may be based on values accessed from a data store (e.g., by scanning a customer system database).

FIG. 16 illustrates a privacy review UI 1600 with user-selectable elements for specifying access and portability of personal data with respect to compliance, in accordance with some example embodiments. In one or more embodiments, the privacy review UI 1600 corresponds to when a user selects the "access and portability" category within the privacy review categories 404. In response to such selection, the compliance client 108 (e.g., in conjunction with the compliance server system 104) provides for display of a user access header 1602 and user access question(s) 1604. The user access header 1602 provides a brief description regarding user access and portability.

With respect to the user access question(s) 1604, the compliance client 108 may display a questionnaire (or other type of interface) prompting the user for input regarding user access and portability with respect to the feature (e.g., adding push notification support for new content and messages). The compliance client 108 may receive user input, and save corresponding values (e.g., in the form of structured information) within the user access table 330.

In the example of FIG. 16, the user access question(s) 1604 prompt the user as to whether individuals may be provided with access to their personal data (e.g., a copy of the data), for example, for each type of personal data, and the extent to which individuals provide such data. In one or more embodiments, the user access question(s) 1604 may permit a user to export the personal data (e.g., to a different service).

It is noted that the categories, questions, candidate responses, options and/or other interface elements discussed above with respect to FIG. 16 correspond to an example embodiment. A different arrangement of categories, questions, candidate responses, options and/or other interface elements (e.g., including real-time, inline help and recommendations) may be used in alternate embodiments.

Moreover, while the above-described elements are described as being user-selected, user-selectable or user-specified, the compliance system 100 is not limited to such types of responses. As an alternative or supplement to user-submitted responses, the responses as described herein may be based on values accessed from a data store (e.g., by scanning a customer system database).

FIG. 17 illustrates a privacy review UI 1700 with user-selectable elements for specifying modification (deletion and correction) of personal data with respect to compliance, in accordance with some example embodiments. In one or more embodiments, the privacy review UI 1700 corresponds to when a user selects the "deletion and correction" category within the privacy review categories 404. In response to such selection, the compliance client 108 (e.g., in conjunction with the compliance server system 104) provides for display of a user modification header 1702 and user modification question(s) 1704. The user modification header 1702 provides a brief description regarding deletion and correction of personal data.

With respect to the user modification question(s) 1704, the compliance client 108 may display a questionnaire (or other type of interface) prompting the user for input regarding deletion and correction with respect to the feature (e.g., adding push notification support for new content and messages). The compliance client 108 may receive user input, and save corresponding values (e.g., in the form of structured information) within the user modification table 316.

In the example of FIG. 17, the user modification question(s) 1704 prompt the user whether the personal data may be deleted and/or corrected. The deletion and/or correction of personal data may be requested for each type of personal data.

It is noted that the categories, questions, candidate responses, options and/or other interface elements discussed above with respect to FIG. 17 correspond to an example embodiment. A different arrangement of categories, questions, candidate responses, options and/or other interface elements (e.g., including real-time, inline help and recommendations) may be used in alternate embodiments.

Moreover, while the above-described elements are described as being user-selected, user-selectable or user-specified, the compliance system 100 is not limited to such types of responses. As an alternative or supplement to user-submitted responses, the responses as described herein may be based on values accessed from a data store (e.g., by scanning a customer system database).

FIG. 18 illustrates a privacy review UI 1800 with user-selectable elements for specifying special considerations of personal data with respect to compliance, in accordance with some example embodiments. In one or more embodiments, the privacy review UI 1800 corresponds to when a user selects the "special considerations" category within the privacy review categories 404. In response to such selection, the compliance client 108 (e.g., in conjunction with the compliance server system 104) provides for display of a special considerations header 1802 and special considerations question(s) 1804. The special considerations header 1802 provides a brief description regarding special considerations of personal data.

With respect to the special considerations question(s) 1804, the compliance client 108 may display a questionnaire (or other type of interface) prompting the user for input regarding special considerations with respect to the feature (e.g., adding push notification support for new content and messages). The compliance client 108 may receive user input, and save corresponding values (e.g., in the form of structured information) within the special considerations table 322.

In the example of FIG. 18, the special considerations question(s) 1804 prompt the user with respect to one or more of: automated decisions that could significantly affect individuals; regularly monitoring of individuals; data on a large scale; combining data from different organizations or data that was originally collected for different purposes; individuals who require special considerations or care; and/or innovative new technology or use of data that poses novel risks or will be difficult for individuals to understand.

It is noted that the categories, questions, candidate responses, options and/or other interface elements discussed above with respect to FIG. 18 correspond to an example embodiment. A different arrangement of categories, questions, candidate responses, options and/or other interface elements (e.g., including real-time, inline help and recommendations) may be used in alternate embodiments.

Moreover, while the above-described elements are described as being user-selected, user-selectable or user-specified, the compliance system 100 is not limited to such types of responses. As an alternative or supplement to user-submitted responses, the responses as described herein may be based on values accessed from a data store (e.g., by scanning a customer system database).

Figure 19:
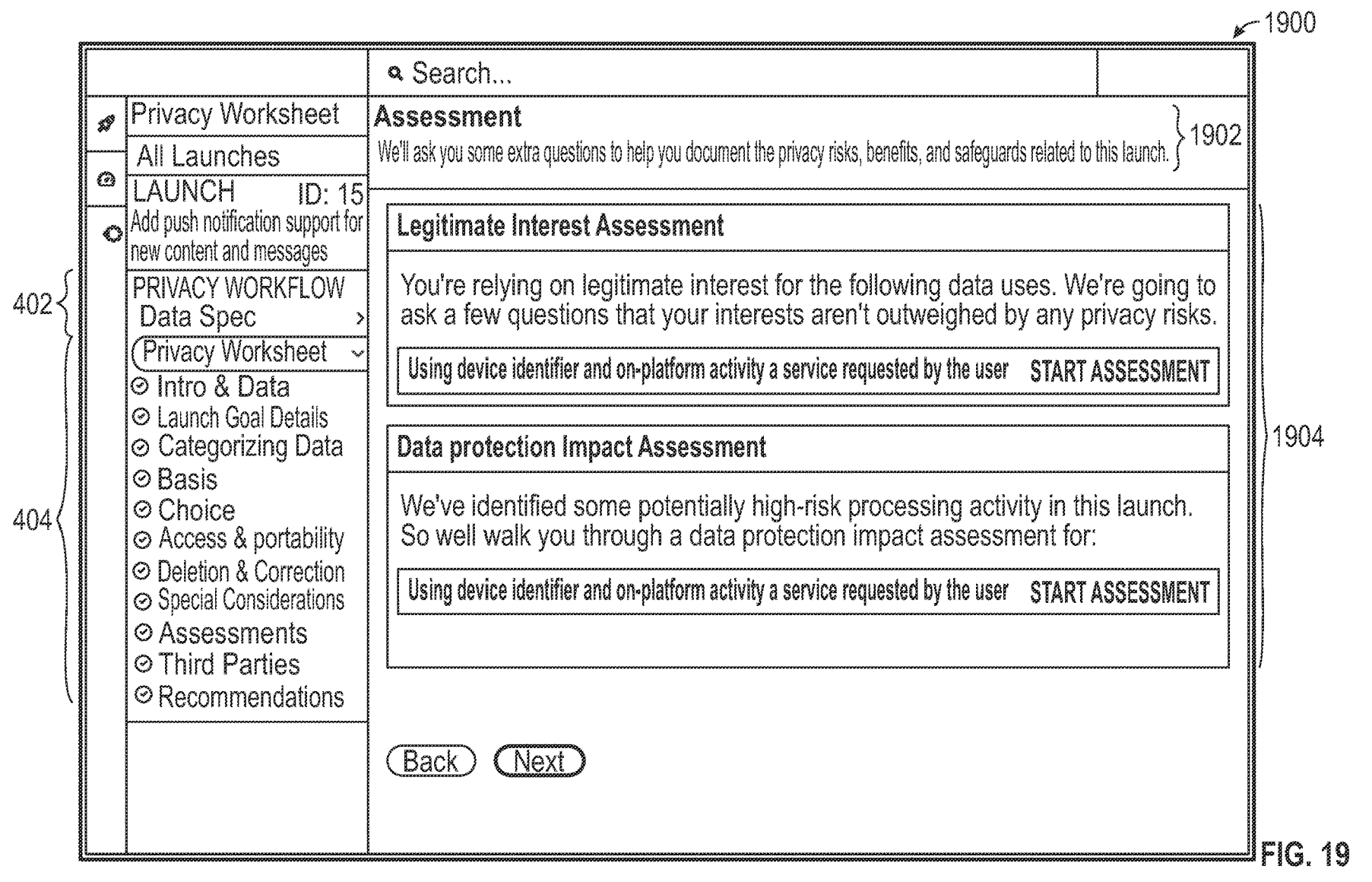

FIG. 19 illustrates a privacy review UI 1900 for initiating one or more assessments regarding use of personal data with respect to compliance, in accordance with some example embodiments. In one or more embodiments, the privacy review UI 1900 corresponds to when a user selects the "assessments" category within the privacy review categories 404. In response to such selection, the compliance client 108 (e.g., in conjunction with the compliance server system 104) provides for display of a user assessment header 1902 and user assessment types 1904. The user assessment header 1902 provides a brief description regarding assessments.

With respect to the user assessment types 1904, the compliance client 108 may display an interface with user-selectable options to perform one or more assessments with respect to the feature (e.g., adding push notification support for new content and messages). The compliance client 108 may receive user input, and save corresponding values (e.g., in the form of structured information) within the assessments table 319.

In the example of FIG. 19, the user assessment types 1904 include interface elements (e.g., buttons) for initiating a legitimate interest assessment (LIA) and/or a data protection impact assessment (DPIA). The assessments may be performed for one or more of the intended uses for the personal data (e.g., depicted as "using device identifier and on-platform activity to provide a service requested by the user" in FIG. 19).

In one or more implementations, the compliance client 108 requires the LIA and/or DPIA based on the values of the structured data regarding usage of personal data, including the above-described special considerations. Moreover, the compliance client 108 may provide for fore generic privacy impact assessments which are user-selectable (e.g., not required but selectable to initiate) within the user assessment types 1904.

It is noted that the categories, questions, candidate responses, options and/or other interface elements discussed above with respect to FIG. 19 correspond to an example embodiment. A different arrangement of categories, questions, candidate responses, options and/or other interface elements (e.g., including real-time, inline help and recommendations) may be used in alternate embodiments.

Moreover, while the above-described elements are described as being user-selected, user-selectable or user-specified, the compliance system 100 is not limited to such types of responses. As an alternative or supplement to user-submitted responses, the responses as described herein may be based on values accessed from a data store (e.g., by scanning a customer system database).

FIGS. 20A-20B illustrate a privacy review UI 2000 for performing a legitimate interest assessment (LIA) regarding use of personal data with respect to compliance, in accordance with some example embodiments. In one or more embodiments, the privacy review UI 000 corresponds to when a user selects to perform the LIA via the privacy review UI 2000. In response to such selection, the compliance client 108 (e.g., in conjunction with the compliance server system 104) provides for display of a LIA header 2002 and LIA questions 2004. The LIA header 2002 provides a brief description regarding performing an LIA assessment.

With respect to the LIA questions 2004, the compliance client 108 may display a questionnaire (or other type of interface) prompting the user for input for the LIA assessment with respect to the feature (e.g., adding push notification support for new content and messages). The compliance client 108 may receive user input, and save corresponding values (e.g., in the form of structured information) within the assessments table 320.

In one or more embodiments, one or more questions with respect to the LIA questions 2004 may be prepopulated (e.g., while remaining user editable) based on prior-submitted responses to questions (e.g., from the data specification categories 402, the privacy review categories 404 and/or the DPIA questions 2204 discussed below). In this manner, the compliance client 108 may facilitate user input of information with respect to the LIA questions 2004.

The LIA questions 2004 may relate to potential risks for data processing activities flagged as high risk. In one or more embodiments, potential high risks may be determined by the responses regarding the data types/uses as compared against the high risk categories specified by the personal data uses taxonomy 208 and/or the personal data types taxonomy 200.

In the example of FIGS. 20A-20B, the LIA questions 2004 prompt the user for input regarding: beneficiaries of using the data (e.g., with user selectable options including the organization, consumers, business customers, employees, the general public, and/or others); how important the benefits are for each selected beneficiary (e.g., with importance levels of trivial, helpful, important and/or critical); the impact to the organization if particular uses (e.g., providing a service requested by the user) are not provided; unresolved ethical or legal concerns with using type(s) of data relying on the legitimate interest; and/or whether it is possible to achieve goals for launching the feature without using type(s) of data relying on the legitimate interest.

It is noted that the categories, questions, candidate responses, options and/or other interface elements discussed above with respect to FIGS. 20A-20B correspond to an example embodiment. A different arrangement of categories, questions, candidate responses, options and/or other interface elements (e.g., including real-time, inline help and recommendations) may be used in alternate embodiments.

Moreover, while the above-described elements are described as being user-selected, user-selectable or user-specified, the compliance system 100 is not limited to such types of responses. As an alternative or supplement to user-submitted responses, the responses as described herein may be based on values accessed from a data store (e.g., by scanning a customer system database).

Figure 21:
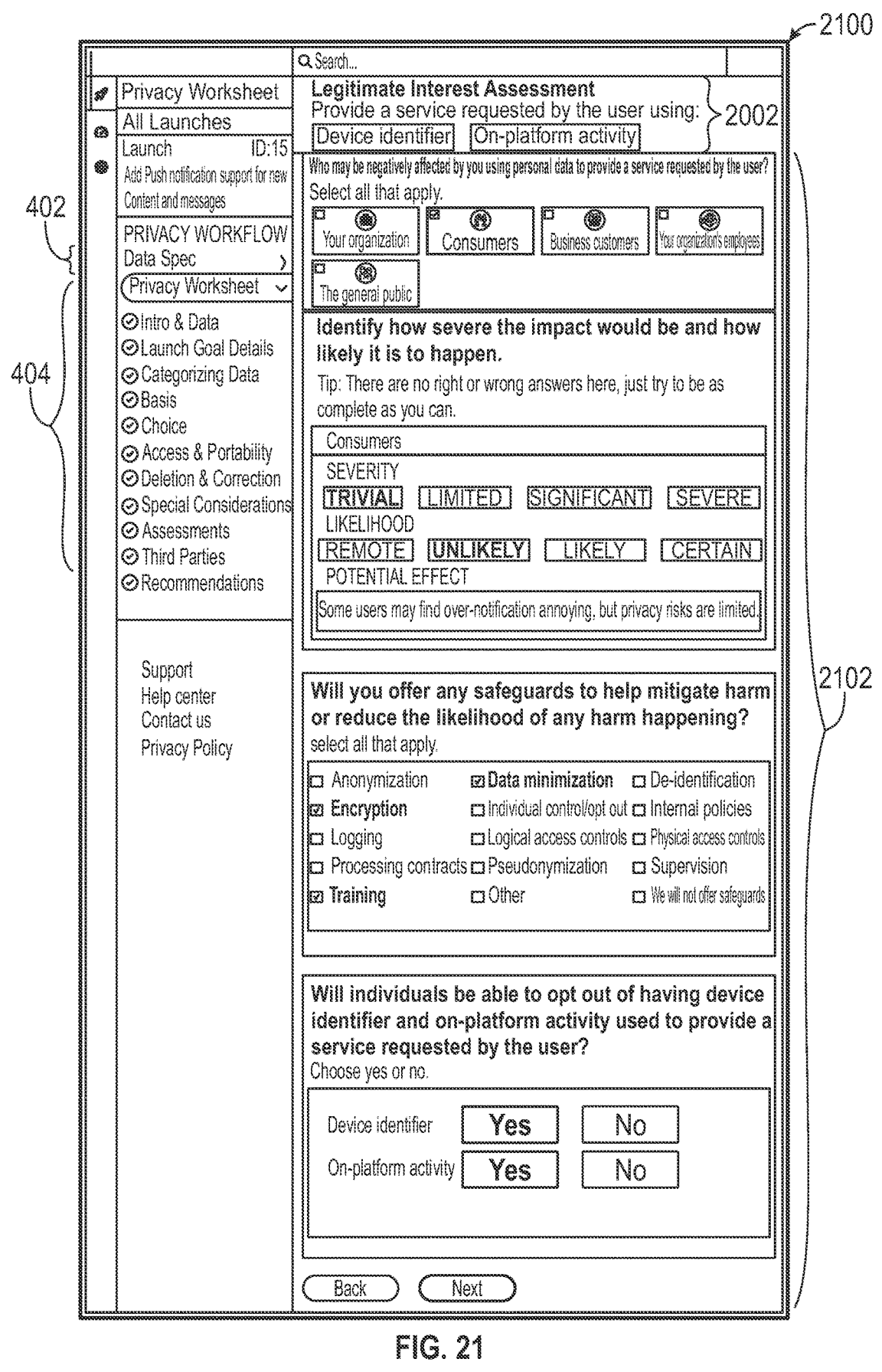

FIG. 21 illustrates a privacy review UI 2100 for further performing a legitimate interest assessment regarding use of personal data with respect to compliance, in accordance with some example embodiments. In one or more embodiments, the privacy review UI 2100 is presented when a user completes the first LIA questions 2104. In response, the compliance client 108 (e.g., in conjunction with the compliance server system 104) provides for display of the second LIA questions 2102, which may be at least partially prepopulated similar to the LIA questions 2104 of FIG. 21. The compliance client 108 may receive user input for the LIA questions 2102, and save corresponding values (e.g., in the form of structured information) within the assessments table 320.

Similar to the LIA questions 2104 of FIG. 21, the LIA questions 2102 of FIG. 21 may relate to potential risks for data processing activities flagged as high risk. In the example of FIG. 21, the LIA questions 2102 may prompt the end user as to who may be negatively affected (e.g., with user selectable options including the organization, consumers, business customers, employees, the general public, and/or others); how severe the impact will be and the associated likelihood (e.g., with severity levels including trivial, limited, significant and severe, and with likelihood levels including remote, unlikely, likely and certain); and/or whether any safeguards are offered (e.g., with user selectable options including encryption, anonymization, logical access controls, logging, data minimization, de-identification, processing contracts, physical access controls, internal policies, training, supervision, pseudonymization, individual control/opt out, other and/or no safeguards).

It is noted that the categories, questions, candidate responses, options and/or other interface elements discussed above with respect to FIG. 21 correspond to an example embodiment. A different arrangement of categories, questions, candidate responses, options and/or other interface elements (e.g., including real-time, inline help and recommendations) may be used in alternate embodiments.

Moreover, while the above-described elements are described as being user-selected, user-selectable or user-specified, the compliance system 100 is not limited to such types of responses. As an alternative or supplement to user-submitted responses, the responses as described herein may be based on values accessed from a data store (e.g., by scanning a customer system database).

Figure 22A:
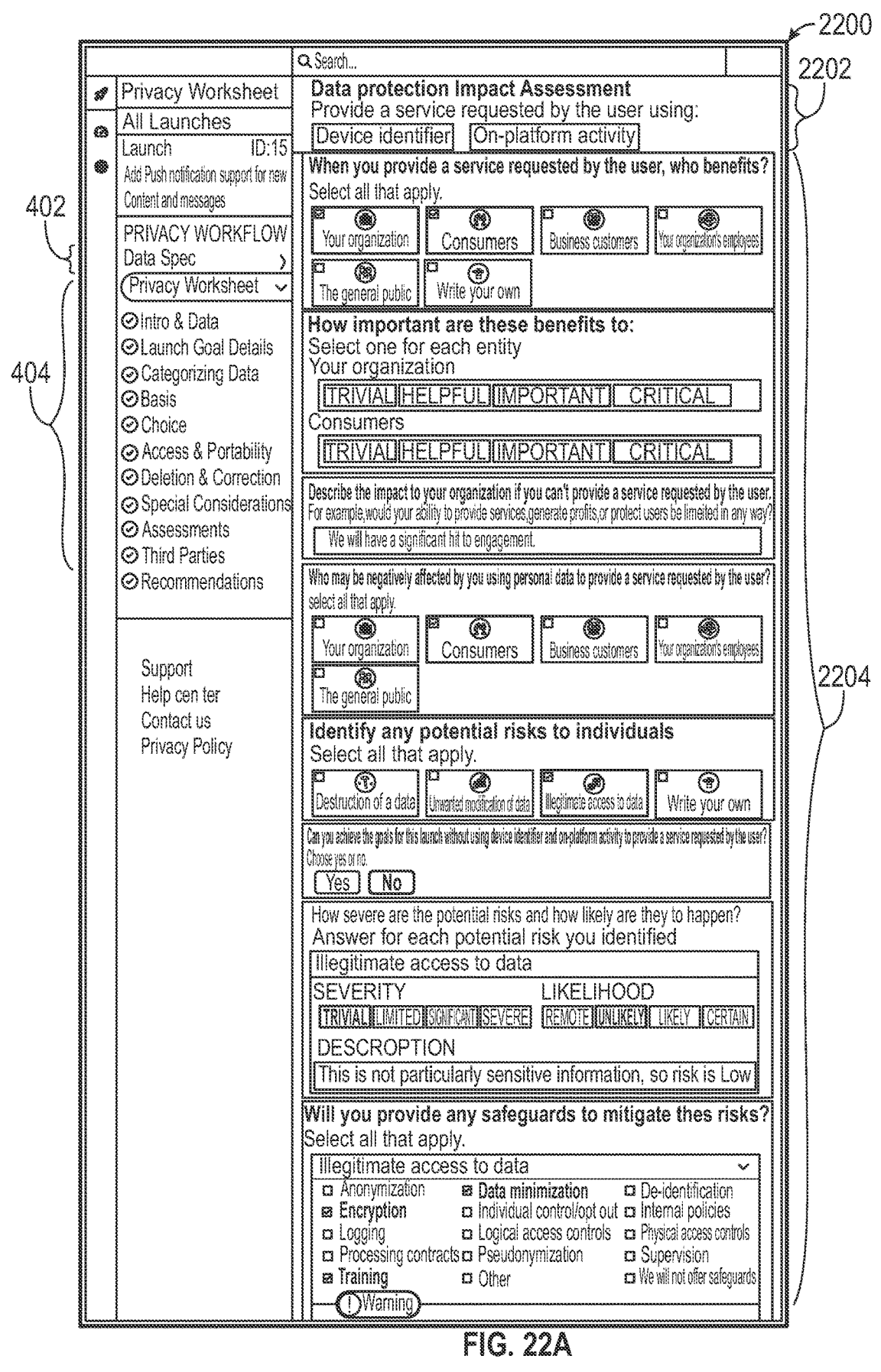
Figure 22B:
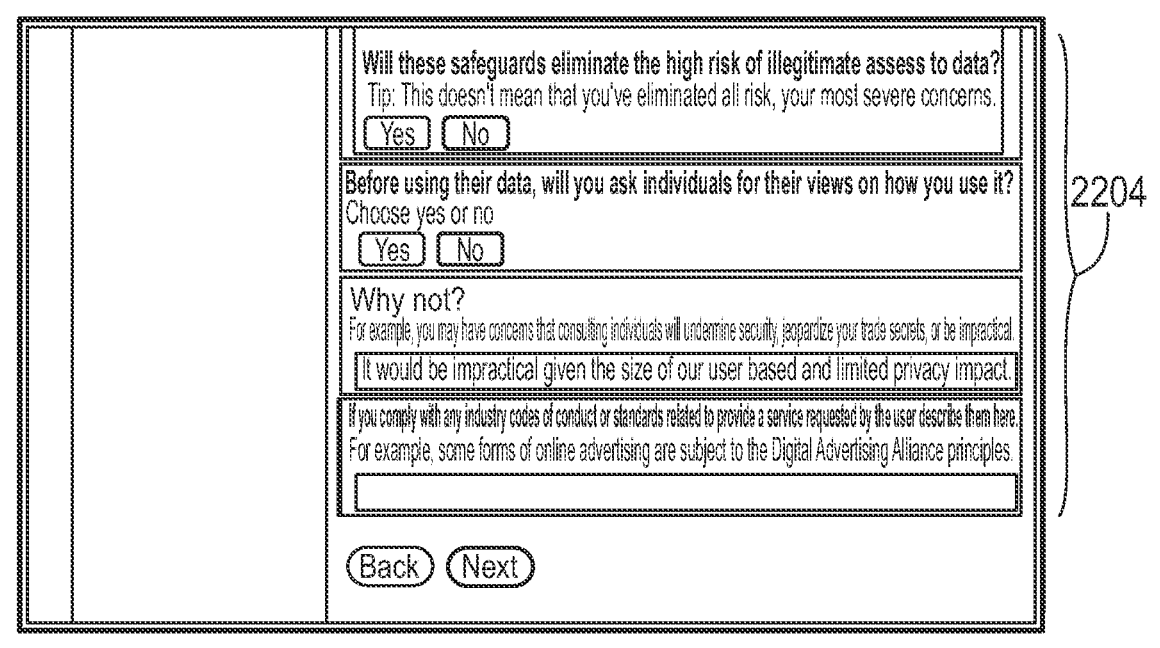

FIGS. 22A-22B illustrate a privacy review UI 2200 for performing a data protection impact assessment (DPIA) regarding use of personal data with respect to compliance, in accordance with some example embodiments. In one or more embodiments, the privacy review UI 2200 corresponds to when a user selects to perform the DPIA via the privacy review UI 2000. In response to such selection, the compliance client 108 (e.g., in conjunction with the compliance server system 104) provides for display of a DPIA header 2202 and DPIA questions 2204. The DPIA header 2202 provides a brief description regarding performing a DPIA assessment.

With respect to the DPIA questions 2204, the compliance client 108 may display a questionnaire (or other type of interface) prompting the user for input for the DPIA assessment with respect to the feature (e.g., adding push notification support for new content and messages). The compliance client 108 may receive user input, and save corresponding values (e.g., in the form of structured information) within the assessments table 320.

In one or more embodiments, one or more questions with respect to the DPIA questions 2204 may be prepopulated (e.g., while remaining user editable) based on prior-submitted responses to questions (e.g., from the LIA questions 2004, the data specification categories 402 and/or the privacy review categories 404). In this manner, the compliance client 108 may facilitate user input of information with respect to the DPIA questions 2204.

The DPIA questions 2204 may relate to potential risks for data processing activities flagged as high risk. In one or more embodiments, high risk data usage may be determined by the responses regarding the data types and uses in compared against the high risk categories specified by the personal data uses taxonomy 208 and/or the personal data types taxonomy 210.

In the example of FIGS. 22A-22B, the DPIA questions 204 prompt the user for input regarding beneficiaries of using the data (e.g., with user selectable options including the organization, consumers, business customers, employees, the general public, and/or others); how important the benefits are for each selected beneficiary (e.g., with importance levels of trivial, helpful, important and/or critical); impact to the organization; who may be negatively affected (e.g., with user selectable options including the organization, consumers, business customers, employees, the general public, and/or others); identifying potential risks to individuals (e.g., with user selectable options including illegitimate access to data, unwanted modification of data, destruction of data, or customized); whether it is possible to achieve goals for launching the feature without using type(s) of data: how severe the impact will be and the associated likelihood for each of illegitimate access to data and destruction of data (e.g., with severity levels including trivial, limited, significant and severe, and with likelihood levels including remote, unlikely, likely and certain); whether any safeguards are offered for each of illegitimate access to data and destruction of data (e.g., with user selectable options including encryption, anonymization, logical access controls, logging, data minimization, de-identification, processing contracts, physical access controls, internal policies, training, supervision, pseudonymization, individual control/opt out, other and/or no safeguards); whether the safeguards will eliminate high risks for the intended uses (e.g., for "illegitimate access to data" as shown in FIGS. 22A-22B); whether individuals are asked for their views on how the data is used (and if not, then why not); and/or whether the organization complies with industry codes of conduct or standards related to the intended uses (e.g. for "creating a health profile").

It is noted that the categories, questions, candidate responses, options and/or other interface elements discussed above with respect to FIGS. 22A-22B correspond to an example embodiment. A different arrangement of categories, questions, candidate responses, options and/or other interface elements (e.g., including real-time, inline help and recommendations) may be used in alternate embodiments.

Moreover, while the above-described elements are described as being user-selected, user-selectable or user-specified, the compliance system 100 is not limited to such types of responses. As an alternative or supplement to user-submitted responses, the responses as described herein may be based on values accessed from a data store (e.g., by scanning a customer system database).

FIG. 23 illustrates a privacy review UI 2300 with user-selectable elements for specifying third party interactions regarding personal data with respect to compliance, in accordance with some example embodiments. In one or more embodiments, the privacy review UI 2300 corresponds to when a user selects the "third parties" category within the privacy review categories 404. In response to such selection, the compliance client 108 (e.g., in conjunction with the compliance server system 104) provides for display of a third party sharing header 2302 and third party sharing questions 2304. The third party sharing header 2302 provides a brief description regarding third party interactions.

With respect to the third party sharing questions 2304, the compliance client 108 may display a questionnaire (or other type of interface) prompting the user for input regarding third party interactions with respect to the feature (e.g., adding push notification support for new content and messages). The compliance client 108 may receive user input, and save corresponding values (e.g., in the form of structured information) within the third party sharing table 324.

In the example of FIG. 23, the third party sharing questions 2304 prompt the user for input regarding: selecting any third parties that will be able to use the personal data for their own purposes (e.g., with a user selectable list of the third parties identified by the questions from the data specification categories 402); how the third parties will use the data (e.g., including illegitimate access to data, and/or whether there is a contract with the third party); whether the third parties are processors, controllers or joint controllers (e.g., with a user selectable list of the third parties identified by the questions corresponding to the data specification categories 402); and/or whether data is being sold to third parties. In one or more embodiments (not shown), the third party sharing questions 2304 may prompt the user to select categories for each of the third parties (e.g., with suggested categories based on third parties taxonomy 212).

It is noted that the categories, questions, candidate responses, options and/or other interface elements discussed above with respect to FIG. 23 correspond to an example embodiment. A different arrangement of categories, questions, candidate responses, options and/or other interface elements (e.g., including real-time, inline help and recommendations) may be used in alternate embodiments.

Moreover, while the above-described elements are described as being user-selected, user-selectable or user-specified, the compliance system 100 is not limited to such types of responses. As an alternative or supplement to user-submitted responses, the responses as described herein may be based on values accessed from a data store (e.g., by scanning a customer system database).

FIG. 24 illustrates a privacy review UI 2400 for providing recommendations and/or considerations regarding use of personal data with respect to compliance, in accordance with some example embodiments. In one or more embodiments, the privacy review UI 2400 corresponds to when a user selects the "recommendations" category within the privacy review categories 404. In response to such selection, the compliance client 108 (e.g., in conjunction with the compliance server system 104) provides for display of a recommendations header 2402 and recommendations interface 2404.

The privacy review UI 2400 may be used by the above-mentioned second type of user (e.g., someone having responsibility for compliance with respect to personal data). The recommendations header 2402 provides a brief description regarding the recommendations and/or considerations, for example, such as identifying potential issues to be considered prior to launching a feature. In one or more embodiments, the potential issues are presented in the form of a checklist, where some of the checks are used as a basis for information in the reports discussed above with respect to FIGS. 27-29.

With respect to the recommendations interface 2404, the compliance client 108 may display a questionnaire (or other type of interface) prompting the user for input regarding recommendations with respect to the feature (e.g., adding push notification support for new content and messages). The compliance client 108 may receive user input, and save corresponding values (e.g., in the form of structured information) within the recommendations table 328.

In the example of FIG. 24, the recommendations interface 2404 depicts "high" priority, "medium" priority and "other" priority categories. Each of these categories is user selectable for presenting corresponding recommendations/considerations, options and/or other interface elements corresponding to the selected category.

In a case where the user selects the "high" priority category, the recommendations interface 2404 provides items/recommendations/considerations (e.g., including user-selectable checkboxes for the user to indicate completion) for the user to: update their privacy policy to let individuals know what types of personal data are collected and/or used; update the data specification for a launch with respect to any new data retention periods, and confirm with users of the first type (e.g., engineers) that the new retention periods will be implemented; restrict the third parties from using personal data for their own benefit or offer individuals the ability to opt out of having these third parties use their data for their own benefit; mitigate ethical or legal concerns regarding processing activities (e.g., or rely on a different legal basis such as consent); confirm with individuals of the first type (e.g., engineers) that the feature can be redesigned so as to avoid needlessly using this personal data for a launch; for basis of processing of legitimate interest with high risk level (e.g., considerable, severe, likely, nearly certain), update to a different basis for processing (e.g., consent); for basis of processing of consent, develop an easy-to-use mechanism that allows people to withdraw consent, provide easy-to-find information about how people can withdraw consent, or rely on a different legal basis for this data use; if a DPIA is performed, confer with the data protection officer (DPO) of organization; if a DPIA is not performed, consult with data protection authority (DPA) about uses of data before launching the feature. As shown in the example of FIG. 24, the compliance client 108 indicates that the items/recommendations/considerations in the high priority category must be resolved before launching the feature.

It is noted that the categories, questions, candidate responses, options and/or other interface elements discussed above with respect to FIG. 24 correspond to an example embodiment. A different arrangement of categories, questions, candidate responses, options and/or other interface elements (e.g., including real-time, inline help and recommendations) may be used in alternate embodiments.

Moreover, while the above-described elements are described as being user-selected, user-selectable or user-specified, the compliance system 100 is not limited to such types of responses. As an alternative or supplement to user-submitted responses, the responses as described herein may be based on values accessed from a data store (e.g., by scanning a customer system database).

FIG. 25 illustrates another privacy review UI 2500 for providing recommendations and/or considerations regarding use of personal data with respect to compliance, in accordance with some example embodiments. In one or more embodiments, the privacy review UI 2700 corresponds to when a user selects the "medium" priority category within the recommendations interface 240-4.

In a case where the user selects the "medium" priority category, the recommendations interface 2404 provides recommendations/considerations (e.g., including user-selectable checkboxes for the user to indicate completion) for the user to: account for the inability to provide a copy of personal data when applicable (e.g., and set up manual procedures when individuals have a legal access to this data, such as in Europe); for basis of processing of legitimate interest with high risk level, minimize potential risks by implementing safeguards; for basis of processing of legitimate interest with no high risk levels, provide for individuals to opt out of data types/uses, or to implement additional safeguards when using the data types/uses; implement additional safeguards (e.g., like data minimization and de-identification) for data related to children.

It is noted that the categories, questions, candidate responses, options and/or other interface elements discussed above with respect to FIG. 25 correspond to an example embodiment. A different arrangement of categories, questions, candidate responses, options and/or other interface elements (e.g., including real-time, inline help and recommendations) may be used in alternate embodiments.

Moreover, while the above-described elements are described as being user-selected, user-selectable or user-specified, the compliance system 100 is not limited to such types of responses. As an alternative or supplement to user-submitted responses, the responses as described herein may be based on values accessed from a data store (e.g., by scanning a customer system database).

FIG. 26 illustrates another privacy review UI 2600 for providing recommendations and/or considerations regarding use of personal data with respect to compliance, in accordance with some example embodiments. In one or more embodiments, the privacy review UI 2700 corresponds to when a user selects the "other" priority category within the recommendations interface 2404.

In a case where the user selects the "other" priority category, the recommendations interface 2404 provides recommendations/considerations (e.g., including user-selectable checkboxes for the user to indicate completion) for the user to: account for the inability to correct personal data when applicable (e.g., and set up manual procedures to correct and/or delete when individuals have a legal access to correct such data, such as in Europe); for basis of processing of contractual necessity with respect to children, update to a different basis of processing (e.g., legitimate interest); provide an opt-out mechanism for activities which other services/organizations provide an opt-out mechanism for, or document why an opt-out mechanism is not appropriate; provide for deleting personal data (e.g., which may not necessarily be deleted) in response to: individual's request to delete with withdrawn consent and no other basis for processing the data, individual objects to use of data and no other basis for processing the data, individual objects to data used for indirect marketing and no other basis for processing the data, if data is no longer need for the reason it was originally collected, and/or a child requests deletion of any information collected from the child; provide data in a structured, commonly used, and machine-readable format, like JSON or XML when applicable (e.g., for GDPR); when technically feasible, transfer the structured data directly to another business or organization at an individual's request (e.g., may not apply to legitimate interest); stop using personal data for direct marketing if individual objects (e.g., and ensure technical ability to do so when requested); if unable to identify a meaningful benefit to organization for high risk data, consider whether use of data in these ways is necessary or offer individuals the ability to opt out.

It is noted that the categories, questions, candidate responses, options and/or other interface elements discussed above with respect to FIG. 26 correspond to an example embodiment. A different arrangement of categories, questions, candidate responses, options and/or other interface elements (e.g., including real-time, inline help and recommendations) may be used in alternate embodiments.

Moreover, while the above-described elements are described as being user-selected, user-selectable or user-specified, the compliance system 100 is not limited to such types of responses. As an alternative or supplement to user-submitted responses, the responses as described herein may be based on values accessed from a data store (e.g., by scanning a customer system database).

FIGS. 27A-27B illustrate a report 2700 of a legitimate interest assessment for a product/process (e.g., or feature(s) thereof), in accordance with some example embodiments. In one or more embodiments, the report 2700 is generated by the compliance client 108 in response to user input (e.g., of a user interface element, not shown) to generate an LIA report.

For example, the compliance client 108 may provide appropriate user interface(s) to print, save and/or export the report 2700. These user interfaces may be available within dashboard interface(s) (e.g., discussed below) and/or a launch summary interface provided by the compliance client 108.

In one or more embodiments, the report 2700 is based on aspects of the responses to the questions corresponding to the data specification categories 402 and the privacy review categories 404. For example, the report 2700 is generated by combining the responses into a single document. The single document can be reviewed by appropriate individuals of an organization (e.g., the second type of user such as someone having responsibility for compliance with respect to personal data). Alternatively or in addition, the report 2700 may be shared with government regulators.

In one or more embodiments, the compliance client 108 is configured to present the report 2700 in an editing mode (e.g., for making revisions before being output to printer or exported). The editing mode allows the user (e.g., the second type of user) to review, edit and/or annotate the report before being output. For example, the compliance client 108 may provide a user-selectable element (e.g., button, link) to open the report 2700 in editing mode, where user selection of the mode includes the full text of the report 2700 within an editable interface. The editing interface may indicate that the report 2700 (e.g., assessment) is based on responses to the questions presented with respect to the data specification categories 402 and the privacy review categories 404, including any recommendations and/or considerations that were marked as complete. The editing interface may further inform the end user to verify that the information is correct and to add any needed corrections and/or supplementary comments or materials (e.g., the results of any consultations with individuals or data protection authorities).

In one or more embodiments, the report 2700 provides information for each data use and/or data type combination relying on legitimate interest. As shown in the example of FIGS. 27A-27B, the report 2700 includes LIA report sheet 2702 and LIA report sheet 2704 with information to: indicate that the LIA was performed by a privacy reviewer (e.g., indicated by name) on a specified date; list the data uses/types and data sources corresponding to the LIA; indicate the organization's purpose/reason (e.g., benefit) to process the personal data, as well as the impact of not performing such processing; indicate benefits to with respect to any other applicable organizations/entities; identify potential risks (e.g., high-risk or DPIA flag) for personal data; indicate risk level for each applicable entity within grid (e.g., grid pairs); indicate safeguards implemented to address the identified risks; indicate whether individuals are able to opt out of the processing; indicate whether any unresolved ethical or legal concerns with this processing activity were identified; indicate for the intended use for each data type; indicate whether the organization notified individual(s) of the processing activity prior to processing data; and/or identify a privacy reviewer (e.g., second type of user) and approval date for the processing activity.

As shown in the example of FIGS. 27A-27B, the LIA report sheet 2702 may highlight and/or flag the potential benefits together with the potential risks associated with high risk data types and/or uses. In one or more embodiments, the potential benefits may be assigned different importance levels (e.g., so as to be weighted). The different importance levels (e.g., weights) may include trivial, helpful, important and/or critical. In addition, the potential risks may be assigned different severity levels (e.g., so as to be weighted). The different severity levels (e.g., weights) may include trivial, limited, significant and severe, each of which may have a respective likelihood level selected from including remote, unlikely, likely and certain. In this manner, the compliance client 108 (e.g., in conjunction with the compliance server system 104) provides for flagging risks, while depicting benefit-risk indicators for each flagged risk.

It is noted that the assessment headers, comments, recommendations and/or considerations, risk levels, and/or other report information discussed above with respect to FIGS. 27A-27B correspond to an example embodiment. A different arrangement of assessment headers, comments, recommendations/considerations and/or other report information may be used in alternate embodiments.

Moreover, while the above-described elements are described as being user-selected, user-selectable or user-specified, the compliance system 100 is not limited to such types of responses. As an alternative or supplement to user-submitted responses, the responses as described herein may be based on values accessed from a data store (e.g., by scanning a customer system database).

FIGS. 28A-28B illustrate part of a report 2800 on a data protection impact assessment (DPIA) for a product/process, in accordance with some example embodiments. In one or more embodiments, the report 2800 is generated by the compliance client 108 in response to user input (e.g., of a user interface element, not shown) to generate a DPIA report.

For example, the compliance client 108 may provide appropriate user interface(s) to print, save and/or export the report 2800. These user interfaces may be available within dashboard interface(s) (e.g., discussed below) and/or a launch summary interface provided by the compliance client 108.

In one or more embodiments, the report 2800 is based on aspects of the responses to the questions corresponding to the data specification categories 402 and the privacy review categories 404. For example, the report 2800 is generated by combining the responses into a single document. The single document can be reviewed by appropriate individuals of an organization (e.g., the second type of user such as someone having responsibility for compliance with respect to personal data). Alternatively or in addition, the report 2300 may be shared with government regulators.

In one or more embodiments, the compliance client 108 is configured to present the report 2800 in an editing mode (e.g., for making revisions before being output to printer or exported). The editing mode allows the user (e.g., the second type of user) to review, edit and/or annotate the report before being output. For example, the compliance client 108 may provide a user-selectable element (e.g., button, link) to open the report 2800 in editing mode, where user selection of the mode includes the full text of the report 2800 within an editable interface. The editing interface may indicate that the report 2800 (e.g., assessment) is based on responses to the questions presented with respect to the data specification categories 402 and the privacy review categories 404, including any recommendations and/or considerations that were marked as complete. The editing interface may further inform the end user to verify that the information is correct and to add any needed corrections and/or supplementary comments or materials (e.g., the results of any consultations with individuals or data protection authorities).

In one or more embodiments, the report 2800 provides information for each data use and/or data combination relying on DPIA that poses a high risk. As shown in the example of FIGS. 28A-28B, the report 2800 includes DPIA report sheet 2802 and DPIA report sheet 2804 with information to: indicate that the DPIA was performed to evaluate data processing activities that have the potential to result in a high risk to individuals; list the data uses/types corresponding to the DPIA; provide a link with additional information about this processing activity; list the data sources; identity the purpose of the processing of the personal data; indicate the data retention procedures (e.g., by specifying, for each data type, the retention period and/or retention action after expiration); list the third parties with which the data is shared (e.g., by specifying, for each third party, the data type, how the data is used, whether the third party may use the data for its own purposes, and/or if the third party's access to the personal data is subject to a contract); indicate the necessity of processing with respect to whether the organization can achieve its business goals without this processing activity; indicate the lawfulness of processing with respect to the organization relying on each data type compared to its basis of processing; indicate data access (e.g., list information that can be provided when requested); list what types of data can be deleted and/or corrected; indicate when the organization did not consult its supervisory authority (e.g., due to the processing activity not resulting in any unmitigated high risks); indicated when the organization was unable to mitigate listed high risks; and/or indicate when the organization consulted, or did not consult, its supervisory authority about unmitigated risks.

It is noted that the assessment headers, comments, recommendations/considerations and/or other report information discussed above with respect to FIGS. 28A-28B correspond to an example embodiment. A different arrangement of assessment headers, comments, recommendations/considerations and/or other report information may be used in alternate embodiments.

Moreover, while the above-described elements are described as being user-selected, user-selectable or user-specified, the compliance system 100 is not limited to such types of responses. As an alternative or supplement to user-submitted responses, the responses as described herein may be based on values accessed from a data store (e.g., by scanning a customer system database).

FIGS. 29A-29B illustrate an additional part of the report 2500 on a data protection impact assessment for a product/process, in accordance with some example embodiments. For example, relative to the DPIA report sheet 2502 and DPIA report sheet 2504 of FIG. 25, FIGS. 29A-29B include additional DPIA report sheet 2902 and DPIA report sheet

2904 for the report 2500. Thus, DPIA sheets 2802, 2804, 2902 and 2904 may correspond to a single document with respect to the report 2500.

As shown in the example of FIGS. 29A-29B, the DPIA report sheet 2902 and DPIA report sheet 2904 include information to: indicate the organization's purpose/reason (e.g., benefit) to process the personal data, as well as the impact of not performing such processing; indicate benefits to with respect to any other applicable organizations/entities; identify the potential risks together with a brief description and the likelihood of occurrence; indicate how the organization will attempt to mitigate risk (e.g., by listing safeguards); indicate any individual consultations and/or reasons for not consulting individuals; and/or identifying a privacy reviewer (e.g., second type of user) and approval date for the processing activity.

As shown in the example of FIGS. 29A-29B, the DPIA report sheet 2902 may highlight and/or flag the potential benefits together with the potential risks associated with high risk data types and/or uses. In one or more embodiments, the potential benefits may be assigned different importance levels (e.g., so as to be weighted) per the LIA questions 2104 of FIG. 21. The different importance levels (e.g., weights) may include trivial, helpful, important and/or critical. In addition, the potential risks may be assigned different severity levels (e.g., so as to be weighted). The different severity levels (e.g., weights) may include trivial, limited, significant and severe, each of which may have a respective likelihood level selected from including remote, unlikely, likely and certain. In this manner, the compliance client 108 (e.g., in conjunction with the compliance server system 104) provides for flagging risks, while depicting benefit-risk indicators for each flagged risk.

It is noted that the assessment headers, comments, recommendations/considerations, risk levels, and/or other report information discussed above with respect to FIGS. 29A-29B correspond to an example embodiment. A different arrangement of assessment headers, comments, recommendations/considerations and/or other report information may be used in alternate embodiments.

Moreover, while the above-described elements are described as being user-selected, user-selectable or user-specified, the compliance system 100 is not limited to such types of responses. As an alternative or supplement to user-submitted responses, the responses as described herein may be based on values accessed from a data store (e.g., by scanning a customer system database).

Figure 30:
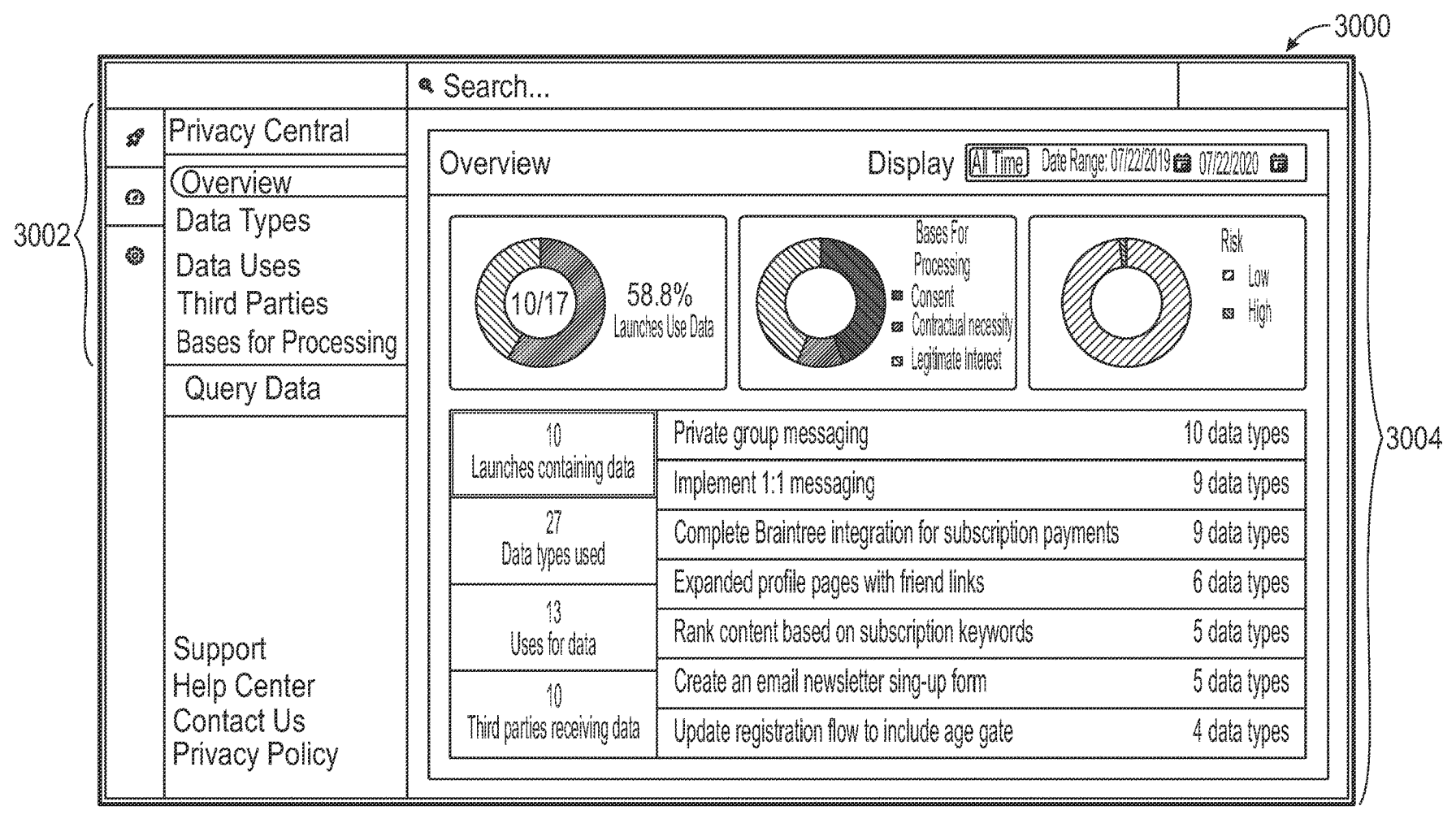

FIG. 30 illustrates a dashboard UI 3000 for providing an overview of personal data usage and/or compliance, in accordance with some example embodiments. In one or more embodiments, the dashboard UI 3000 includes user-selectable dashboard categories 3002.

The dashboard UI 3000 of FIG. 30, together with the corresponding dashboard interfaces of FIGS. 31-40, may be used by any user (e.g., the above-mentioned first type of user or second type of user. The dashboard UI 3000 is used to provide general information and statistics (e.g., in the form of lists, tables, charts, infographics, etc.) regarding personal data usage and compliance of a product/process.

In one or more embodiments, the dashboard UI 3000 is configured to display the general and statistical information with respect to a particular time period (e.g., a default time of three months, a user-selectable time-frame in days, weeks, months, years, and/or a custom start and end date). In this manner, the dashboard UI 3000 is not necessarily restricted to a privacy review for a single feature (e.g., adding push notification support for new content and messages). Rather, the dashboard UI 3000 may provide information spanning multiple privacy reviews (e.g., corresponding to multiple features launched during the applicable time period).

As noted above with respect to FIG. 2, the compliance system 100 may implement a data mapping system 206. The data mapping system 206 is configured to maintain a data mapping structure that cross-references the information collected, stored and maintained by the data specification system 202 and/or by the privacy review system 204. For example, the data mapping structure is configured to provide mappings between the information related to personal data intended for use by a product/process (e.g., as defined by the data specification system 202) and the information related to privacy compliance of the product/or process (e.g., as defined by the privacy review system 204). In one or more embodiments, such mappings are maintained across multiple features and/or time periods with respect to the product/process, so as to enable the dashboard UI 3000 to span multiple privacy reviews (e.g., multiple features launched during the applicable time period). In one or more implementations, the data mapping structure is configured to be updated in real-time based on subsequent user-provided responses (e.g., relating to data uses, data types and/or compliance). In addition, the data mapping structure is configured to cross-reference and be updated in real-time with respect to supplemental information that is specific to an organization associated with the product/process.

In one or more embodiments, the dashboard categories 3002 include the following categories, each of which is user-selectable to provide a corresponding overview of the responses provided with respect to the questionnaires associated with data specification categories 402 and/or privacy review categories 404: overview (e.g., providing a general overview of personal data usage and/or compliance based on the responses); data types (e.g., providing an overview of responses to the questions presented with respect to FIG. 7 and/or FIG. 13); data uses (e.g., providing an overview of responses to the questions presented with respect to FIG. 6 and/or FIG. 13); third parties (e.g., providing an overview of responses to the questions presented with respect to FIG. 8 and/or FIGS. 20A-20B); and/or bases for processing (e.g., providing an overview of responses to the questions presented with respect to FIG. 14).

In one or more embodiments, the dashboard UI 3000 corresponds to when a user selects the "overview" category (e.g., corresponding to general statistics for all privacy reviews) within the dashboard categories 3002. In response to such selection, the compliance client 108 (e.g., in conjunction with the compliance server system 104) provides for display of a personal data statistics 3004.

In the example of FIG. 30, the personal data statistics 3004 provide general and/or statistical information for a specific time period (e.g., the date range from Jul. 22, 2019 to Jul. 22, 2020), including: a graph (e.g., percentage) of launches using personal data; a graph of bases for processing; a graph corresponding to risk; a number of launches (e.g., features) including personal data; a number of data types used; a number of uses of the personal data; a number of third parties receiving the personal data; and/or a list of the features considered during the time period (e.g., together with a number of data types for each feature).

It is noted that the interface elements discussed above with respect to FIG. 30 correspond to an example embodiment. A different arrangement of interface elements may be used in alternate embodiments.

Moreover, while the above-described elements are described as being user-selected, user-selectable or user-specified, the compliance system 100 is not limited to such types of responses. As an alternative or supplement to user-submitted responses, the responses as described herein may be based on values accessed from a data store (e.g., by scanning a customer system database).

Figure 31:
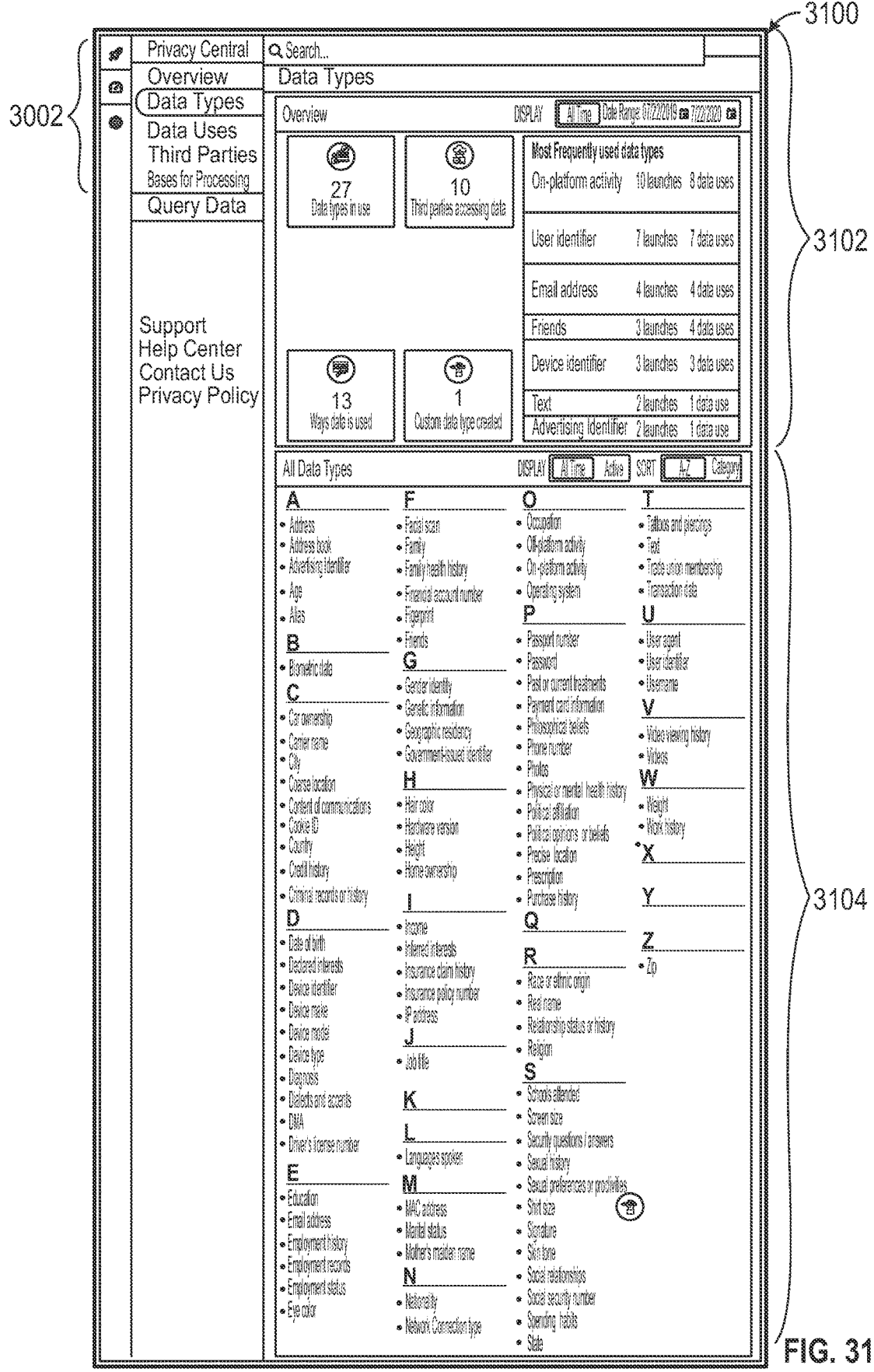
FIG. 31 illustrates a dashboard UI for providing an overview of types of personal data intended for use by a product/process, in accordance with some example embodiments.

FIG. 31 illustrates a dashboard UI 3100 for providing an overview of types of personal data intended for use by a product/process (e.g., or feature(s) thereof), in accordance with some example embodiments. In one or more embodiments, the dashboard UT 3100 corresponds to when a user selects the "data types" category within the dashboard categories 3002. In response to such selection, the compliance client 108 (e.g., in conjunction with the compliance server system 104) provides for display of a personal data types statistics 3102 and personal data types list 3104.

The personal data types statistics 3102 provides statistical information regarding the types of personal data used with respect to the features (e.g., launches) falling within specified time period mentioned above with respect to FIG. 30. In the example of FIG. 31, the personal data types statistics 3102 indicates: a number of data types used; a number of uses of the personal data; a number of third parties receiving the personal data; a number of custom data types created; and/or a list of most frequently used data types (e.g., where each listed data type includes a respective count for number of launches and number of uses).

On the other hand, the personal data types list 3104 corresponds to the different data types that were specified with respect to the particular time period (e.g., Jul. 22, 2019 to Jul. 22, 2020). The different data types may span multiple launches/features (e.g., those which fall within the specified time period) with respect to the product/process.

It is noted that the categories, questions, candidate responses, options and/or other interface elements discussed above with respect to FIG. 31 correspond to an example embodiment. A different arrangement of categories, questions, candidate responses, options and/or other interface elements (e.g., including real-time, inline help and recommendations) may be used in alternate embodiments.

Moreover, while the above-described elements are described as being user-selected, user-selectable or user-specified, the compliance system 100 is not limited to such types of responses. As an alternative or supplement to user-submitted responses, the responses as described herein may be based on values accessed from a data store (e.g., by scanning a customer system database).

Figure 32:
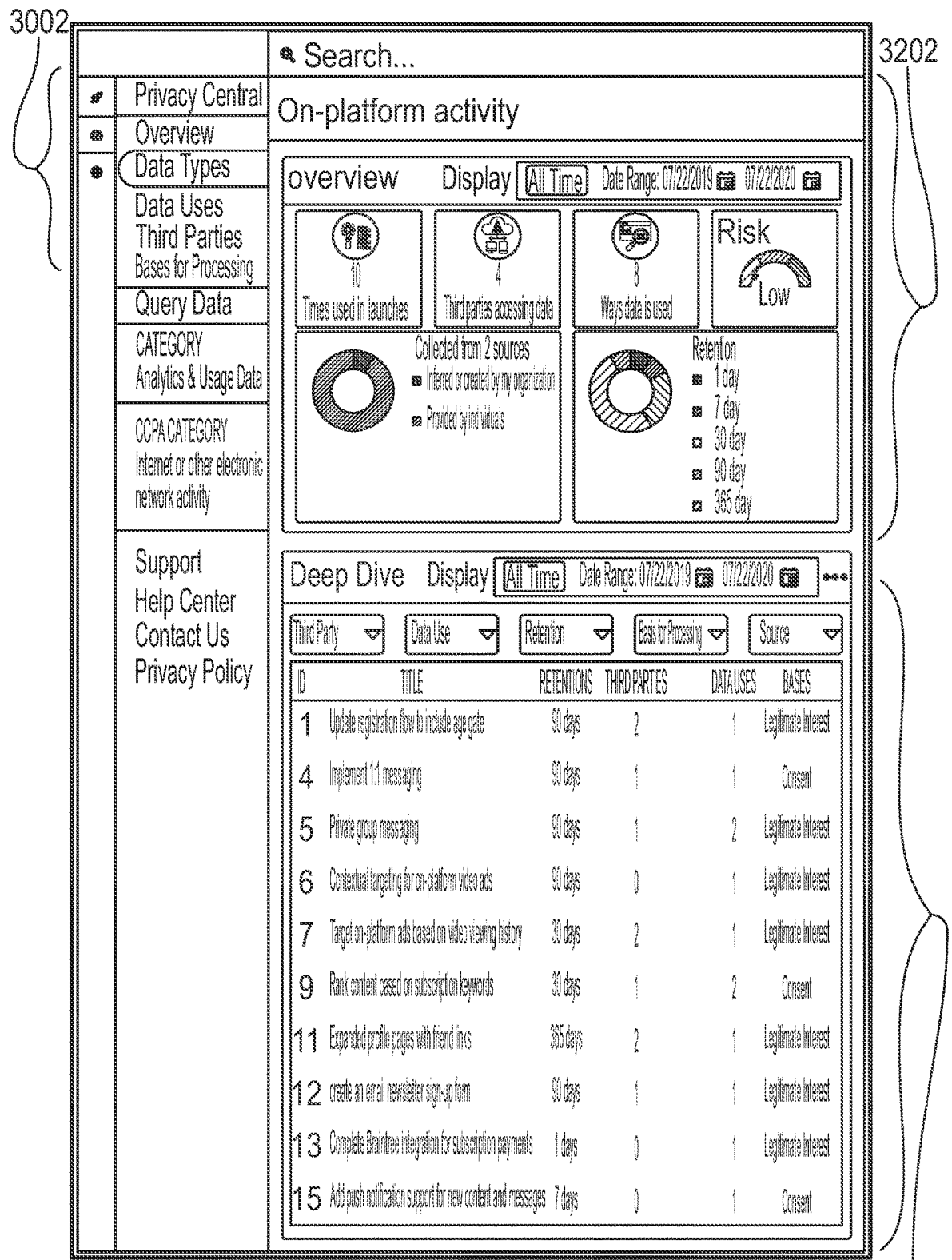
FIG. 32 illustrates a dashboard UI for providing information on specific type(s) of personal data intended for use by a product/process, in accordance with some example embodiments.

FIG. 32 illustrates a dashboard UI 3200 for providing information on specific type(s) of personal data intended for use by a product/process (e.g., or feature(s) thereof), in accordance with some example embodiments. In one or more embodiments, the dashboard UT 3200 corresponds to when a user selects a specific data type (e.g., "on platform activity") within the personal data types statistics 3102.

In response to such selection, the compliance client 108 (e.g., in conjunction with the compliance server system 104) provides for display of a selected type overview 3202 and selected type deep dive 3204, which may respectively include user-selectable fields/filters.

It is noted that the categories, questions, candidate responses, options and/or other interface elements discussed above with respect to FIG. 32 correspond to an example embodiment. A different arrangement of categories, questions, candidate responses, options and/or other interface elements (e.g. including real-time, inline help and recommendations) may be used in alternate embodiments.

Moreover, while the above-described elements are described as being user-selected, user-selectable or user-specified, the compliance system 100 is not limited to such types of responses. As an alternative or supplement to user-submitted responses, the responses as described herein may be based on values accessed from a data store (e.g., by scanning a customer system database).

Figure 33:
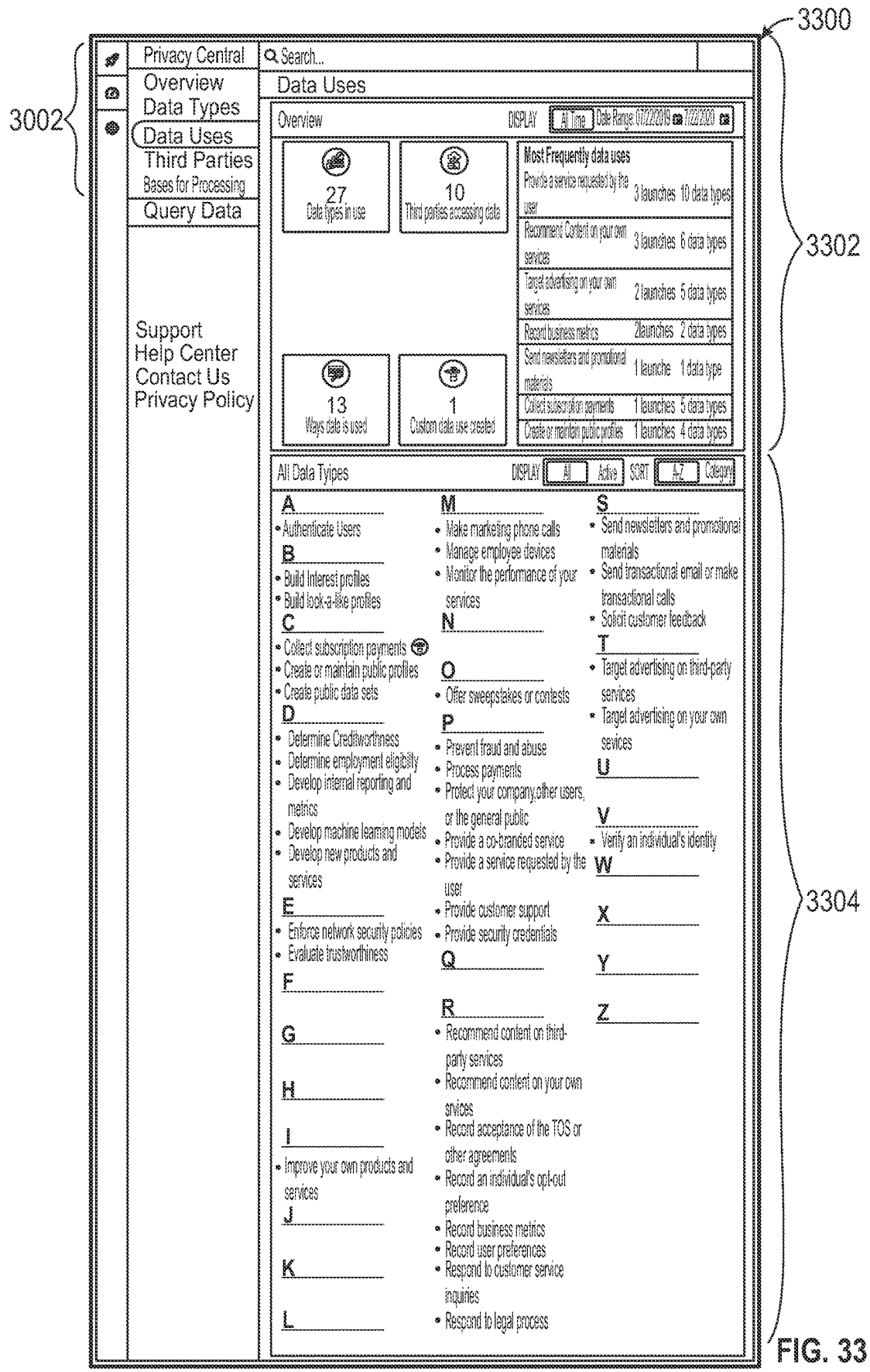
FIG. 33 illustrates a dashboard UI for providing an overview of intended uses for personal data by a product/process, in accordance with some example embodiments.

FIG. 33 illustrates a dashboard UI 3300 for providing an overview of intended uses for personal data by a product/process, in accordance with some example embodiments. In one or more embodiments, the dashboard UI 13300 corresponds to when a user selects the "data uses" category within the dashboard categories 3002. In response to such selection, the compliance client 108 (e.g., in conjunction with the compliance server system 104) provides for display of the personal data uses statistics 3302 and personal data uses list 3304.

The personal data uses statistics 3302 provides statistical information regarding the uses of personal data with respect to the features (e.g., launches) falling within specified time period. The personal data uses list 3304 corresponds to the different data uses that were specified with respect to the particular time period. The different data uses may span multiple launches/features (e.g., those which fall within the specified time period) with respect to the product/process.

It is noted that the categories, questions, candidate responses, options and/or other interface elements discussed above with respect to FIG. 33 correspond to an example embodiment. A different arrangement of categories, questions, candidate responses, options and/or other interface elements (e.g., including real-time, inline help and recommendations) may be used in alternate embodiments.

Moreover, while the above-described elements are described as being user-selected, user-selectable or user-specified, the compliance system 100 is not limited to such types of responses. As an alternative or supplement to user-submitted responses, the responses as described herein may be based on values accessed from a data store (e.g., by scanning a customer system database).

Figure 34:
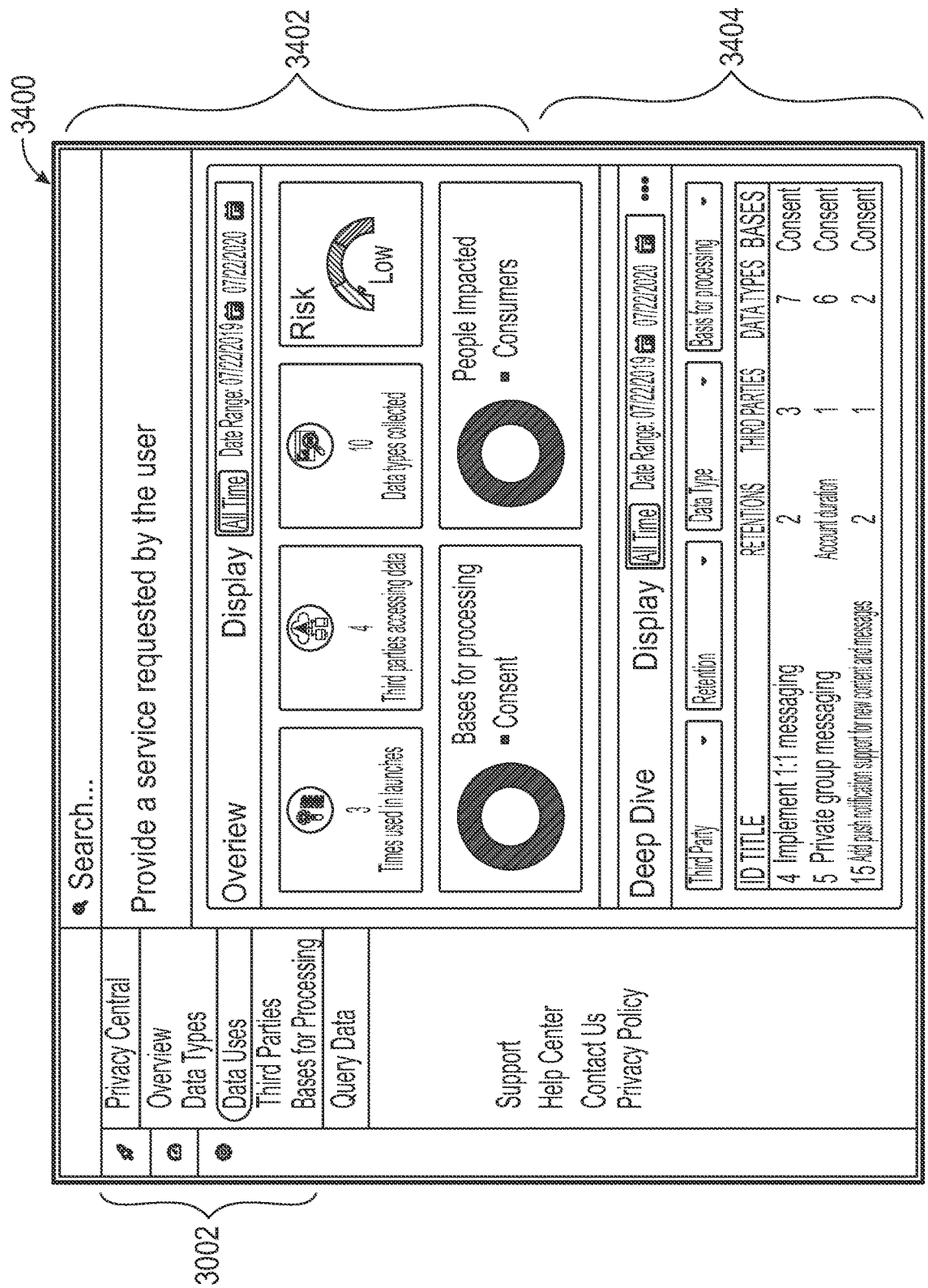
FIG. 34 illustrates a dashboard UI for providing information on specific intended uses for personal data by a product/process, in accordance with some example embodiments.

FIG. 34 illustrates a dashboard UIll 3400 for providing information on specific intended uses for personal data by a product/process (e.g., or feature(s) thereof), in accordance with some example embodiments. In one or more embodiments, the dashboard UI 3400 corresponds to when a user selects a specific data type (e.g., "provide service requested by the user") within the personal data uses statistics 3302.

In response to such selection, the compliance client 108 (e.g., in conjunction with the compliance server system 104) provides for display of a selected use overview 3402 and selected use deep dive 3404, which may respectively include user-selectable fields/filters.

It is noted that the categories, questions, candidate responses, options and/or other interface elements discussed above with respect to FIG. 34 correspond to an example embodiment. A different arrangement of categories, questions, candidate responses, options and/or other interface elements (e.g., including real-time, inline help and recommendations) may be used in alternate embodiments.

Moreover, while the above-described elements are described as being user-selected, user-selectable or user-specified, the compliance system 100 is not limited to such types of responses. As an alternative or supplement to user-submitted responses, the responses as described herein may be based on values accessed from a data store (e.g., by scanning a customer system database).

Figure 35:
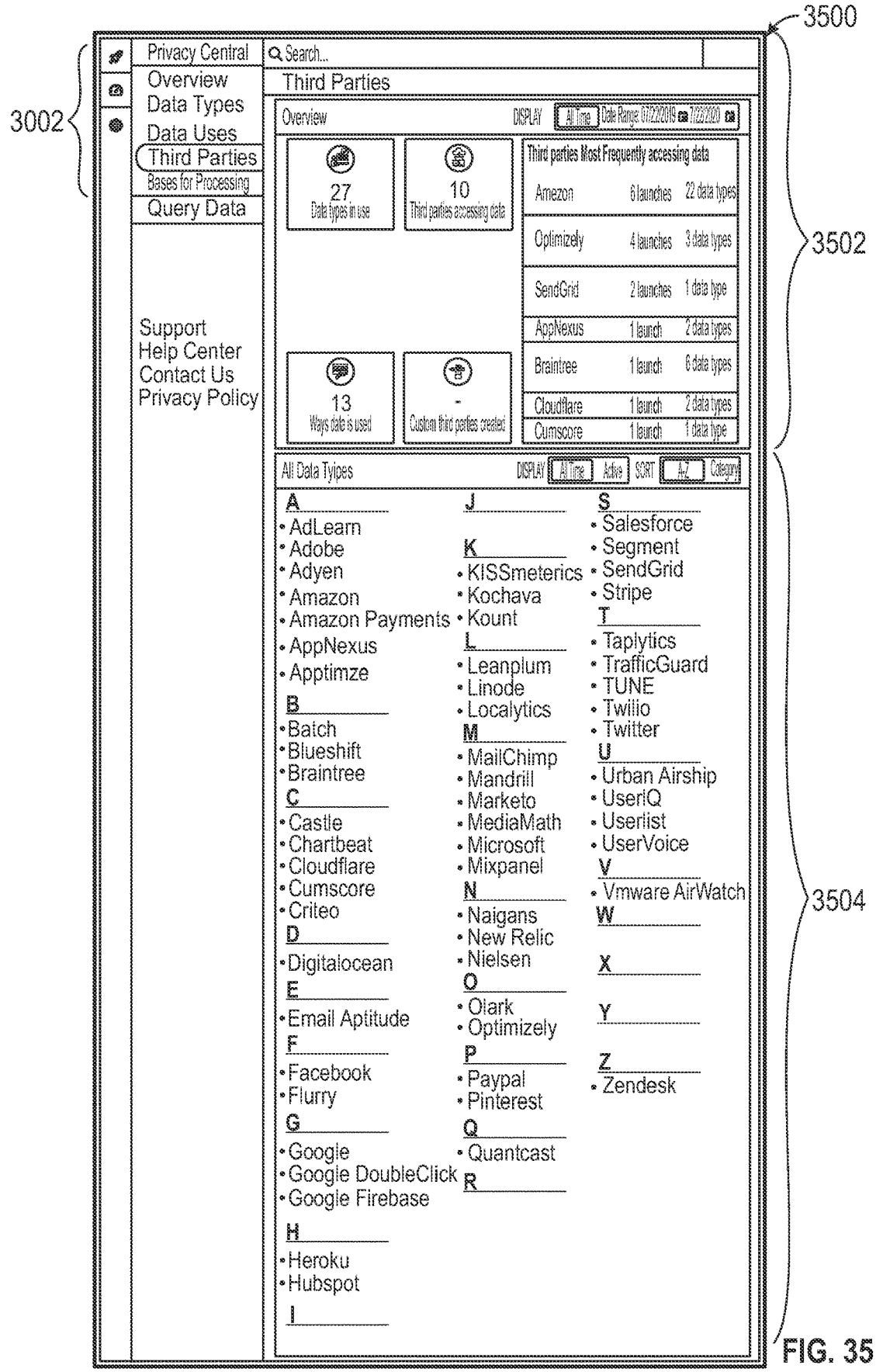
FIG. 35 illustrates a dashboard HI for providing an overview of third party processing of personal data intended for use by a product/process, in accordance with some example embodiments.

FIG. 35 illustrates a dashboard UI 3500 for providing an overview of third party processing of personal data intended for use by a product/process, in accordance with some example embodiments. In one or more embodiments, the dashboard UI 3500 corresponds to when a user selects the "third parties" category within the dashboard categories 3002. In response to such selection, the compliance client 108 (e.g., in conjunction with the compliance server system 104) provides for display of third parties statistics 3502 and a third parties list 3504.

The third parties statistics 3502 provides statistical information regarding third parties within specified time period. The third parties list 3504 corresponds to the different third parties that were specified to have access to the personal data with respect to the particular time period. The different third parties may span multiple launches/features (e.g., those which fall within the specified time period) with respect to the product/process. As shown, the third parties may be sorted by alphabetically or by category (e.g., per the third parties taxonomy 212) based on a user-selectable sorting element.

It is noted that the categories, questions, candidate responses, options and/or other interface elements discussed above with respect to FIG. 35 correspond to an example embodiment. A different arrangement of categories, questions, candidate responses, options and/or other interface elements (e.g., including real-time, inline help and recommendations) may be used in alternate embodiments.

Moreover, while the above-described elements are described as being user-selected, user-selectable or user-specified, the compliance system 100 is not limited to such types of responses. As an alternative or supplement to user-submitted responses, the responses as described herein may be based on values accessed from a data store (e.g., by scanning a customer system database).

Figure 36:
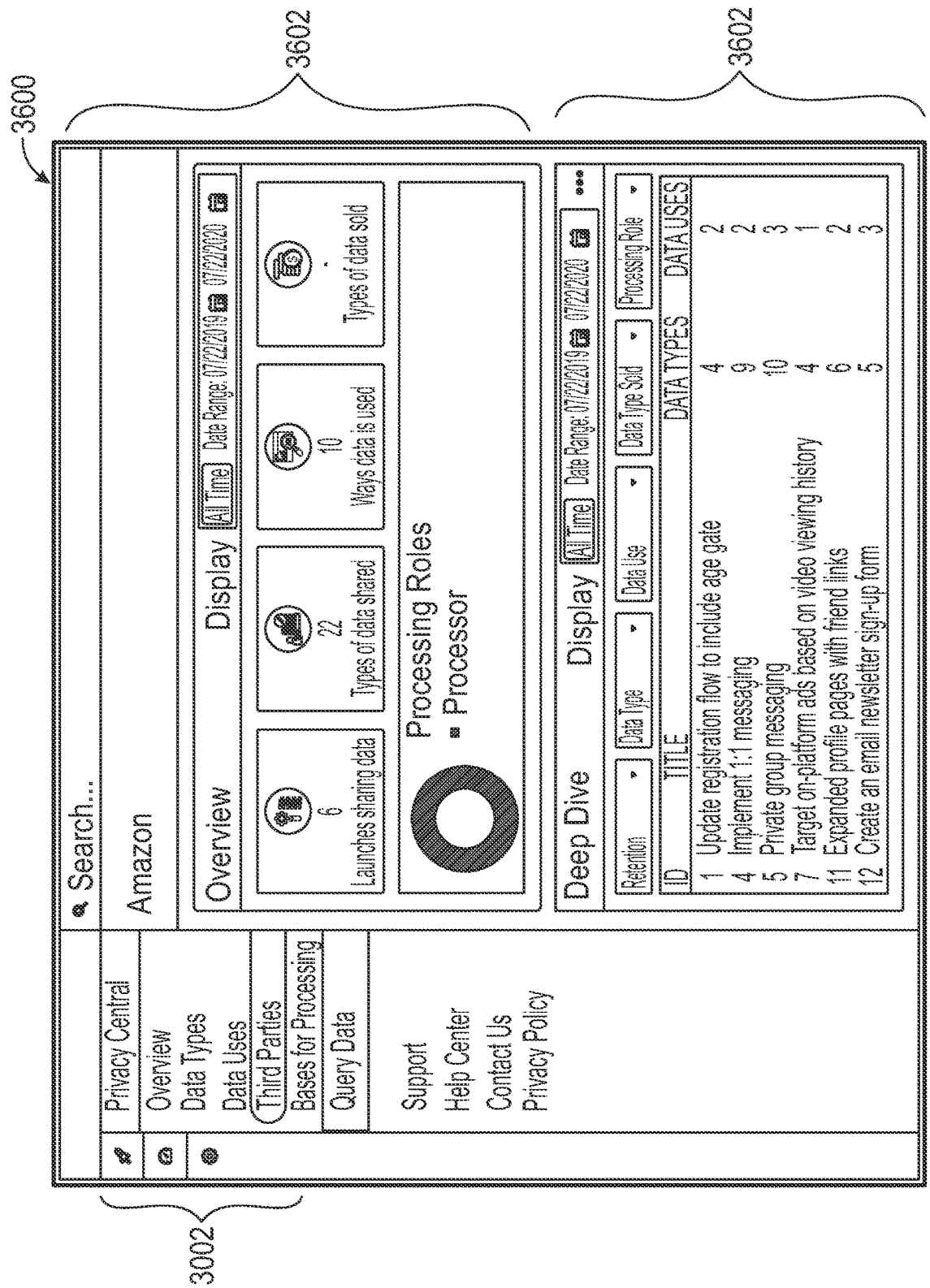
FIG. 36 illustrates a dashboard UI for providing information on specific third parties, in accordance with some example embodiments.

FIG. 36 illustrates a dashboard UI 3600 for providing information on specific third parties, in accordance with some example embodiments. In one or more embodiments, the dashboard UI 3600 corresponds to when a user selects a specific third party (e.g., "Amazon") within the third parties statistics 3502.

In response to such selection, the compliance client 108 (e.g., in conjunction with the compliance server system 104) provides for display of a selected third party overview 3602 and selected third party deep dive 3604, which may respectively include user-selectable fields/filters.

It is noted that the categories, questions, candidate responses, options and/or other interface elements discussed above with respect to FIG. 36 correspond to an example embodiment. A different arrangement of categories, questions, candidate responses, options and/or other interface elements (e.g., including real-time, inline help and recommendations) may be used in alternate embodiments.

Moreover, while the above-described elements are described as being user-selected, user-selectable or user-specified, the compliance system 100 is not limited to such types of responses. As an alternative or supplement to user-submitted responses, the responses as described herein may be based on values accessed from a data store (e.g., by scanning a customer system database).

Figure 37:
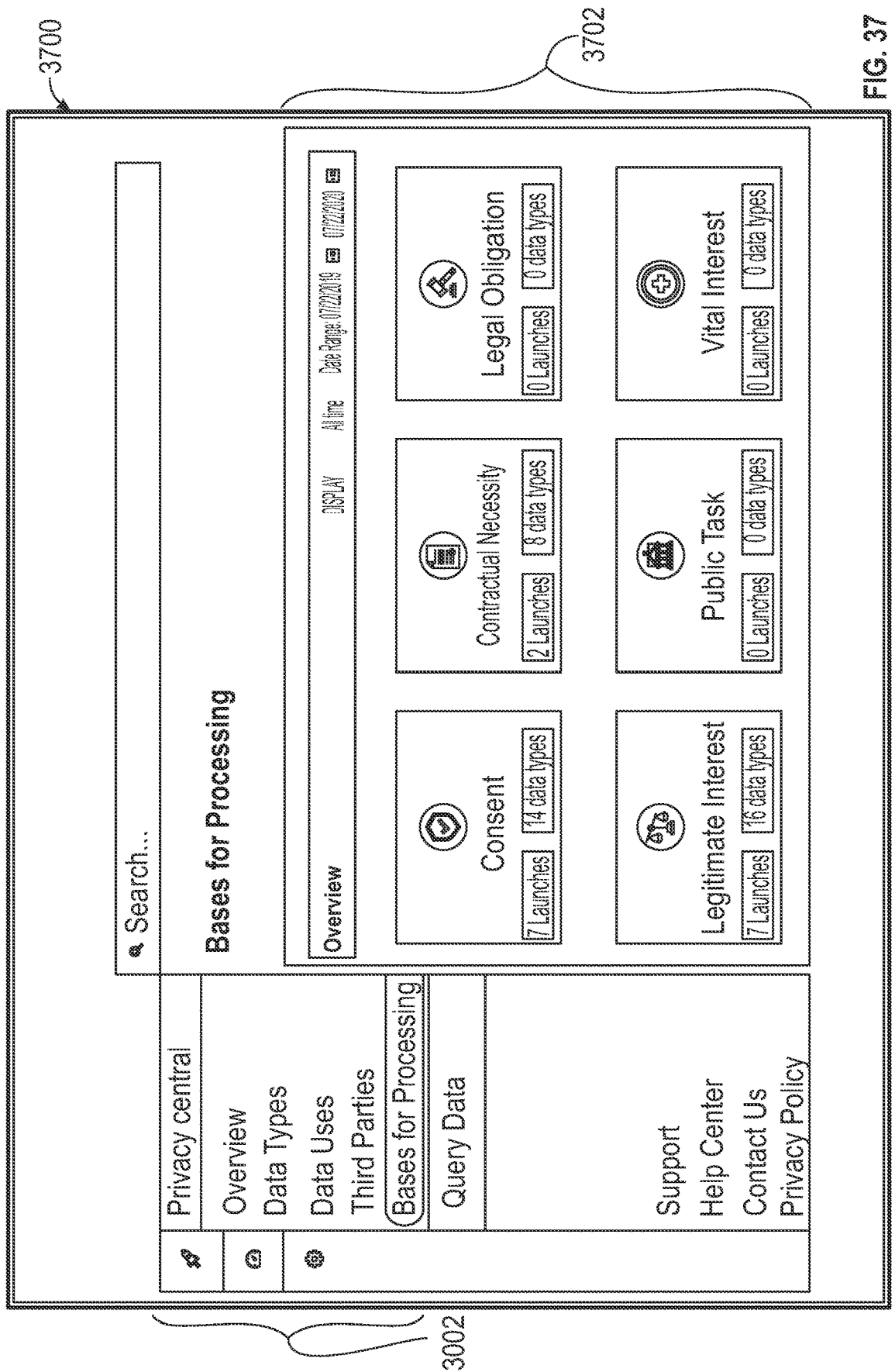
FIG. 37 illustrates a dashboard UI for providing an overview of one or more bases for processing personal data intended for use by a product/process, in accordance with some example embodiments.

FIG. 37 illustrates a dashboard UI 3700 for providing an overview of one or more bases for processing personal data intended for use by a product/process, in accordance with some example embodiments. In one or more embodiments, the dashboard UI 3700 corresponds to when a user selects the "basis for processing" category within the dashboard categories 3002. In response to such selection, the compliance client 108 (e.g., in conjunction with the compliance server system 104) provides for display of a basis for processing overview 3702.

The basis for processing overview 3702 corresponds to the different bases for processing that were specified with respect to the particular time period. The different bases for processing may span multiple launches/features (e.g., those which fall within the specified time period) with respect to the product/process.

It is noted that the categories, questions, candidate responses, options and/or other interface elements discussed above with respect to FIG. 37 correspond to an example embodiment. A different arrangement of categories, questions, candidate responses, options and/or other interface elements (e.g., including real-time, inline help and recommendations) may be used in alternate embodiments.

Moreover, while the above-described elements are described as being user-selected, user-selectable or user-specified, the compliance system 100 is not limited to such types of responses. As an alternative or supplement to user-submitted responses, the responses as described herein may be based on values accessed from a data store (e.g., by scanning a customer system database).

Figure 38:
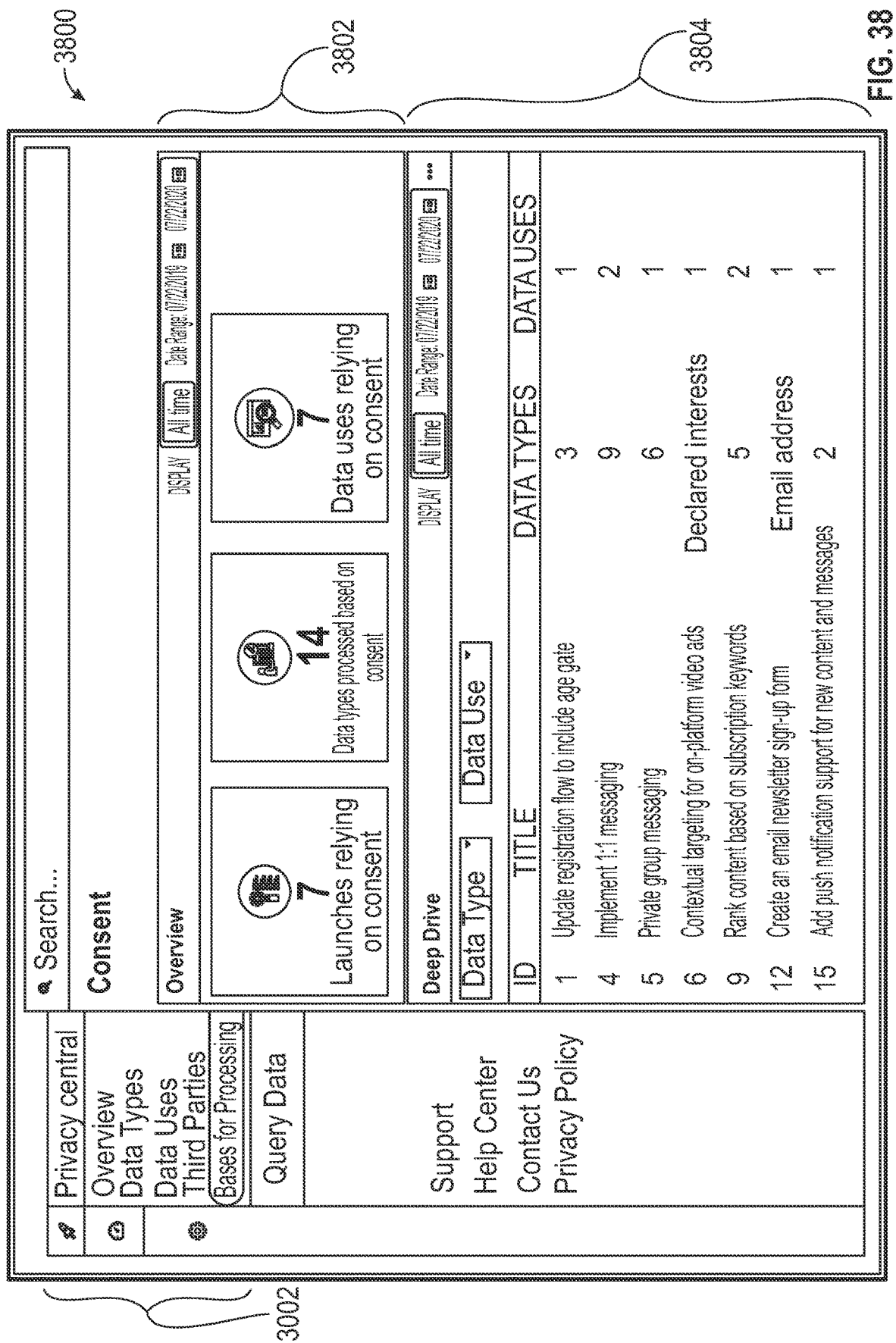
FIG. 38 illustrates a dashboard UI for providing information on a specific basis for processing, in accordance with some example embodiments.

FIG. 38 illustrates a dashboard UI 3800 for providing information on a specific basis for processing, in accordance with some example embodiments. In one or more embodiments, the dashboard UI 3800 corresponds to when a user selects a specific basis for processing (e.g., "consent") within the basis for processing overview 3702.

In response to such selection, the compliance client 108 (e.g., in conjunction with the compliance server system 104) provides for display of a selected basis for processing overview 3802 and selected basis for processing deep dive 3804, which may respectively include user-selectable fields/filters.

It is noted that the categories, questions, candidate responses, options and/or other interface elements discussed above with respect to FIG. 38 correspond to an example embodiment. A different arrangement of categories, questions, candidate responses, options and/or other interface elements (e.g., including real-time, inline help and recommendations) may be used in alternate embodiments.

Moreover, while the above-described elements are described as being user-selected, user-selectable or user-specified, the compliance system 100 is not limited to such types of responses. As an alternative or supplement to user-submitted responses, the responses as described herein may be based on values accessed from a data store (e.g., by scanning a customer system database).

FIG. 39 illustrates a dashboard UI 3900 for performing a query with respect to personal data, in accordance with some example embodiments. In one or more embodiments, the dashboard UI 3900 corresponds to when a user selects the query data category 3902, which may be displayed in conjunction within the dashboard categories 3002. In response to such selection, the compliance client 108 (e.g., in conjunction with the compliance server system 104) provides for display of a query data selection interface 3904 and a query data refinement interface 3906.

The query data selection interface 3904 allows the user to select between data types, data categories, data sources, data uses, third parties and third party categories for querying the compliance system 100 with respect to the use of personal data (e.g., to generate a results page). In addition, the query data refinement interface 3906 provides additional filters (e.g., category, retention period) for the query.

It is noted that the categories, questions, candidate responses, options and/or other interface elements discussed above with respect to FIG. 39 correspond to an example embodiment. A different arrangement of categories, questions, candidate responses, options and/or other interface elements (e.g., including real-time, inline help and recommendations) may be used in alternate embodiments.

Moreover, while the above-described elements are described as being user-selected, user-selectable or user-specified, the compliance system 100 is not limited to such types of responses. As an alternative or supplement to user-submitted responses, the responses as described herein may be based on values accessed from a data store (e.g., by scanning a customer system database).

Figure 40:
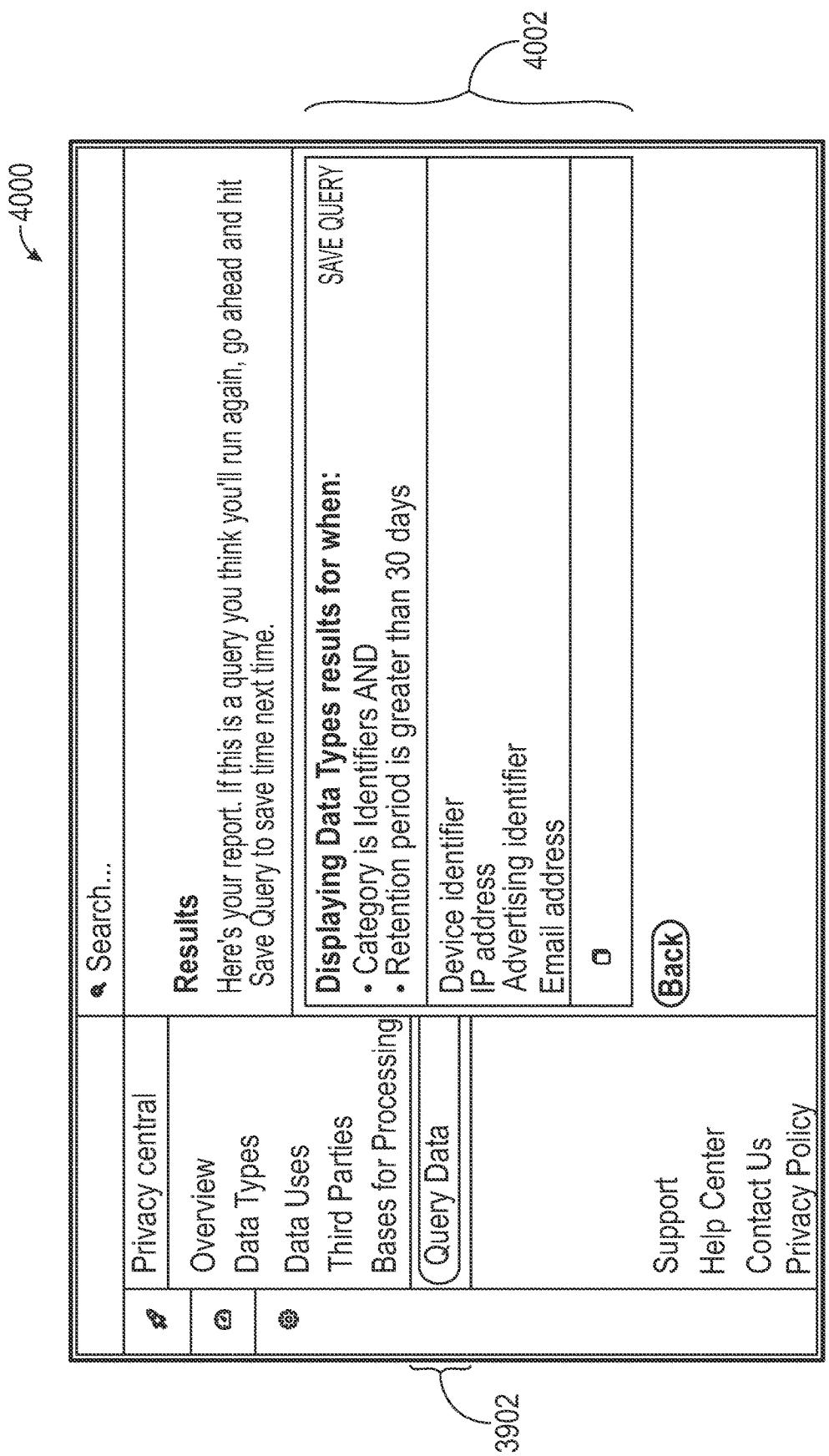
FIG. 40 illustrates a dashboard UI for providing a results page for a query, in accordance with some example embodiments.

FIG. 40 illustrates a dashboard UI 4000 for providing a results page for a query, in accordance with some example embodiments. In one or more embodiments, the dashboard UI 4000 corresponds to when a user selects "display results" via the dashboard UI 3900.

In response to such selection, the compliance client 108 (e.g., in conjunction with the compliance server system 104) provides for display of query results 4002 based on the user-selected query.

It is noted that the categories, questions, candidate responses, options and/or other interface elements discussed above with respect to FIG. 40 correspond to an example embodiment. A different arrangement of categories, questions, candidate responses, options and/or other interface elements (e.g., including real-time, inline help and recommendations) may be used in alternate embodiments.

Thus, the data specification system 202 (e.g., including taxonomies 208-212), the privacy review system 204 and the data mapping system 206 as described herein provide for various questionnaires, recommendations/considerations, assessments and dashboard interfaces related to privacy compliance of a product/process. The compliance client 108 in conjunction with the compliance server system 104 may provide for more efficient review of a new launch (e.g., that may related to previous launches that were already approved). In another example, the compliance client 108 may provide for responding more accurately to an incident involving a vendor by searching what data is shared with that vendor and assessing exposure more effectively. In yet another example, the compliance client 108 may provide for determining whether to update the privacy policy by regularly searching on new data uses.

Moreover, the compliance client 108 in conjunction with the compliance server system 104 may provide for surfacing trends that may allow privacy teams to build better privacy programs. For example, the compliance client 108 may provide to prioritize privacy hardening work. If privacy reviews shift focus to a particular data type (e.g., end-user geo-location), it is possible for the compliance client 108 to surface this as a growing new trend and organizations may start to build better storage for that sensitive user data. In another example, if more vendors begin having access to more sensitive information, it is possible for the compliance client 108 to suggest raising privacy due diligence on vendors. In yet another example, the compliance client 108 may provide for better understanding bottlenecks in privacy by design program and resource allocation. The compliance client 108 may provide graphs showing the number of reviews being done at a given time period, the time it takes to conduct these reviews, and how close the reviews are being done to launch dates, and the like.

Figure 41:
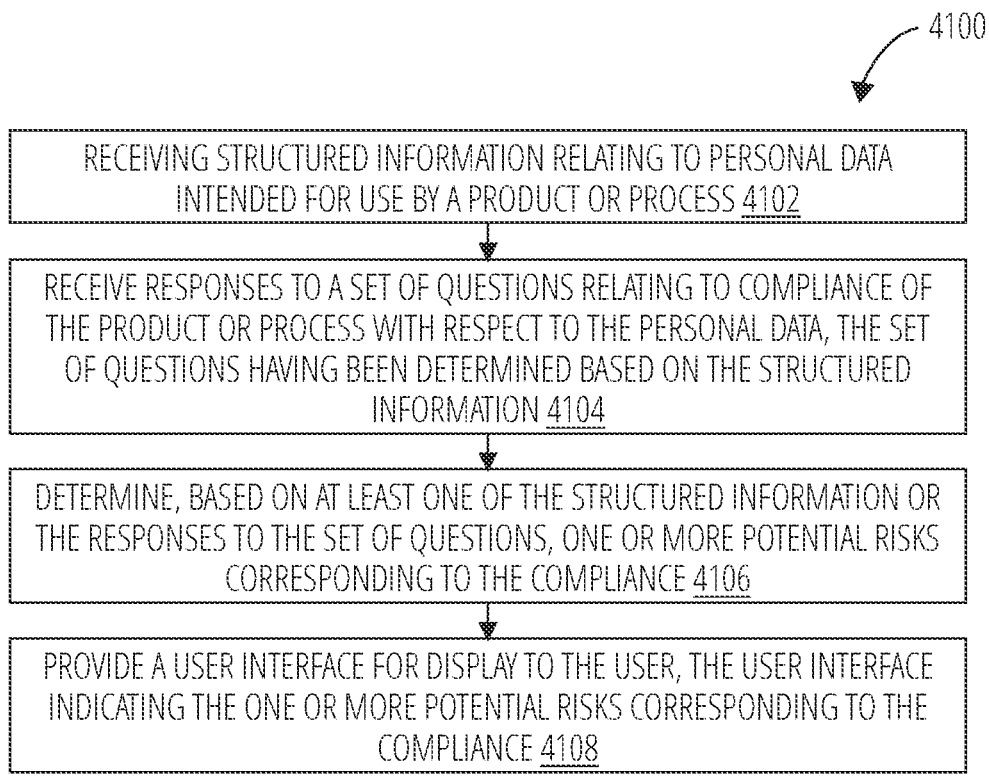
FIG. 41 is a flowchart illustrating a process for indicating potential risks regarding compliance of personal data intended for use by a product/process, in accordance with some example embodiments.

FIG. 41 is a flowchart illustrating a process 4100 for indicating potential risks regarding compliance of personal data intended for use by a product/process, in accordance with some example embodiments. For explanatory purposes, the process 4100 is primarily described herein with reference to the compliance server system 104 and the client device 106 of FIG. 1. However, one or more blocks (or operations) of the process 4100 may be performed by one or more other components of the compliance server system 104, the client device 106, and/or by other suitable devices. Further for explanatory purposes, the blocks of the process 4100 are described herein as occurring in serial, or linearly. However, multiple blocks of the process 4100 may occur in parallel. In addition, the blocks of the process 4100 need not be performed in the order shown and/or one or more blocks of the process 4100 need not be performed and/or can be replaced by other operations.

The compliance server system 104 receives structured information relating to personal data intended for use by a product or process (block 4102). The product may include at least one of a software component or a hardware component.

The structured information may be based on a taxonomy that classifies candidate uses of the personal data and candidate types of the personal data. The taxonomy may define a workflow for determining intended uses and types of personal data intended for use by the product or process, and for reviewing the product or process for compliance with respect to the personal data.

The workflow may be configured to vary based on which of the candidate types of personal data intended for use by the product or process. The workflow may further be configured to vary based on which of the candidate uses apply for the personal data intended for use by the product or process.

The taxonomy may further classify retention procedures for the personal data. The retention procedure may specify at least one of a retention period or a manner in which personal data is removed.

The compliance server system 104 receives responses, provided by a user and/or accessed from a data store, to a set of questions relating to compliance of the product or process with respect to the personal data, the set of questions having been determined based on the structured information (block 4104) The compliance may correspond to at least one of privacy compliance, security compliance, legal compliance or internal policy compliance.

The structured information may correspond to user responses to initial questions relating to the personal data intended for use by the product or process. The set of questions may be based at least in part on the user responses to the initial questions.

The compliance server system 104 determines, based on at least one of the structured information or the responses to the set of questions, one or more potential risks corresponding to the compliance (block 4106).

The compliance server system 104 provides a user interface for display to a user, the user interface indicating the one or more potential risks corresponding to the compliance (block 4108). The one or more potential risks may correspond to a privacy impact assessment (e.g., legitimate interest assessment (LIA) or a data protection impact assessment (DPIA)).

The compliance server system 104 may assign, for each of the one or more potential risks, a respective risk level or flag for the potential risk, wherein the user interface displays an indication of the respective assigned risk level or flag for the potential risk. The respective levels of review may be based on administrator-specified values for each of the one or more potential risks. For each of the one or more potential risks, the user interface includes at least one of a recommendation corresponding to the potential risk for presenting to the user, or a third set of questions corresponding to the potential risk for presenting to the user.

Figure 42:
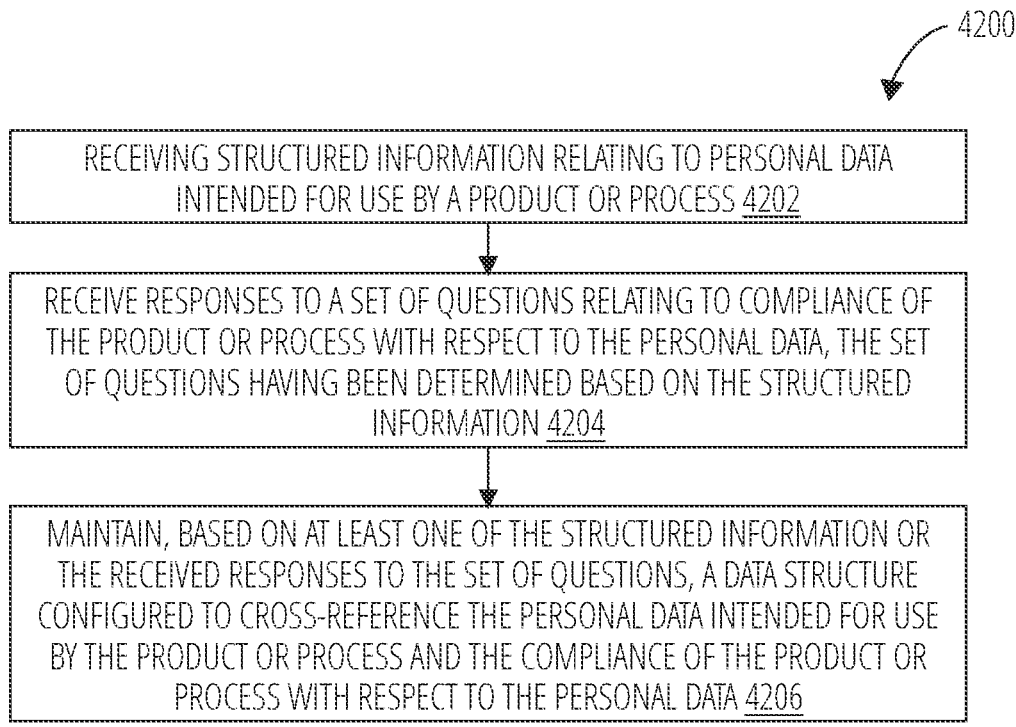
FIG. 42 is a flowchart illustrating a process for maintaining a data structure to cross-reference personal data intended for use by a product/process with compliance parameters, in accordance with some example embodiments.

FIG. 42 is a flowchart illustrating a process 4200 for maintaining a data structure to cross-reference personal data intended for use by a product/process with compliance parameters, in accordance with some example embodiments. For explanatory purposes, the process 4200 is primarily described herein with reference to the compliance server system 104 and the client device 106 of FIG. 1. However, one or more blocks (or operations) of the process 4200 may be performed by one or more other components of the compliance server system 104, the client device 106, and/or by other suitable devices. Further for explanatory purposes, the blocks of the process 4200 are described herein as occurring in serial, or linearly. However, multiple blocks of the process 4200 may occur in parallel. In addition, the blocks of the process 4200 need not be performed in the order shown and/or one or more blocks of the process 4200 need not be performed and/or can be replaced by other operations.

The compliance server system 104 receives structured information relating to personal data intended for use by a product or process (block 4202).

The compliance server system 104 receives responses, provided by a user and/or accessed from a data store, to a set of questions relating to compliance of the product or process with respect to the personal data, the set of questions having been determined based on the structured information (block 4204). The compliance may correspond to at least one of privacy compliance, security compliance, legal compliance or internal policy compliance.

The compliance server system 104 maintains, based on at least one of the structured information or the received responses to the set of questions, a data structure configured to cross-reference the personal data intended for use by the product or process and the compliance of the product or process with respect to the personal data (block 4206). The data structure is configured to be updated in real-time based on subsequent user-provided responses, the subsequent user-provided responses relating to at least one of the personal data intended for use by the product or process or the compliance of the product or process with respect to the personal data. The data structure may be further configured to cross-reference and be updated in real-time with respect to supplemental information that is specific to an organization associated with the product or process.

The compliance server system 104 may receive responses, provided by one or more third users and/or accessed from a data store, to a third set of questions relating to additional compliance of the product or process with respect to the personal data, the third set of questions having been determined based on the structured information. Maintaining the data structure may be further based on the responses for the third set of questions.

The structured information may relate to types of the personal data and uses of the personal data. The data structure may be configured to cross-reference and be updated in real-time with respect to one or more of the types of the personal data, the uses of the personal data, or the compliance of the product or process with respect to the personal data. The data structure may be further configured to cross-reference and be updated in real-time with respect to one or more of a business purpose of the product or process, retention procedures for the personal data, third party usage of the personal data, or data sources of the personal data, based on a subset of the structured information.

The compliance server system 104 may provide a user interface for editing the data structure with respect to the personal data intended for use by the product or process or the compliance of the product or process with respect to the personal data.

Figure 43:
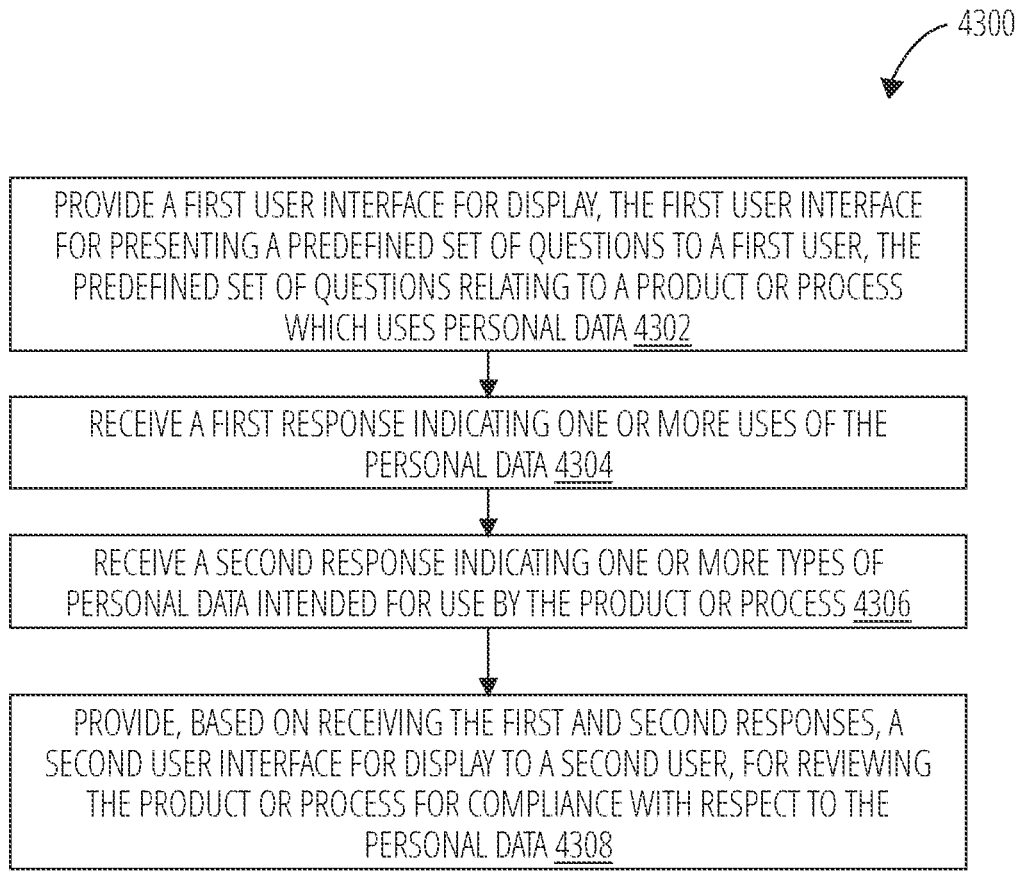
FIG. 43 is a flowchart illustrating a process for obtaining responses indicating personal data intended for use by a product/process, in accordance with some example embodiments.

FIG. 43 is a flowchart illustrating a process 4300 for obtaining responses indicating personal data intended for use by a product/process, in accordance with some example embodiments. For explanatory purposes, the process 4300 is primarily described herein with reference to the compliance server system 104 and the client device 106 of FIG. 1. However, one or more blocks (or operations) of the process 4300 may be performed by one or more other components of the compliance server system 104, the client device 106, and/or by other suitable devices. Further for explanatory purposes, the blocks of the process 4300 are described herein as occurring in serial, or linearly. However, multiple blocks of the process 4300 may occur in parallel. In addition, the blocks of the process 4300 need not be performed in the order shown and/or one or more blocks of the process 4300 need not be performed and/or can be replaced by other operations.

The compliance server system 104 provides a first user interface for display, the first user interface for presenting a predefined set of questions to a first user, the predefined set of questions relating to a product or process which uses personal data (block 4302). The product may include at least one of a software component or a hardware component.

In response to providing the first user interface for display, the compliance server system 104 receives a first response (e.g., user-submitted and/or accessed from a data store) indicating one or more uses of the personal data (block 4304). The compliance server system 104 receives a second response indicating one or more types of personal data intended for use by the product or process (block 4306).

The compliance server system 104 provides, based on receiving the first and second responses, a second user interface for display to a second user, for reviewing the product or process for compliance with respect to the personal data (block 4308). The compliance may correspond to at least one of privacy compliance, security compliance, legal compliance or internal policy compliance.

In response to providing the first user interface for display, the compliance server system 104 may receive additional response(s) indicating one or more of: a business purpose of the product or process, a retention procedure for the personal data, third party usage for the personal data, and/or a data source for the personal data. Providing the second user interface may be further based on the additional response(s).

Figure 44:
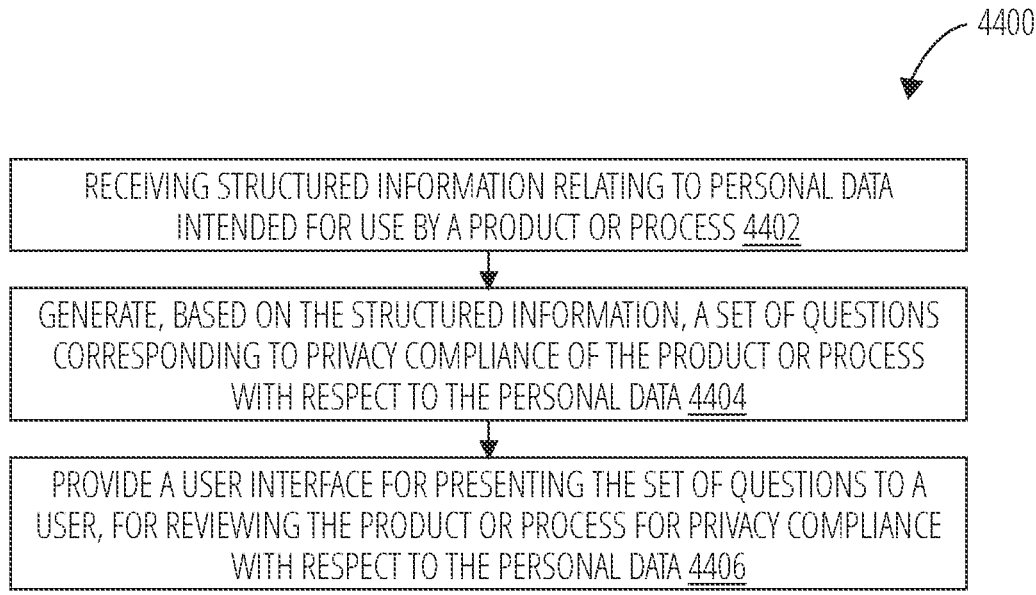
FIG. 44 is a flowchart illustrating a process for generating questions corresponding to privacy compliance of a product/process, in accordance with some example embodiments.

FIG. 44 is a flowchart illustrating a process for generating questions corresponding to privacy compliance of a product/process, in accordance with some example embodiments. For explanatory purposes, the process 4400 is primarily described herein with reference to the compliance server system 104 and the client device 106 of FIG. 1. However, one or more blocks (or operations) of the process 4400 may be performed by one or more other components of the compliance server system 104, the client device 106, and/or by other suitable devices. Further for explanatory purposes, the blocks of the process 4400 are described herein as occurring in serial, or linearly. However, multiple blocks of the process 4400 may occur in parallel. In addition, the blocks of the process 4400 need not be performed in the order shown and/or one or more blocks of the process 41400 need not be performed and/or can be replaced by other operations.

The compliance server system 104 receives structured information relating to personal data intended for use by a product or process (block 4402). The product may include at least one of a software component or a hardware component.

The compliance server system 104 generates, based on the structured information, a set of questions corresponding to privacy compliance of the product or process with respect to the personal data (block 4404). The structured information may correspond to user responses to initial questions relating to the personal data intended for use by the product or process, and the set of questions may be based at least in part on the user responses to the initial questions.

The user responses may be provided by a second user that is different than the user. Alternatively, the responses may be provided by the same user. Latter-presented questions within the set of questions may be based at least in part on responses, by the user, to earlier-presented questions within the set of questions.

The compliance server system 104 provides a user interface for presenting the set of questions to a user, for reviewing the product or process for privacy compliance with respect to the personal data (block 4406). The compliance server system 104 may receive responses, provided by the user, to the set of questions, and store the responses to the set of questions in association with the structured information.

The compliance server system 104 may generate, based on at least one of the structured information or the received responses to the set of questions, a report corresponding to the privacy compliance. The compliance server system 104 may provide, in response to receiving the responses to the set of questions, a user-selectable element to generate the report, and the generating may be performed in response to user selection of the user-selectable element.

The compliance server system 104 may provide the generated report for display to a user, for documenting the product or process for compliance with respect to the personal data. The generated report may be configured for at least one of viewing, editing or exporting by the user.

The report may correspond to a legitimate interest assessment (LIA) with respect to the personal data intended for use by the product or process. Alternatively or in addition, the report may correspond to a data protection impact assessment (DPIA) with respect to the personal data intended for use by the product or process.

Figure 45:
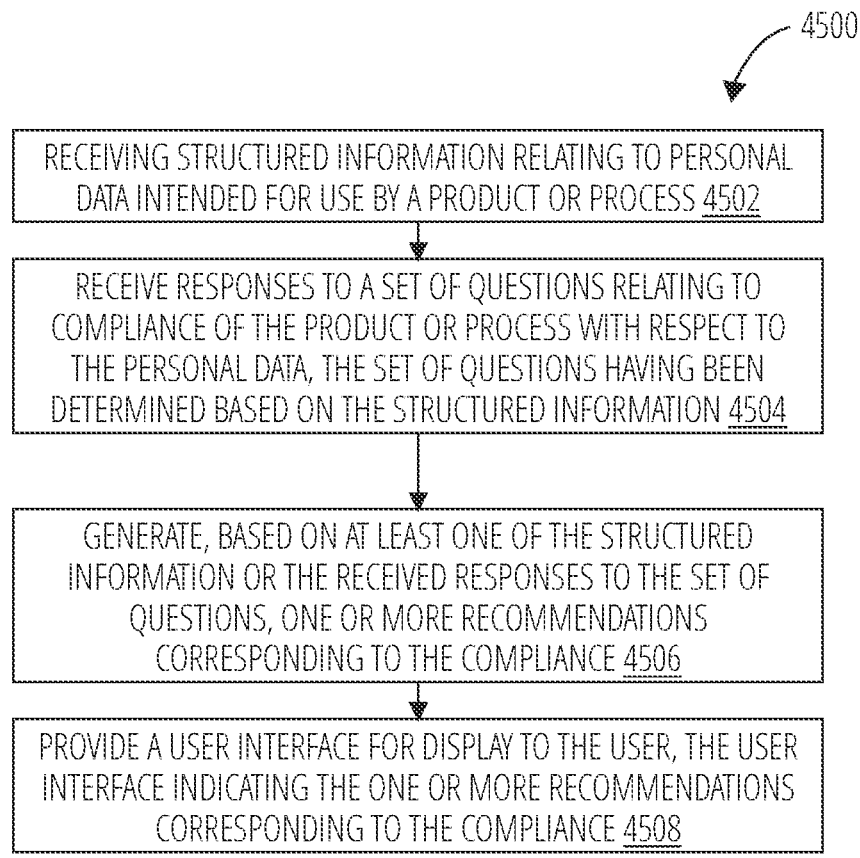
FIG. 45 is a flowchart illustrating a process for indicating recommendations and/or considerations regarding compliance of personal data intended for use by a product/process, in accordance with some example embodiments.

FIG. 45 is a flowchart illustrating a process for indicating recommendations and/or considerations regarding compliance of personal data intended for use by a product/process, in accordance with some example embodiments. For explanatory purposes, the process 4500 is primarily described herein with reference to the compliance server system 104 and the client device 106 of FIG. 1. However, one or more blocks (or operations) of the process 4500 may be performed by one or more other components of the compliance server system 104, the client device 106, and/or by other suitable devices. Further for explanatory purposes, the blocks of the process 4500 are described herein as occurring in serial, or linearly. However, multiple blocks of the process 4500 may occur in parallel. In addition, the blocks of the process 4500 need not be performed in the order shown and/or one or more blocks of the process 4500 need not be performed and/or can be replaced by other operations.

The compliance server system 104 receives structured information relating to personal data intended for use by a product or process (block 4502). The structured information may correspond to user responses to initial questions relating to the personal data intended for use by the product or process, and the set of questions may be based at least in part on the user responses to the initial questions.

The compliance server system 104 receives responses, provided by a user and/or accessed from a data store, to a set of questions relating to compliance of the product or process with respect to the personal data, the set of questions having been determined based on the structured information (block 4504). The compliance may correspond to at least one of privacy compliance, security compliance, legal compliance or internal policy compliance.

The compliance server system 104 generates, based on at least one of the structured information or the received responses to the set of questions, one or more recommendations/considerations corresponding to the compliance (block 4506). The one or more recommendations/considerations may relate to a privacy impact assessment (e.g., legitimate interest assessment (LIA) or a data protection impact assessment (DPIA)) with respect to the personal data intended for use by the product or process.

The compliance server system 104 provides a user interface for display to a user, the user interface indicating the one or more recommendations/considerations corresponding to the compliance (block 4508). The compliance server system 104 may categorize the one or more recommendations/considerations based at least in part on a respective risk level associated with each of the one recommendations/considerations, and the user interface may display the one or more recommendations/considerations based on the categorizing.

The compliance server system 104 may provide for display of at least one of the one or more recommendations/considerations in real-time, in conjunction with presentation of the set of questions. The one or more recommendations/considerations may correspond to a post-launch phase of the product or process.

Figure 46:
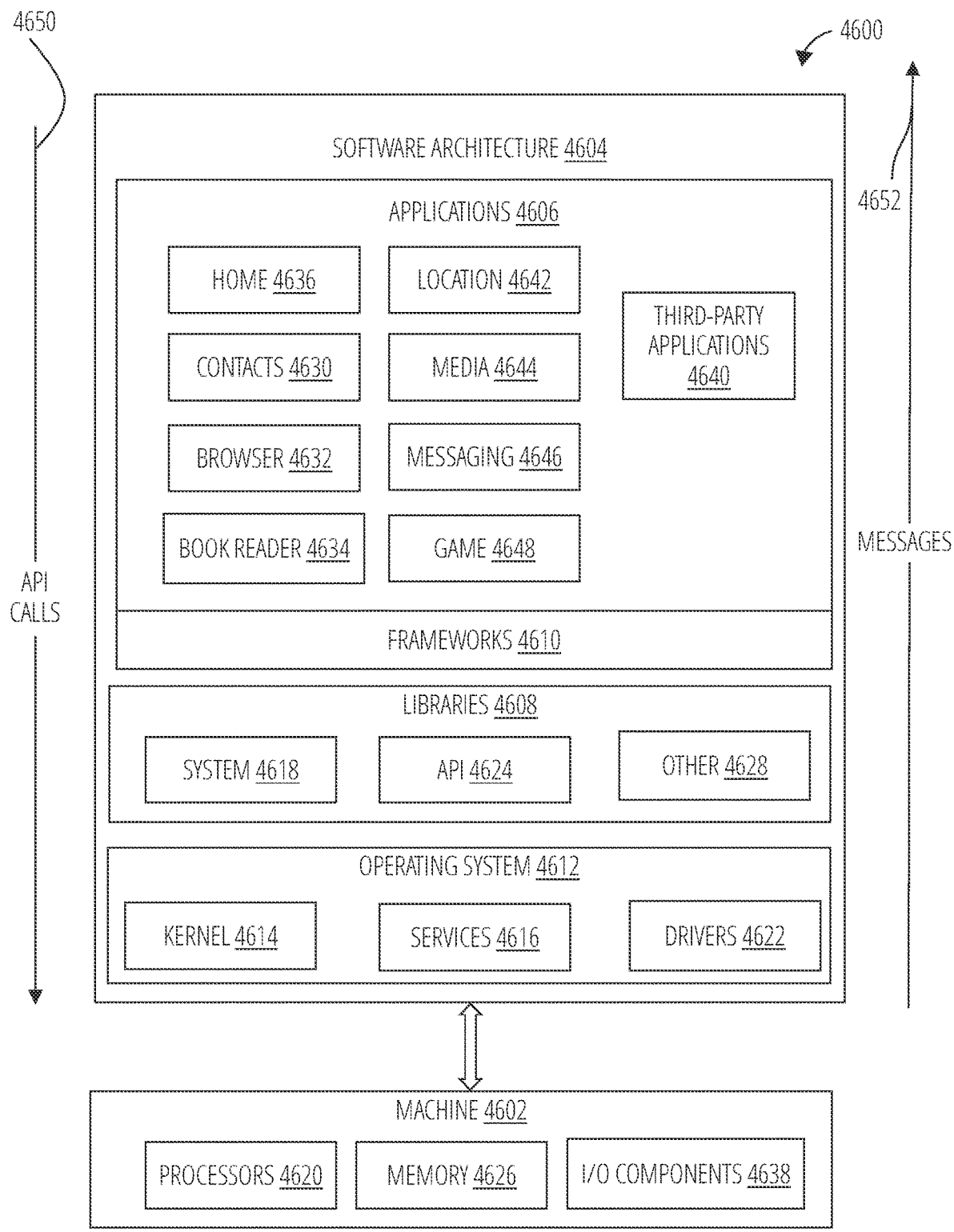
FIG. 46 is block diagram showing a software architecture within which the present disclosure may be implemented, in accordance with some example embodiments.

FIG. 46 is a block diagram 4600 illustrating a software architecture 4604, which can be installed on any one or more of the devices described herein. The software architecture 4604 is supported by hardware such as a machine 4602 that includes processors 4620, memory 4626, and i/O components 4638. In this example, the software architecture 4604 can be conceptualized as a stack of layers, where each layer provides a particular functionality. The software architecture 4604 includes layers such as an operating system 4612, libraries 4608, frameworks 4610, and applications 4606. Operationally, the applications 4606 invoke API calls 4650 through the software stack and receive messages 4652 in response to the API calls 4650.

The operating system 4612 manages hardware resources and provides common services. The operating system 4612 includes, for example, a kernel 4614, services 4616, and drivers 4622. The kernel 4614 acts as an abstraction layer between the hardware and the other software layers. For example, the kernel 4614 provides memory management, processor management (e.g., scheduling), component management, networking, and security settings, among other functionality. The services 4616 can provide other common services for the other software layers. The drivers 4622 are responsible for controlling or interfacing with the underlying hardware. For instance, the drivers 4622 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 4608 provide a low-level common infrastructure used by the applications 4606. The libraries 4608 can include system libraries 4618 (e.g., C standard library) that provide functions such as memory allocation functions, string manipulation functions, mathematic functions, and the like. In addition, the libraries 4608 can include API libraries 4624 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 4608 can also include a wide variety of other libraries 4628 to provide many other APIs to the applications 4606.

The frameworks 4610 provide a high-level common infrastructure that is used by the applications 4606. For example, the frameworks 4610 provide various graphical user interface (GUI) functions, high-level resource management, and high-level location services. The frameworks 4610 can provide a broad spectrum of other APIs that can be used by the applications 4606, some of which may be specific to a particular operating system or platform.

In an example embodiment, the applications 4606 may include a home application 4636, a contacts application 4630, a browser application 4632, a book reader application 4634, a location application 4642, a media application 4644, a messaging application 4646, a game application 4648, and a broad assortment of other applications such as third-party applications 4640. The applications 4606 are programs that execute functions defined in the programs. Various programming languages can be employed to create one or more of the applications 4606, structured in a variety of manners, such as object-oriented programming languages (e.g., Objective-C, Java, or C++) or procedural programming languages (e.g., C or assembly language). In a specific example, the third-party applications 4640 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 4640 can invoke the API calls 4650 provided by the operating system 4612 to facilitate functionality described herein.

Figure 47:
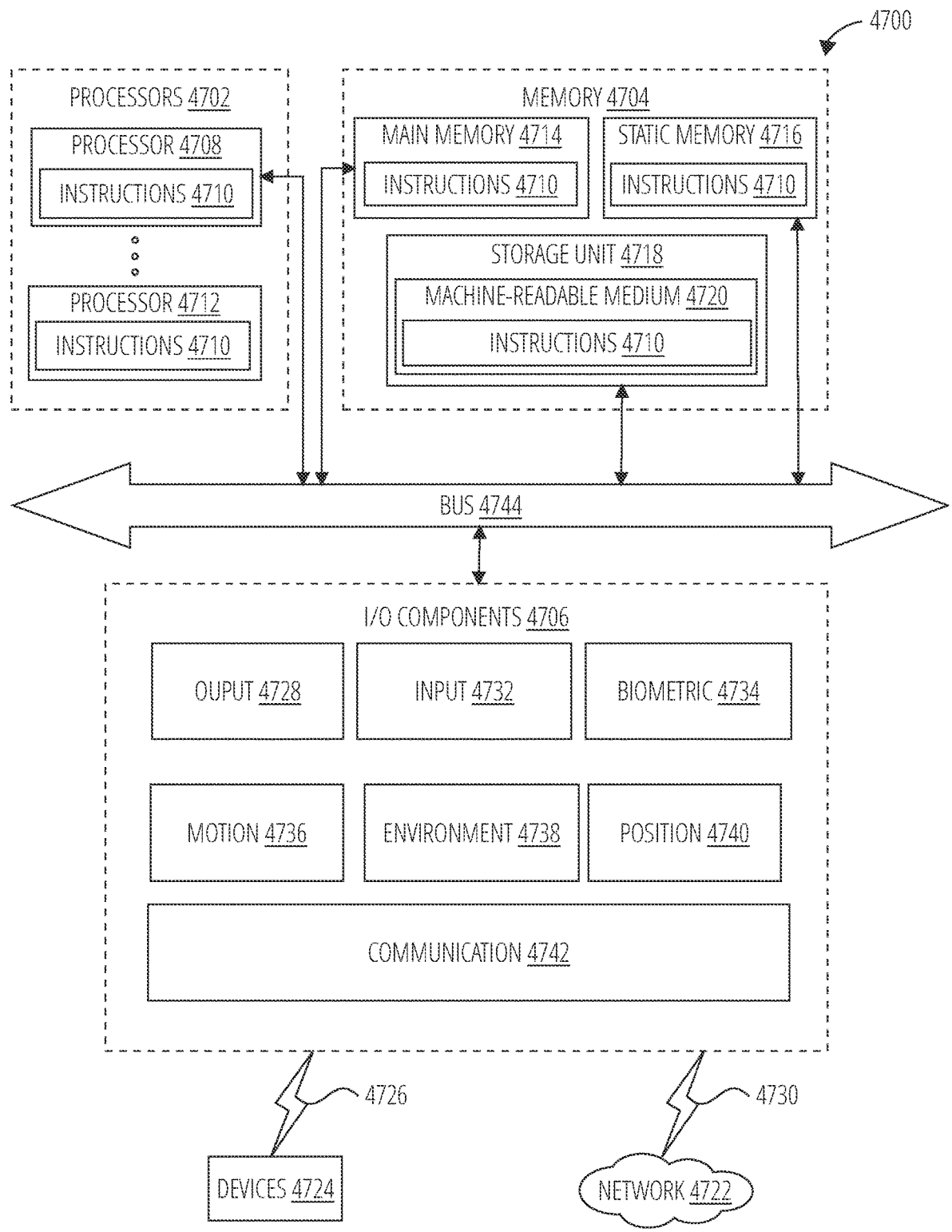
FIG. 47 is a diagrammatic representation of a machine, in the form of a computer system within which a set of instructions may be executed for causing the machine to perform any one or more of the methodologies discussed, in accordance with some example embodiments.

FIG. 47 is a diagrammatic representation of a machine 4700 within which instructions 4710 (e.g., software, a program, an application, an applet, an app, or other executable code) for causing the machine 4700 to perform any one or more of the methodologies discussed herein may be executed. For example, the instructions 4710 may cause the machine 4700 to execute any one or more of the methods described herein. The instructions 4710 transform the general, non-programmed machine 4700 into a particular machine 4700 programmed to carry out the described and illustrated functions in the manner described. The machine 4700 may operate as a standalone device or may be coupled (e.g., networked) to other machines. In a networked deployment, the machine 4700 may operate in the capacity of a server machine or a client machine in a server-client network environment, or as a peer machine in a peer-to-peer (or distributed) network environment. The machine 4700 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 4710, sequentially or otherwise, that specify actions to be taken by the machine 4700. Further, while only a single machine 4700 is illustrated, the term "machine" shall also be taken to include a collection of machines that individually or jointly execute the instructions 4710 to perform any one or more of the methodologies discussed herein.

The machine 4700 may include processors 4702, memory 4704, and I/O components 4706, which may be configured to communicate with each other via a bus 4744. In an example embodiment, the processors 4702 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 4708 and a processor 4712 that execute the instructions 4710. The term "processor" is intended to include multi-core processors that may comprise two or more independent processors (sometimes referred to as "cores") that may execute instructions contemporaneously. Although FIG. 47 shows multiple processors 4702, the machine 4700 may include a single processor with a single core, a single processor with multiple cores (e.g., a multi-core processor), multiple processors with a single core, multiple processors with multiples cores, or any combination thereof.

The memory 4704 includes a main memory 4714, a static memory 4716, and a storage unit 4718, both accessible to the processors 4702 via the bus 4744. The main memory 4704, the static memory 4716, and storage unit 4718 store the instructions 4710 embodying any one or more of the methodologies or functions described herein. The instructions 4710 may also reside, completely or partially, within the main memory 4714, within the static memory 4716, within machine-readable medium 4720 within the storage unit 4718, within at least one of the processors 4702 (e.g. within the processor's cache memory), or any suitable combination thereof, during execution thereof by the machine 4700.

The I/O components 4706 may include a wide variety of components to receive input, provide output, produce output, transmit information, exchange information, capture measurements, and so on. The specific I/O components 4706 that are included in a particular machine will depend on the type of machine. For example, portable machines such as mobile phones may include a touch input device or other such input mechanisms, while a headless server machine will likely not include such a touch input device. It will be appreciated that the I/O components 4706 may include many other components that are not shown in FIG. 47. In various example embodiments, the I/O components 4706 may include output components 4728 and input components 4732. The output components 4728 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 4732 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 4706 may include biometric components 4734, motion components 4736, environmental components 4738, or position components 4740, among a wide array of other components. For example, the biometric components 4734 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 4736 include acceleration sensor components (e.g., accelerometer), gravitation sensor components, rotation sensor components (e.g., gyroscope), and so forth. The environmental components 4738 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 4740 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 4706 further include communication components 4742 operable to couple the machine 4700 to a network 4722 or devices 4724 via a coupling 4730 and a coupling 4726, respectively. For example, the communication components 4742 may include a network interface component or another suitable device to interface with the network 4722. In further examples, the communication components 4742 may include wired communication components, wireless communication components, cellular communication components, Near Field Communication (NFC) components, Bluetooth® components (e.g., Bluetooth Low Energy), Wi-Fi® components, and other communication components to provide communication via other modalities. The devices 4724 may be another machine or any of a wide variety of peripheral devices (e.g., a peripheral device coupled via a USE).

Moreover, the communication components 4742 may detect identifiers or include components operable to detect identifiers. For example, the communication components 4742 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 4742, such as location via Internet Protocol (IP) geolocation, location via Wi-Fi® signal triangulation, location via detecting an NFC beacon signal that may indicate a particular location, and so forth.

The various memories (e.g., memory 4704, main memory 4714, static memory 4716, and/or memory of the processors 4702) and/or storage unit 4718 may store one or more sets of instructions and data structures (e.g., software) embodying or used by any one or more of the methodologies or functions described herein. These instructions (e.g., the instructions 4710), when executed by processors 4702, cause various operations to implement the disclosed embodiments.

The instructions 4710 may be transmitted or received over the network 4722, using a transmission medium, via a network interface device (e.g., a network interface component included in the communication components 4742) and using any one of a number of well-known transfer protocols (e.g., hypertext transfer protocol (HTTP)). Similarly, the instructions 4710 may be transmitted or received using a transmission medium via the coupling 4726 (e.g., a peer-to-peer coupling) to the devices 4724.

A "carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

A "client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

A "communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

A "component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

A "computer-readable medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

A "machine-storage medium" refers to a single or multiple storage devices and/or media (e.g., a centralized or distributed database, and/or associated caches and servers) that store executable instructions, routines and/or data. The term shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

A "processor" refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (CPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

A "signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed embodiments without departing from the scope of the present disclosure. These and other changes or modifications are intended to be included within the scope of the present disclosure, as expressed in the following claims.

What is claimed is:

1. A method, comprising:
   receiving, by at least one processor, structured information relating to personal data intended for use by a product or process;
   generating, by the at least one processor and based on the structured information, a set of questions corresponding to privacy compliance of the product or process with respect to the personal data;
   providing, by the at least one processor, a first user interface for presenting the set of questions to a user, for reviewing the product or process for privacy compliance with respect to the personal data;
   maintaining, based on the structured information and on received responses to the set of questions, a data structure configured to cross-reference the personal data intended for use by the product or process and the compliance of the product or process with respect to the personal data,
   wherein the data structure is configured to be updated in real-time based on subsequent user-provided responses, the subsequent user-provided responses relating to the personal data intended for use by the product or process and to the compliance of the product or process with respect to the personal data; and
   providing a second user interface for editing the data structure with respect to the personal data intended for use by the product or process, and the compliance of the product or process with respect to the personal data,
   wherein the second user interface provides editing controls for modifying compliance parameters within the data structure, the compliance parameters corresponding to the compliance of the product or process with respect to the personal data.

2. The method of claim 1, wherein the structured information corresponds to user responses to initial questions relating to the personal data intended for use by the product or process, and
   wherein the set of questions is based at least in part on the user responses to the initial questions.

3. The method of claim 2, wherein the user responses are provided by a second user that is different than the user, or wherein the user responses are provided by the user.

4. The method of claim 1, wherein latter-presented questions within the set of questions are based at least in part on responses, by the user, to earlier-presented questions within the set of questions.

5. The method of claim 2, further comprising:
   receiving responses, provided by the user, to the set of questions; and
   storing the responses to the set of questions in association with the structured information.

6. The method of claim 5, further comprising:
   generating, based on at least one of the structured information or the received responses to the set of questions, a report corresponding to the privacy compliance; and
   providing the generated report for display to a user, for documenting the product or process for compliance with respect to the personal data.

7. The method of claim 6, wherein the report corresponds to a legitimate interest assessment (LIA) with respect to the personal data intended for use by the product or process.

8. The method of claim 6, wherein the report corresponds to a data protection impact assessment (DPIA) with respect to the personal data intended for use by the product or process.

9. The method of claim 6, further comprising:
   providing, in response to receiving the responses to the set of questions, a user-selectable element to generate the report,
   wherein the generating is performed in response to user selection of the user-selectable element.

10. The method of claim 6, wherein the generated report is configured for at least one of viewing, editing or exporting by the user.

11. The method of claim 1, wherein the product includes at least one of a software component or a hardware component.

12. The method of claim 1, wherein the structured information relates to types of the personal data and uses of the personal data, and
    wherein the data structure is configured to cross-reference and be updated in real-time with respect to one or more of the types of the personal data, the uses of the personal data, or the compliance of the product or process with respect to the personal data.

13. The method of claim 1, wherein the data structure is further configured to cross-reference and be updated in real-time with respect to one or more of a business purpose of the product or process, retention procedures for the personal data, third party usage of the personal data, or data sources of the personal data, based on a subset of the structured information.

14. The method of claim 1, further comprising:
    receiving responses, provided by one or more third users, to a third set of questions relating to additional compliance of the product or process with respect to the personal data, the third set of questions having been determined based on the structured information,
    wherein the maintaining is further based on the responses for the third set of questions.

15. The method of claim 1, wherein the data structure is further configured to cross-reference and be updated in real-time with respect to supplemental information that is specific to an organization associated with the product or process.

16. A system, comprising:
    a processor; and
    a memory storing instructions that, when executed by the processor, cause the processor to:
    receive structured information relating to personal data intended for use by a product or process;
    generate, based on the structured information, a set of questions corresponding to privacy compliance of the product or process with respect to the personal data;
    provide a first user interface for presenting the set of questions to a user, for reviewing the product or process for privacy compliance with respect to the personal data;
    maintain, based on the structured information and on received responses to the set of questions, a data structure configured to cross-reference the personal data intended for use by the product or process and the compliance of the product or process with respect to the personal data,
    wherein the data structure is configured to be updated in real-time based on subsequent user-provided responses, the subsequent user-provided responses relating to the personal data intended for use by the product or process and to the compliance of the product or process with respect to the personal data; and
    provide a second user interface for editing the data structure with respect to the personal data intended for use by the product or process, and the compliance of the product or process with respect to the personal data,
    wherein the second user interface provides editing controls for modifying compliance parameters within the data structure, the compliance parameters corresponding to the compliance of the product or process with respect to the personal data.

17. The system of claim 16, wherein the structured information corresponds to user responses to initial questions relating to the personal data intended for use by the product or process, and
    wherein the set of questions is based at least in part on the user responses to the initial questions.

18. The system of claim 17, wherein the user responses are provided by a second user that is different than the user.

19. The system of claim 16, wherein latter-presented questions within the set of questions are based at least in part on responses, by the user, to earlier-presented questions within the set of questions.

20. A non-transitory computer-readable storage medium, the computer-readable storage medium including instructions that when executed by a computer, cause the computer to:
    receive structured information relating to personal data intended for use by a product or process;
    generate, based on the structured information, a set of questions corresponding to privacy compliance of the product or process with respect to the personal data;
    provide a first user interface for presenting the set of questions to a user, for reviewing the product or process for privacy compliance with respect to the personal data;
    maintain, based on the structured information and on received responses to the set of questions, a data structure configured to cross-reference the personal data intended for use by the product or process and the compliance of the product or process with respect to the personal data,
    wherein the data structure is configured to be updated in real-time based on subsequent user-provided responses, the subsequent user-provided responses relating to the personal data intended for use by the product or process and to the compliance of the product or process with respect to the personal data; and
    provide a second user interface for editing the data structure with respect to the personal data intended for use by the product or process, and the compliance of the product or process with respect to the personal data,
    wherein the second user interface provides editing controls for modifying compliance parameters within the data structure, the compliance parameters corresponding to the compliance of the product or process with respect to the personal data.

* * * * *